US012687677B2

(12) United States Patent
Yu

(10) Patent No.: US 12,687,677 B2
(45) Date of Patent: Jul. 21, 2026

(54) SILICON PHOTONICS LENS ASSISTED BEAM STEERING EMITTER PIXEL ARRAY AND PHOTO-ACOUSTIC IMAGING PIXEL ARRAY DEVICES

(71) Applicant: Guomin Yu, Glendora, CA (US)

(72) Inventor: Guomin Yu, Glendora, CA (US)

( * ) Notice: Subject to any disclaimer, the term of this patent is extended or adjusted under 35 U.S.C. 154(b) by 436 days.

(21) Appl. No.: 18/113,590

(22) Filed: Feb. 23, 2023

(65) Prior Publication Data

US 2024/0126016 A1 Apr. 18, 2024

Related U.S. Application Data

(60) Provisional application No. 63/434,457, filed on Dec. 21, 2022, provisional application No. 63/416,942, filed on Oct. 18, 2022.

(51) Int. Cl.
| | |
|---|---|
| *G02B 6/293* | (2006.01) |
| *G01S 15/89* | (2006.01) |
| *G02B 6/42* | (2006.01) |
| *G02B 6/43* | (2006.01) |

(52) U.S. Cl.
CPC ...... *G02B 6/29353* (2013.01); *G01S 15/8968* (2013.01); *G02B 6/4246* (2013.01); *G02B 6/43* (2013.01)

(58) Field of Classification Search
CPC .... G02B 6/29353; G02B 6/4246; G02B 6/43; G02B 6/3546; G02B 6/3548; G02B 6/355; G01S 15/8968; G01S 15/8925; G01S 15/8915; G02F 1/212
See application file for complete search history.

(56) References Cited

U.S. PATENT DOCUMENTS

| | | | |
|---|---|---|---|
| 11,441,353 B2 | 9/2022 | Zhang | |
| 11,448,736 B2 | 9/2022 | Hosseini | |
| 2021/0257396 A1* | 8/2021 | Piggott | ................. G01S 7/4816 |
| 2021/0349261 A1* | 11/2021 | Ottonello Briano | ... G02B 6/122 |
| 2022/0121080 A1 | 4/2022 | Yao | |
| 2022/0196814 A1* | 6/2022 | Lin | ........................ G01S 17/931 |
| 2022/0360039 A1* | 11/2022 | Russell | ................. H01S 5/4056 |

(Continued)

OTHER PUBLICATIONS

Steven J Spector; Review of lens-assisted beam steering methods; Journal of Optical Microsystems, Jan.-Mar. 2022 vol. 2(1 ).

(Continued)

*Primary Examiner* — Isam A Alsomiri
*Assistant Examiner* — Joseph C Fritchman

(57) ABSTRACT

A silicon photonics integrated beam steering device includes a light source operably coupled to a light dispenser, a chained optical switch array including a first optical switch having a first control circuit and a second optical switch having a second control circuit, and a pixel array having a first pixel and a second pixel, wherein the light dispenser is operably coupled to first optical switch, the first optical switch is operably coupled to both the second optical switch and the first pixel, and the second optical switch is operably coupled to the second pixel, and wherein the device is configured to selectively transmit light along a plurality of optical paths to the first pixel, the second pixel, or both the first pixel and the second pixel in response to a first control voltage applied to the first control circuit and a second control voltage applied to the second control circuit.

20 Claims, 49 Drawing Sheets

(56) References Cited

U.S. PATENT DOCUMENTS

| | | | |
|---|---|---|---|
| 2023/0097851 A1* | 3/2023 | Muranaka | G02B 6/356 |
| | | | 385/2 |
| 2024/0280809 A1* | 8/2024 | Anzai | G02B 5/18 |
| 2024/0329205 A1* | 10/2024 | Toda | G01S 7/4818 |
| 2024/0427098 A1* | 12/2024 | Jaiswal | G02B 6/29301 |
| 2025/0138385 A1* | 5/2025 | Hajati | G02B 6/2817 |

OTHER PUBLICATIONS

Wouter J_ Westerveld, et al; Sensitive, small, broadband and scalable optomechanical ultrasound sensor in silicon photonics; Nature Photonics 15, 341-345 (2021).

* cited by examiner

FIG. 2

FIG. 10
1000
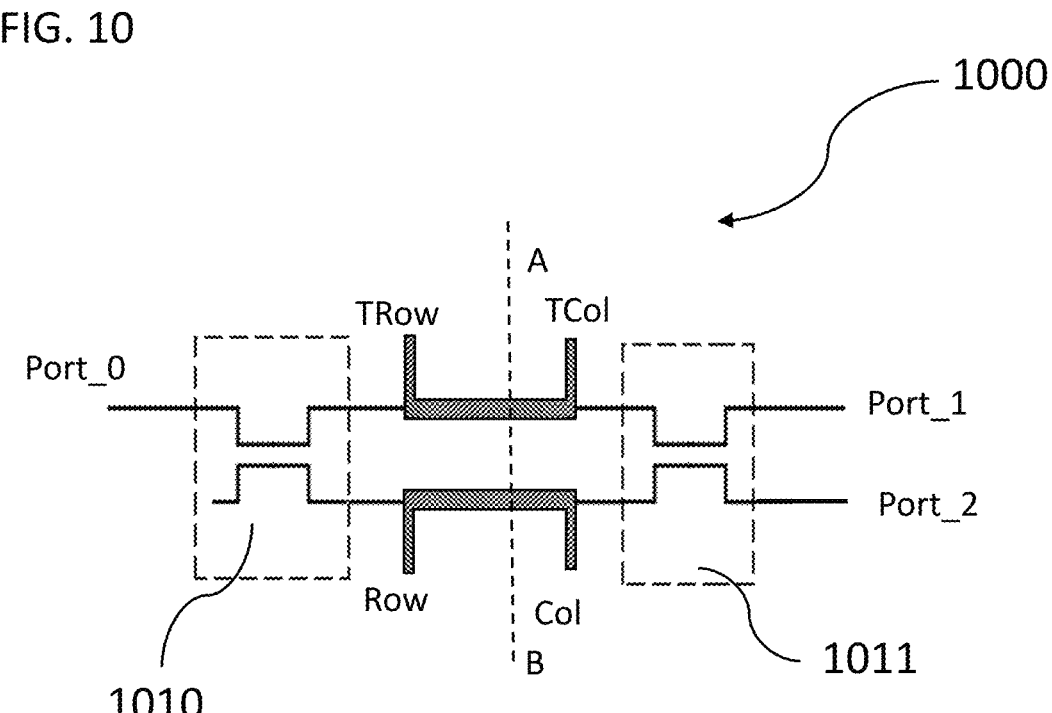
1010                          1011
1100
1110             1120
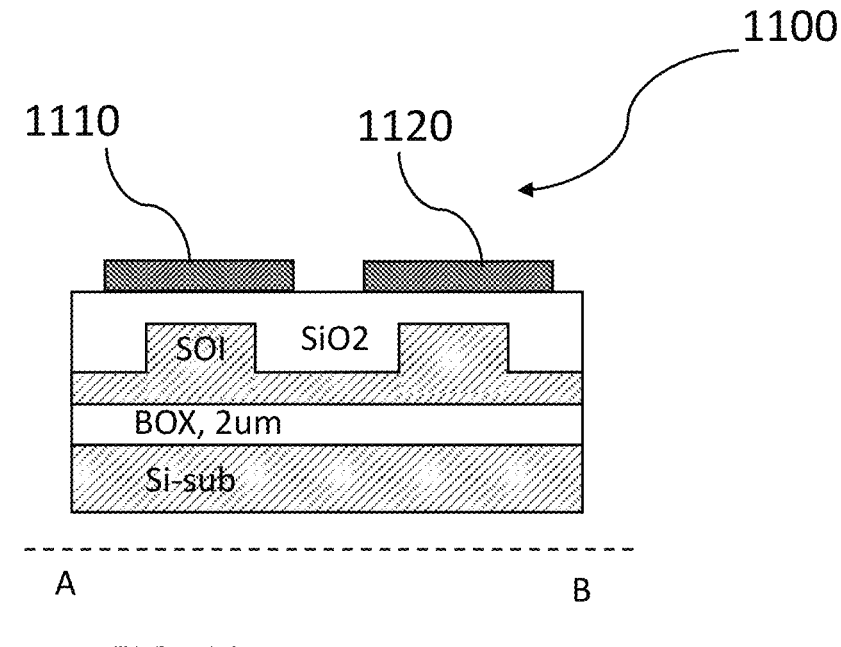
FIG. 11

1300

1310

Port_0

Port_1

Port_2

One coupling length

1400

1010

1011

Port_0

Arm_1          Port_1

Arm_2

Port_2

1500

1210      1220

1900

1920

400 – 500nm

1910

1940

1930

2000

2300

2230      2210      2220

SiO2

SOI

BOX, 2um

Si-sub

A — — — — — — — — — — — B

Note:
- Solid line: optical path
- Dash line: electrical path

Note:
• Solid line: optical path
• Dash line: electrical path

3000

3010

Top view

3200

Top view, variant

3300

3130

Section view at AB cut in previous two figures 1D array 2D array

Top-down view

AB section view 1D array

Top view

AB section view 1D array

4200

4120

Section view at AB cut
With suspended waveguide made of poly-si

Suspended poly-Si waveguide

Section view at AB cut
With suspended waveguide made of crystalline si

1D Ultrasound imaging pixel array

2D Ultrasound imaging pixel array

SILICON PHOTONICS LENS ASSISTED BEAM STEERING EMITTER PIXEL ARRAY AND PHOTO-ACOUSTIC IMAGING PIXEL ARRAY DEVICES

CROSS REFERENCE TO RELATED APPLICATION

This application claims the benefit of U.S. Provisional Application Ser. No. 63/416,942, filed Oct. 18, 2022, and the benefit of U.S. Provisional Application Ser. No. 63/434,457, filed Dec. 21, 2022, entirety of both of which is incorporated by reference herein.

BACKGROUND OF THE INVENTION

Technical Field

Aspects of embodiments of the present disclosure relate to the field of free space optics and opto-acoustic sensors. More particularly, aspects of embodiments of the present disclosure relate to lens assisted beam steering devices and imaging pixel sensor arrays.

Description of Related Art

Lens Assisted Beam Steering

Lens Assisted Beam Steering (LABS) is a promising solution for compact chip based solid state Light Detection and Ranging (LIDAR) systems. The principle of the LABS is like a camera operation in reverse. In a camera, a lens focuses light from the scene onto a focal plane where a detector pixel array or film is located. Whereas, in LABS, the detector pixel array is swapped for a light emitter pixel array in the focal plane. The light emitter pixels emit light to the free space which is collected by a lens and directed toward a distant spot.

Compared to other beam steering technologies, LABS may offer the following advantages: solid-state reliability, simplified control componentry, compactness, and fast random-access scanning.

However, one major limitation of LABS is that the beam can only be steered to a fixed number of beam positions due to discrete light emitter pixels. For many applications, it is advantageous to have large pixel arrays to improve the resolution. As such, it is desirable to produce LABS devices with 2-dimensional (2D) large scale light emitter pixel arrays with pixel numbers that could be comparable with CMOS image sensor arrays in camera. Unfortunately, with state of art of silicon photonics, the biggest LABS pixel number of 2D light emitter pixel arrays has only reported 4×4 up to date. Such a limited pixel number prevents most current LABS devices from being viable in LIDAR applications.

As LIDAR systems proliferate in consumer electronics, autonomous or semi-autonomous vehicles, military/defense systems, and medical devices there is a growing need for versatile and robust LABS devices.

Ultrasound and Other Acoustic Sensor Applications

Acoustic sensors can have a variety of applications, with ultrasound imaging being a common one within the medical industry. Using the current state-of-the-art ultrasound sensors arrays, two or three-dimensional ultrasound images can be reconstructed to provide non-invasive imaging of tissues and structures within a patient's body. However, currently available commercial ultrasound sensors rely on bulky piezoelectric sensors, which have 3 limitations. First, the detection limit (expressed as noise equivalent pressure, NEP) scales approximately inversely with their size, which imposes an undesirably high pressure-detection limit resulting in a noisy image. Second, piezoelectric sensors rely on their mechanical resonance to enhance signal amplitude with a limited bandwidth. Third, piezoelectric sensors require an electrical wire, such as coaxial cable, for each of their sensor elements hampering catheter applications and significantly driving up the cost of high-end Transducers.

Thus, there is a need for an alternative to traditional piezoelectric sensors to improve the capability of ultrasound imaging devices.

Problems that are to be Solved by the Invention

As mentioned previously, In LABS applications, there is a need for larger emitter pixel arrays that can benefit from the advantages of using silicon photonics. Similarly, for acoustic imaging sensors such as those used during ultrasound imaging, there is a need for an alternative to traditional piezoelectric sensors that limit both the functioning and the size of ultrasound imaging arrays.

As such, aspects of embodiments of the present disclosure may provide the benefits of larger and more robust emitter/imaging pixels arrays for use in applications such as LABS devices and ultrasound imagers while also taking advantage of the benefits of silicon photonics that can be manufactured using mature CMOS processes.

Means for Solving the Problem

Aspects of embodiments of the present disclosure are directed to devices and systems having chained optical switch arrays and/or photo-acoustic imaging pixels that allow for the creation of silicon photonics solutions to the above-mentioned problems.

Effect of the Invention

Aspects of embodiments of the present disclosure may be directed to devices and systems that allow for the creation of silicon photonics LABS and photo-acoustic imaging solutions that provide adaptable and performance-enhancing emitter pixel arrays and imaging pixel arrays that offer reliable operation and lower-cost manufacturing using existing CMOS processes.

SUMMARY OF THE INVENTION

One or more embodiments of the present disclosure may be directed to a silicon photonics lens assisted beam steering (LABS) devices and imaging pixel sensor arrays.

A silicon photonics integrated beam steering device includes a light source, a light dispenser, a chained Mach-Zehnder Interferometer (MZI) optical switch array including a first optical switch having a first control circuit and a second optical switch having a second control circuit, and a pixel array having a first pixel and a second pixel, wherein the light source is operably coupled to the light dispenser, wherein the light dispenser is operably coupled to first optical switch, wherein the first optical switch is operably coupled to the second optical switch and also operably coupled to the first pixel, wherein the second optical switch is operably coupled to the second pixel, and wherein the device is configured to selectively transmit a light emission, produced by the light source, along a plurality of optical paths to the first pixel, the second pixel, or both the first pixel and the second pixel in response to a first control voltage applied to the first control circuit and a second control voltage applied to the second control circuit.

The silicon photonics integrated beam steering device may have the light source include a light array.

The silicon photonics integrated beam steering device may have the light dispenser include a waveguide and a beam splitter.

The silicon photonics integrated beam steering device may have the light dispenser include a waveguide and a dispenser array.

The silicon photonics integrated beam steering device may have each MZI optical switch comprises two 3 dB optical directional couplers.

The silicon photonics integrated beam steering device may have each MZI optical switch comprises a multimode interferometer (MMI).

The silicon photonics integrated beam steering device may have the first pixel and the second pixel of the pixel array each include an emitter pixel.

The silicon photonics integrated beam steering device may have the first pixel and the second pixel of the pixel array each include an imaging pixel.

A silicon photonics integrated beam steering system includes a first integrated beam steering device having a first light source, a first light dispenser operably coupled to the first light source, a first M×N chained optical switch array operably coupled to the first light dispenser, and a first pixel array having M×N pixel units, wherein each pixel unit of the first pixel array is operably coupled to a corresponding one of the optical switches in the first chained optical switch array, and a second integrated beam steering device having a second light source a second light dispenser operably coupled to the second light source, a second M×N chained optical switch array operably coupled to the second light dispenser, and a second pixel array having M×N pixel units, wherein each pixel unit of the second pixel array is operably coupled to a corresponding one of the optical switches in the second chained optical switch array.

The silicon photonics integrated beam steering system may have each optical switch of the first chained optical switch array and each optical switch of the second chained optical switch array include a 1×2 optical switch.

The silicon photonics integrated beam steering system may have the first pixel array and the second pixel array coupled to produce a M×2N emitter array.

The silicon photonics integrated beam steering system may have the first pixel array and the second pixel array coupled to produce a 2M×N emitter array.

The silicon photonics integrated beam steering system of claim 9, wherein the first M×N chained optical switch array and the second M×N chained optical switch array each include a CMOS addressable control circuit having an addressable pair of control electrodes corresponding to each optical switch, and a CMOS addressable tuning circuit having an addressable pair of tuning electrodes corresponding to each optical switch.

The silicon photonics integrated beam steering system may have each CMOS addressable tuning circuit be configured to apply a biasing voltage to each pair of tuning electrodes corresponding to each optical switch of the corresponding M×N chained optical switch array according to an operating characteristic of each chained optical switch of the corresponding M×N chained optical switch array.

A silicon photonics opto-acoustic imaging sensor array includes a light source, a light dispenser operably coupled to the light source, a chained optical switch array having a first optical switch having a first control circuit and a second optical switch having a second control circuit, and an imaging pixel array having a first imaging pixel and a second imaging pixel, wherein the light dispenser is operably coupled to first optical switch, wherein the first optical switch is operably coupled to the second optical switch and also operably coupled to the first imaging pixel, wherein the second optical switch is operably coupled to the second imaging pixel, and wherein the sensor array is configured to selectively transmit a light emission, produced by the light source, along a plurality of optical paths to the first imaging pixel, the second imaging pixel, or both the first imaging pixel and the second imaging pixel in response to a first control voltage applied to the first control circuit and a second control voltage applied to the second control circuit.

The silicon photonics opto-acoustic imaging sensor array may have the first imaging pixel and the second imaging pixel each include a Mach-Zehnder Interferometer (MZI) include a first arm having a suspended rib waveguide having an air gap, an output, and a photodetector coupled to the output, wherein the suspended rib waveguide of the first arm is configured to vibrate in response to a received acoustic input creating a change in an effective refractive index of the suspended rib waveguide that causes a corresponding change in an output intensity of the MZI at the output which is detected by the photodetector.

The silicon photonics opto-acoustic imaging sensor array may have the first imaging pixel and the second imaging pixel each include a ring resonator having a suspended rib waveguide having an air gap, an output, and a photodetector coupled to the output, wherein the suspended rib waveguide is configured to vibrate in response to a received acoustic input creating a change in an effective refractive index of the suspended rib waveguide that causes a corresponding change in an output intensity of the ring resonator at the output which is detected by the photodetector.

The silicon photonics opto-acoustic imaging sensor array may have the first imaging pixel and the second imaging pixel each further include an amplifier.

The silicon photonics opto-acoustic imaging sensor array may have the first imaging pixel and the second imaging pixel each further include a first pair of electrodes configured to apply a biasing voltage, and a second pair of electrodes configured to transmit an output signal.

The silicon photonics opto-acoustic imaging sensor array may have the first imaging pixel and the second imaging pixel each include a poly-silicon material.

BRIEF DESCRIPTION

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 2 is a simplified diagram depicting a silicon photonics integrated beam steering device having a 1×2 chained optical switch array, according to aspects of embodiments of the present disclosure;

FIG. 10 is a simplified diagram depicting an optical switch having a pair of 3 dB couplers, according to aspects of embodiments of the present disclosure;

FIG. 11 is a cross-sectional view of an optical switch operated using a thermal-optic (TO) effect, according to aspects of embodiments of the present disclosure;

DETAILED DESCRIPTION

Figure 1:
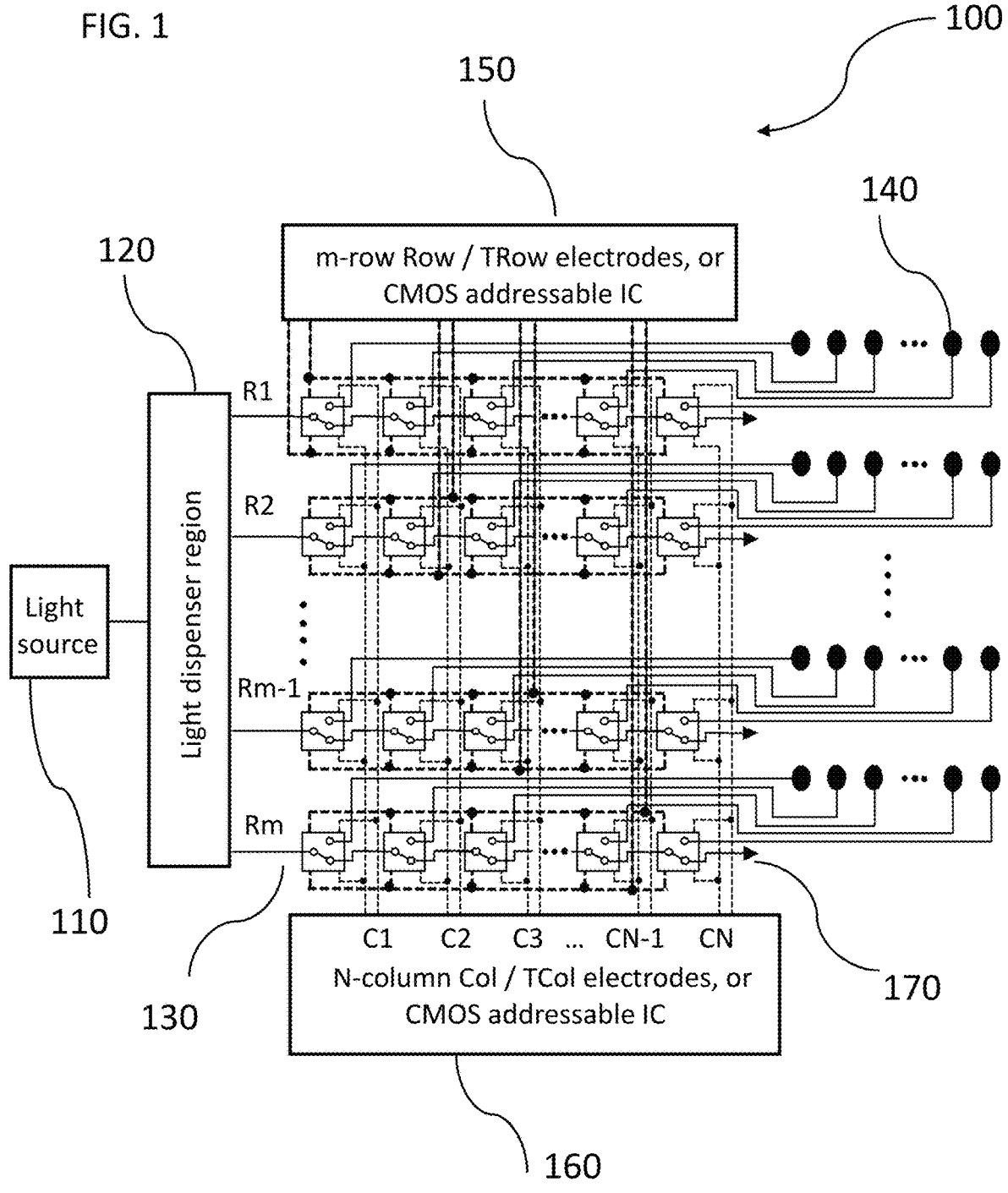
FIG. 1 is a diagram depicting a silicon photonics integrated beam steering device having an M×N chained optical switch array, according to aspects of embodiments of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

DEFINITIONS

Light Source: any device or combination of devices configured to emit light.

Beam Splitter: any device or combination of devices configured to convert an incoming beam of light into two or more outbound beams of light.

Waveguide: any path, channel, or conduit configured to confine and direct the transmission of light waves.

Absorber: any device or combination of devices that can attenuate light or deflect light from its propagating direction.

Optical Switch: any device or combination of devices that can be configured to selectively vary the output intensity of a beam of light to one or more outputs.

Mach-Zehnder Interferometer (MZI): any device or combination of devices that can measure, or be tuned according to, a phase difference produced between two beams of light from a single incoming beam source.

Directional Coupler: any device or structure within a photonic circuit allowing for the coupling of the energy of an optical signal between two or more parallel waveguides.

Chained Optical Switch Array: any combination of dual-output optical switches wherein at least one optical switch has its first output directed to a pixel unit and its second output directed to a subsequent optical switch as an input.

MxN Optical Switch Array: a rectangular array of optical switches arranged as M rows of N optical switches, where M and N m and N are integers such as 1, 2, 4, 8, 16, 32, 64, 128, 256, 512, 1024, 2048, etc.

Optical Switch Tree Array: any combination of multi-output optical switches wherein at least one optical switch has a at least two of its outputs individually directed to subsequent optical switches.

CMOS: Complementary metal-oxide-semiconductor.

Emitter Pixel: any device or configuration of a waveguide designed to transmit a light emission from within a waveguide into the free space above the waveguide.

Imaging Pixel: any device or configuration of a waveguide designed to measure an external signal or input using a beam of light transmitted within the waveguide.

Control Circuitry: one or more electrodes, traces, or other electrical components configured to deliver a voltage, or a current to an optical switch.

Control Voltage: a voltage that may be applied to an optical switch that may vary the output characteristics of the optical switch based on the applied voltage.

Selective Transmission: a mode of operation wherein the transmission of a light beam along a waveguide to a pixel can be controlled by one or more optical switches.

One or more embodiments according to the present disclosure will now be described. As described previously, aspects of embodiments of the present disclosure may be directed to silicon photonics devices including one or more chained optical switch arrays. For ease of explanation, this detailed disclosure will first describe embodiments of the present disclosure related to LABS applications. Afterwards, embodiments featuring more than one chained optical switch array will be described. Subsequently, embodiments including a photo-acoustic imaging pixel array will be described. Lastly, future embodiments of the present disclosure will be described to provide context for the broad range of applications for which aspects of embodiments of the present disclosure may be used.

I. Silicon Photonics Integrated Beam Steering Device

Some embodiments of the silicon photonics integrated beam steering device of the present disclosure may include four distinct subsections, also referred to herein as "regions." Each of these four subsections are described below in more detail. In some embodiments, a light source may be operably coupled, or otherwise communicably linked using one or more waveguides, to a light dispenser. The light dispenser may then, in some other embodiments, be operably coupled, or otherwise communicably linked using one or more waveguides, to a chained optical switch array. The optical switch array may, in some embodiments, include an MxN array of optical switches configured in "chained" rows of optical switches. In some embodiments the chained optical switch array may be a chained Mach-Zehnder Interferometer (MZI) optical switch array. In some embodiments, the MxN optical switches may each be operably coupled to, or otherwise communicably linked by one or more waveguides, to a pixel or "pixel unit."

Figure 2:
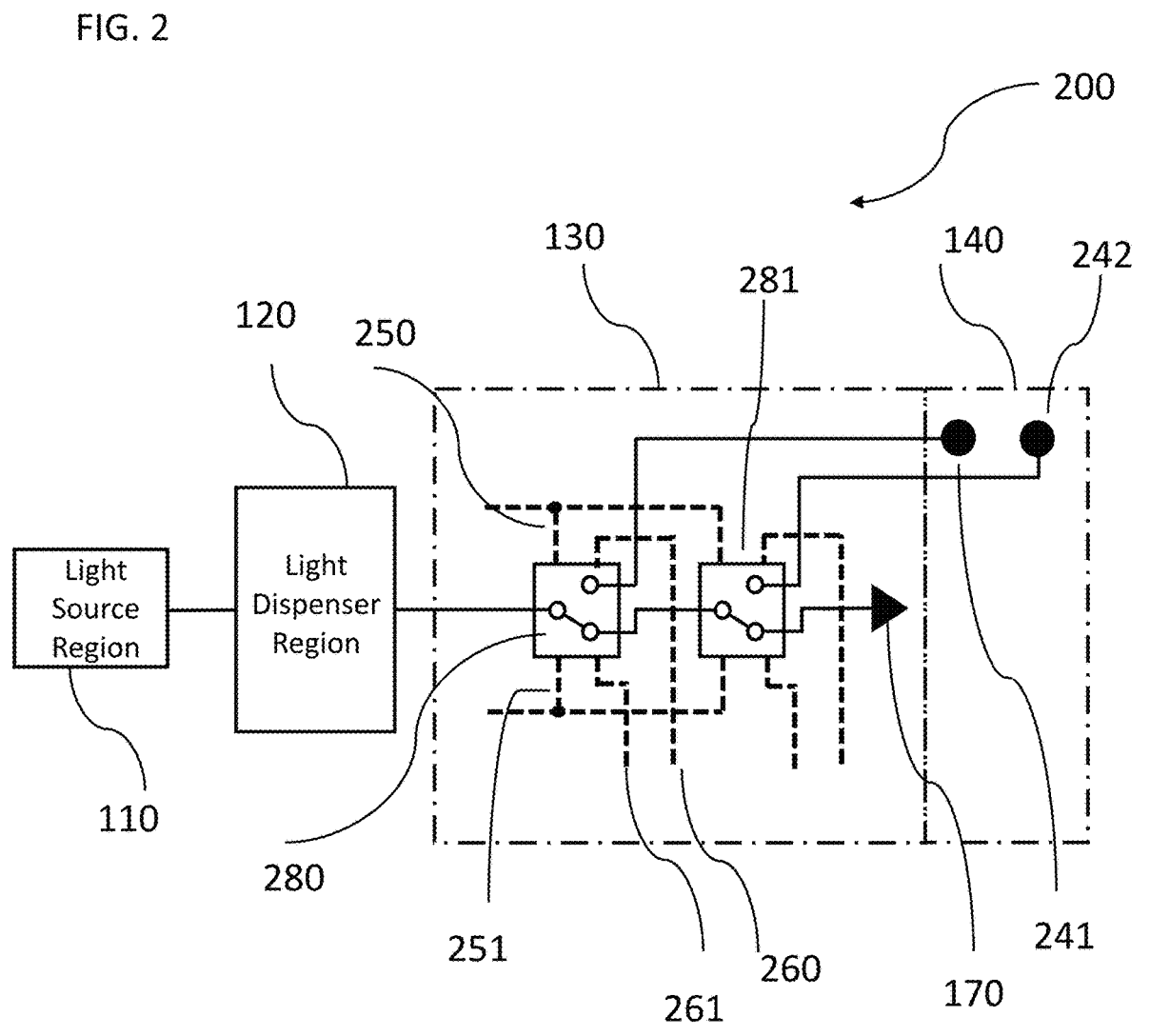

Further understanding of the silicon photonics integrated beam steering device of the present disclosure may be had by reference to FIGS. 1 and 2.

FIG. 1 is a diagram depicting a silicon photonics integrated beam steering device having an MxN chained optical switch array, according to aspects of embodiments of the present disclosure. A silicon photonics integrated beam steering device 100 of the present disclosure may, in some embodiments, include a light source 110, a light dispenser 120, a chained optical switch array 130, and a pixel array 140. In some embodiments, each row of optical switches within the chained optical switch array may be terminated with an optical absorber 170. As shown, in some other embodiments, the chained optical switch array 130 may include a row control circuit 150 for the m-row Row/TRow electrodes or CMOS addressable integrated circuits (IC), and a column control circuit 160 for the N-column Col/TCol electrodes or CMOS addressable integrated circuits. As will be understood by one skilled in the art, the row control circuit 150 and the column control circuit 160 may, in some embodiments, form a plurality of addressable pairs of "controls circuits" wherein each one of the plurality of control circuits corresponds to one of the optical switches of the chained optical switch array 130. For such embodiments, it may be convenient to describe such pairs as a "first control circuit," "second control circuit," and so on to identify the controls for each of the optical switches.

The "chained" optical switch array structure of the present disclosure may describe the arrangement of 1×2 optical switches where one output from an optical switch is operably coupled to a pixel unit in the pixel array region 140 using a waveguide while its second output is operably coupled to the input of a subsequent optical switch in the same row of optical switches using a waveguide.

Thus, as a non-limiting example, in a row of the chained optical switch array 130, the 1×2 optical switches with balanced MZIs may be connected such that the output waveguide port_2 connects to the input waveguide port_0 of the next optical switch to form a 1×2 optical switch chain and the other output waveguide port_1 connects to a pixel in the pixel array 140. In the initial state, of such an embodiment, there may be no light emitting from the pixel array since port_1 of the optical switches is in "OFF" state. The input waveguide port_0 of the first optical switch, in this non-limiting example, may receive optical power from the light dispenser, and the output waveguide port_2 of the last optical switch, i.e., the Nth optical switch, may be connected to a light absorber on which the light propagating through the chained optical switch array is terminated. In some embodiments, the light absorber may be a detector (photodetector) that may be used for monitoring and calibrating the chained optical switch array's operation states.

An optical switch of the present disclosure may have two pairs of electrodes, TRow/TCol and Row/Col. TRow/TCol electrodes are for optical switch initial state tuning, and Row/Col electrodes are for switch operation. All the electrodes Row and TRow of the chained optical switches array in a row may, in some embodiments, be connected to form two electrodes Row_y and TRow_y (y=1, 2, . . . m, corresponding to row label R1, R2, . . . Rm−1 and Rm), and their contact pads (Row on left side and TRow on right side for the Row/TRow electrodes) are routed on top electrode control circuitry 150. Likewise, in some embodiments, all of the electrodes Col and TCol of the chained optical switches in a corresponding column (called "a column" in short) may be connected to form two electrodes Col_x and TCol_x (x=1, 2, . . . N, corresponding to column label C1, C2, C3, . . . CN−1, and CN), and their contact pads (Col on left side and TCol on right side for the Col/TCol electrodes) may be routed at the bottom electrode control circuitry 160. As will be understood by one skilled in the art, such an arrangement may be described using the "first control circuit," "second control circuit" framework described above.

Further understanding of the silicon photonics integrated beam steering device of the present disclosure may be further understood by viewing the simplified embodiment depicted in FIG. 2. FIG. 2 is a simplified diagram depicting a silicon photonics integrated beam steering device having a 1×2 chained optical switch array, according to aspects of embodiments of the present disclosure. A simplified silicon photonics integrated beam steering device 200 may, in some embodiments, include a light source 110, a light dispenser 120, a chained optical switch array 130 and a pixel array 140. The chained optical switch array 130 may, in some embodiments, include two optical switches 280 and 281. Optical switch 280 may, in some embodiments, have one optical input port_0 which receives optical input from the light dispenser region 120, and two optical output ports, port_1 and port_2. One optical output port (port_1) may connect to a pixel 241 and the other optical output port (port_2) may connect to the optical input port_0 of optical switch 281. In some embodiments, one of the optical output ports (port_1) of optical switch 281 may connect to a pixel 242 and the other optical output port (port_2) may be terminated with an optical absorber 170. Optical switches 280 and 281 may, in some embodiments, have two pairs of electrodes 250/260 and 251/261 for initial state tuning and switch operation. The electrode 250, TRow, may, in some embodiments, be for tuning, and the electrode 251, Row, may be for switch operation. Electrodes 250 and 251 of both optical switches 280 and 281 may, in some embodiments, be connected to form two common electrodes in a row. The electrode 260, TCol, may, in some embodiments, be for tuning and the electrode 261, Col, may be for switch operation.

As will be appreciated by one skilled in the art, due to variances in manufacturing and/or environmental conditions, each of the optical switches may have slight differences in performance. Therefore, in some embodiments, it may be useful to tune or bias each optical switch according to its variance from the designed operating parameters in order to increase performance. As such, each optical switch may be described as having an "operating characteristic" that describes its operation and variance from the intended operating parameters that it may be tuned according to.

The sizing and composition of the component parts of the silicon photonics integrated beam steering device of the present disclosure may, in some embodiments, be built on silicon substrate having SOI waveguides with a SOI thickness of 220 nm, 350 nm, 500 nm, 1000 nm, or up to 3000 nm. However, as will be appreciated by one skilled in the art, the dimensions and thickness of the SOI may be determined by the needs of a specific use case and all operable thicknesses are within the scope of the present disclosure. In some embodiment, the optical waveguides of the present disclosure may be silicon waveguides, silica waveguides, silicon nitride waveguides, polymer waveguides, or lithium niobate waveguides, or a combination thereof, on silicon substrate.

i. Light Source

The first subsection, in some embodiments, may be a light source, aka "light source region," which may include one or more lasers or other light sources to provide optical power. As will be appreciated by one skilled in the art, lasers having different output intensities, wavelengths, and beam widths may be used according to the operating parameters for the device. In some embodiments, tunable lasers may be used. In some other embodiments, any device configured to emit coherent light may be used.

The light source may, in some embodiments, include a laser with fixed wavelength, or a tunable laser, or a plurality of lasers with the same or different wavelengths. In some other embodiments, the light source may be a laser (or plurality of lasers) integrated on a chip or remotely provided by a fiber (or plurality of fibers). The light source may, in some other embodiments, include one or more optical switches, beam splitters, combinations of optical switches and beam splitters, and demultiplexer components such as arrayed waveguide gratings, MZIs, Echelle Gratings (EGs), or combinations thereof. In some embodiments, a laser, or a laser with a combination of these components may be configured as an array, referred to herein as a "light array."

Figure 3:
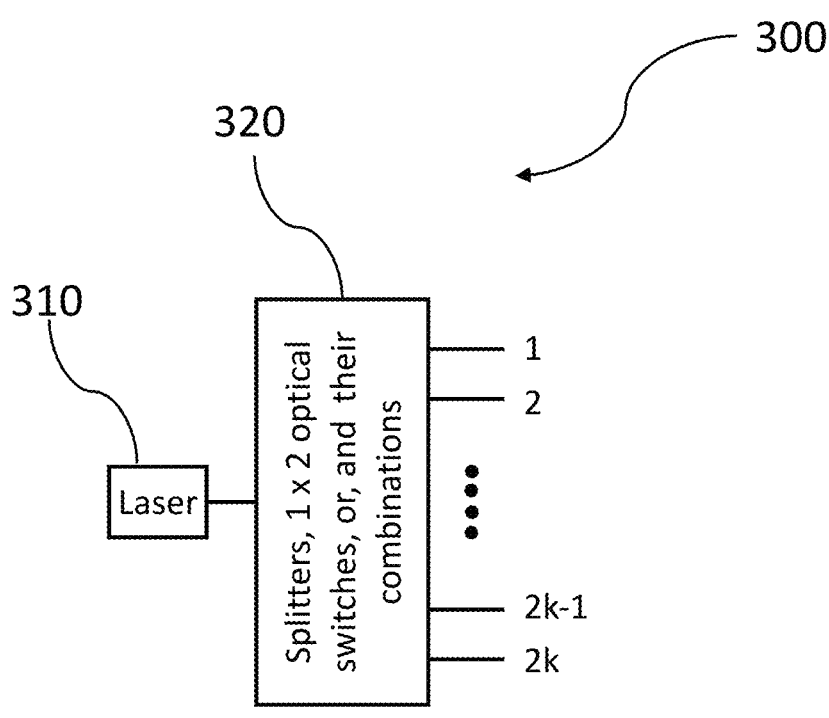
FIG. 3 is a diagram depicting a light source according to aspects of embodiments of the present disclosure.

Further understanding of the light source of the present disclosure may be had by reference to the following figures. FIG. 3 is a diagram depicting a light source according to aspects of embodiments of the present disclosure. As depicted, a light source 300 may, in some embodiments, include a laser 310 and one or more optical splitters, 1×2 optical switches and/or their combinations 320 to allocate light as required by the size and configuration of an individual embodiment.

Figure 4:
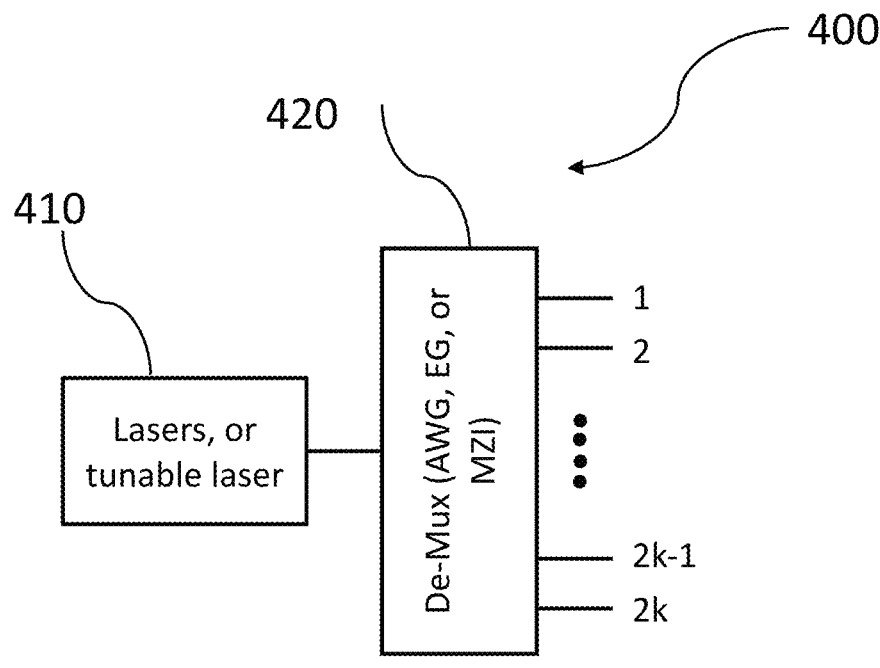
FIG. 4 is a diagram depicting an alternative embodiment of a light source according to aspects of embodiments of the present disclosure.

FIG. 4 is a diagram depicting an alternative embodiment of a light source according to aspects of embodiments of the present disclosure. As shown, the light source 400 may, in some embodiments, include a plurality of lasers with different wavelengths or a tunable laser 410 and a demultiplexer 420 that may include optical components, AWGs, echelle gratings (EG) or MZIs to allocate light of different wavelengths as required by the size and configuration of an individual embodiment.

ii. Light Dispenser

Following the light source, in some embodiments, a light dispenser, may be included. The light dispenser may, in some embodiments, include waveguides, 1×2 optical switches, optical splitters, or combinations thereof to distribute optical power from the light source to the input waveguides of the M×N optical switch array. In some embodiments, a combination of these components may be configured as an array, referred to herein as a "dispenser array."

As a non-limiting example, the dispenser array may include a 1×2 optical switch array (in a chained configuration, which is similar to that in a row of the chained optical switch array shown in FIG. 1).

Other non-limiting examples of embodiments of the light dispenser may include: a 1×M array of optical splitters (in a "tree" configuration), S stages of optical splitters which include a 1×p optical splitter, 1×q optical splitters, and 1×k optical splitters, where S, p, q, and k are integers; S stages of 1×2 optical switches in a binary "tree" array in which two output waveguide ports of one optical switch connect to the input waveguides of two optical switches in next stage; S stages of a combination of 1×2 optical switches and 1×k optical splitters with the optical switch as the first stage; or S stages of a combination of 1×2 optical switches and 1×k optical splitters with the 1×k optical splitter as the first stage.

Further understanding of some embodiments of the light dispenser of the present disclosure can be had by reference to the following figures: FIGS. 5-9.

Figure 5:
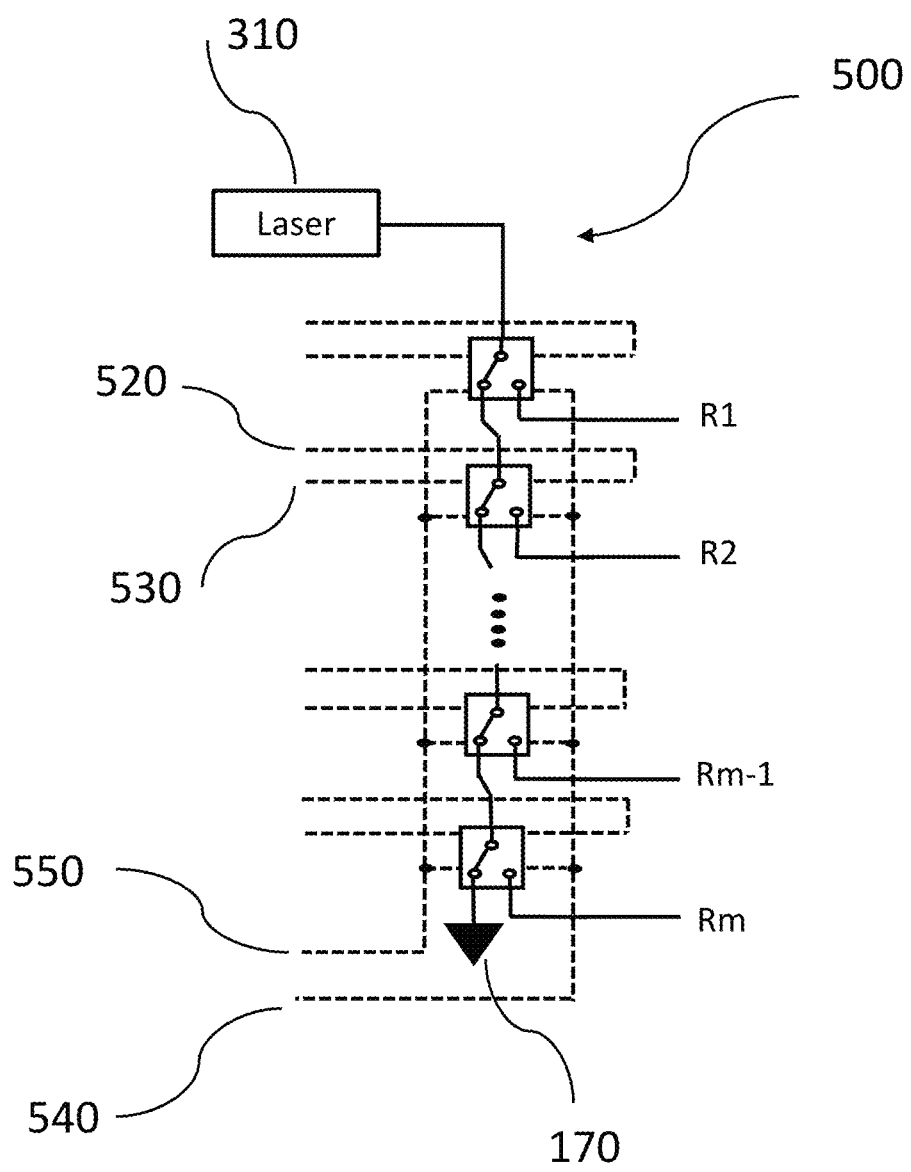
FIG. 5 is a diagram depicting another alternative embodiment of a light source operably coupled to a light dispenser, according to aspects of embodiments of the present disclosure.

FIG. 5 is a diagram depicting an embodiment of a light source operably coupled to a light dispenser, according to aspects of embodiments of the present disclosure. The light dispenser 500, as shown, may have the same structure as that of the chained optical switch array in a row as shown in FIG. 1 configured in vertical/columnar direction. The m optical output ports R1, R2, . . . Rm−1 and Rm of the "vertical" chained optical switch dispenser array may, in some embodiments provide light inputs for the M×N chained optical switch array shown in FIG. 1. Each optical switch may, in some embodiments, have two pairs of electrodes for tuning and switch operation. In some embodiments, electrode 520 may be for tuning, electrode 530 may be for switch operation, electrode 540, which connects all the optical switches, may be for tuning, and electrode 550, which connects all the optical switches, may be for switch operation. In some embodiments, the last optical switch may be terminated with an optical absorber 170.

Figure 6:
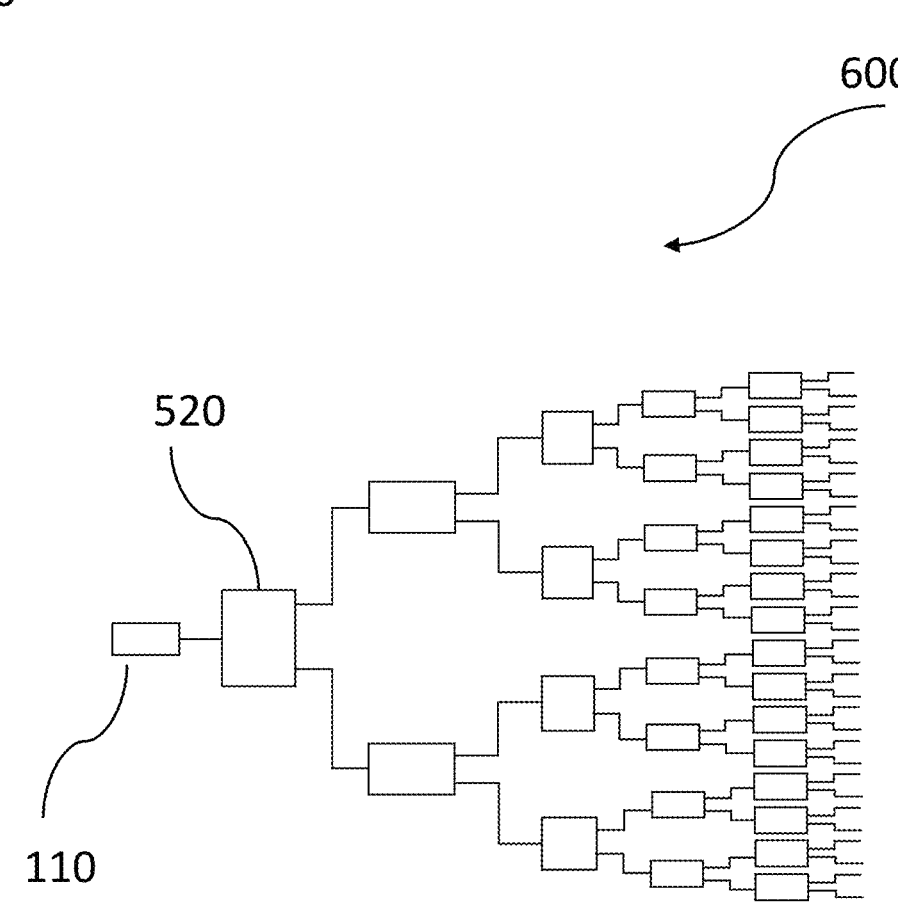
FIG. 6 is a diagram depicting yet another alternative embodiment of a light source operably coupled to a light dispenser, according to aspects of embodiments of the present disclosure.

FIG. 6 is a diagram depicting another alternative embodiment of a light source operably coupled to a light dispenser, according to aspects of embodiments of the present disclosure. As shown, light dispenser 600 may, in some embodiments, include five stages of 1×2 optical switches 520, which is called 1×2 optical switch binary tree network. Each of the two output ports of a 1×2 optical switch 520 within a stage connects to the input port of an optical switch at next stage. Light from the light source 110 may, in some embodiments, be switched in to one of its 32 output waveguides sequentially or randomly by controlling the 1×2 optical switch electrodes (not shown).

Figure 7:
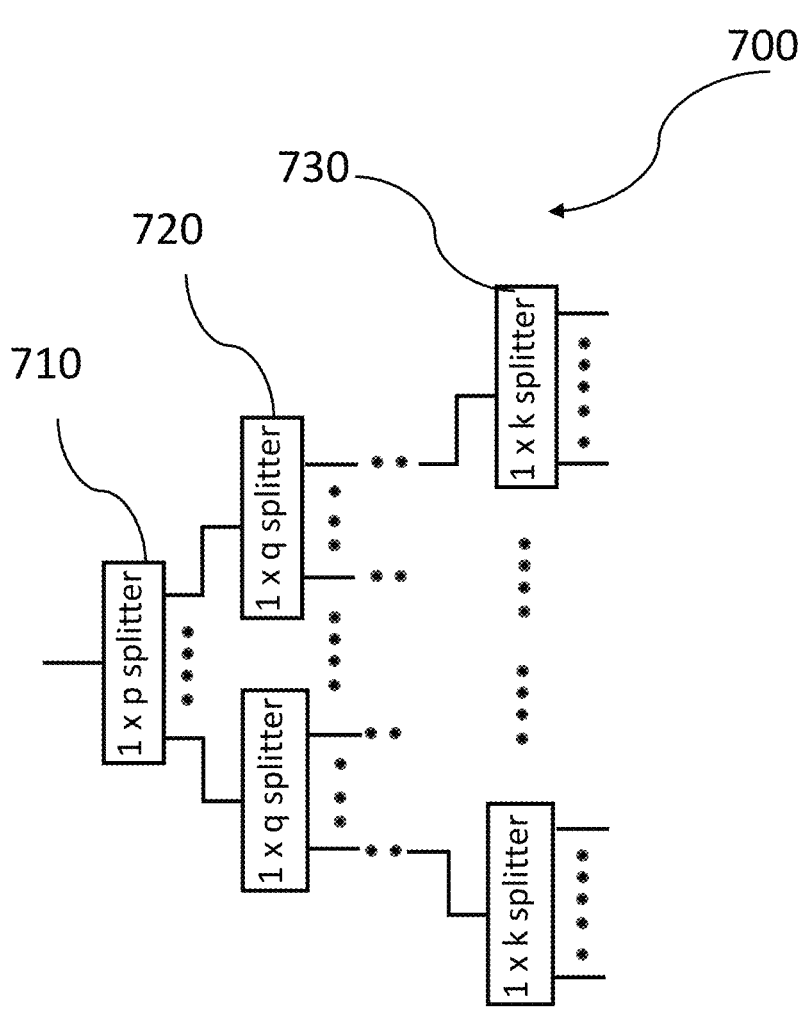
FIG. 7 is a diagram depicting an embodiment of a light dispenser, according to aspects of embodiments of the present disclosure.

FIG. 7 is a diagram depicting still another alternative embodiment of a light source operably coupled to a light dispenser, according to aspects of embodiments of the present disclosure. The light dispenser 700 may, in some embodiments, include S-stages of splitters with different numbers of branches at each stage. As a non-limiting example, a 1×p splitter 710, which has one input port and p output ports, at the first stage, a 1×q splitter 720, which has one input port and q output ports, at the second stage, and a 1×k splitter 730, which has one input port and k output ports, at the last, or the Sth stage.

Figure 8:
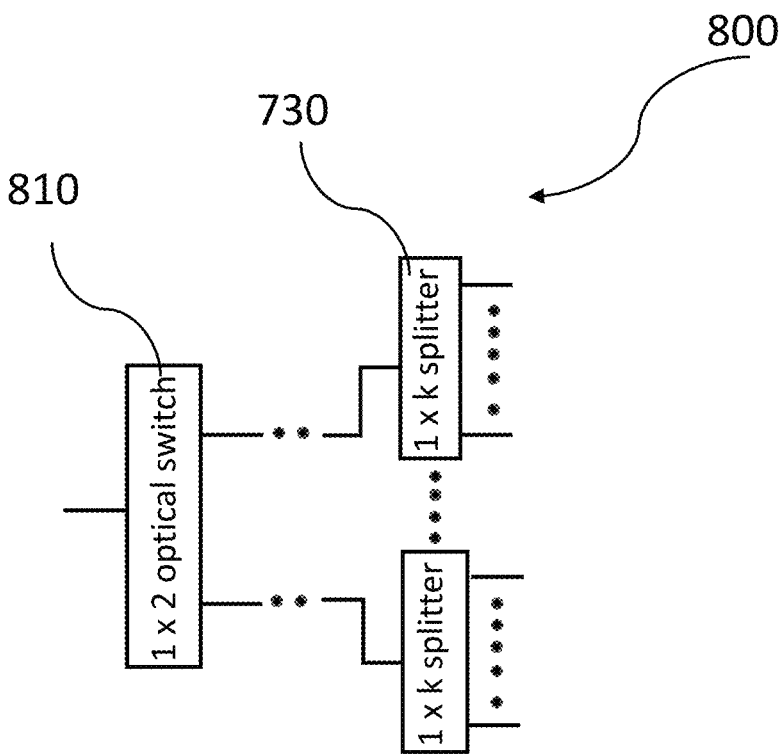
FIG. 8 is a diagram depicting an alternative embodiment of a light dispenser, according to aspects of embodiments of the present disclosure.

FIG. 8 is a diagram depicting a light dispenser, according to aspects of embodiments of the present disclosure. The light dispenser 800 may, in some embodiments, include S-stages of 1×2 optical switches 810 and 1×k optical splitters 82730 in combination with a 1×2 optical switch 810 as the first stage.

Figure 9:
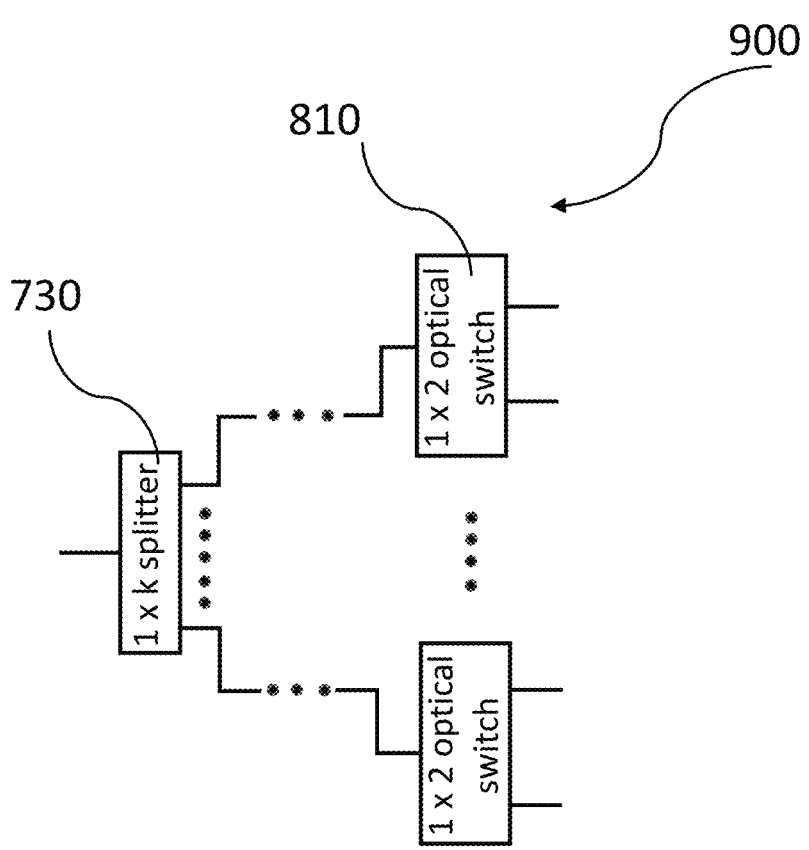
FIG. 9 is a diagram depicting another alternative embodiment of a light dispenser, according to aspects of embodiments of the present disclosure.

FIG. 9 is a diagram depicting an alternative embodiment of a light dispenser, according to aspects of embodiments of the present disclosure. The light dispenser 900 may, in some embodiments, include S-stages of 1×k optical splitters and 1×2 optical switches 810 in combination with a 1×k optical splitter 730 as the first stage.

iii. Chained Optical Switch Array

In some embodiments of a silicon photonics integrated beam steering device of the present disclosure, the subsequent subsection or "region" of the device may be an M×N optical switch array. The M×N optical switch array may, in some embodiments, include M rows and N columns of 1×2 optical switches with a termination light absorber (or a detector) at the end of each row of the 1×2 optical switches. In some other embodiments, control circuits/electrodes may be included to control the operation of each optical switch of the optical switch array. This may, in such embodiments, allow each of the optical switches to selectively transmit an incoming beam of light to one or both their outputs in response to a control voltage applied to the corresponding control circuit of each optical switch.

In some embodiments of the M×N optical switch array region, a 1×2 optical switch has at least one input waveguide, called port_0, and two output waveguides, called port_1 and port_2. For ease of description, hereinafter port_1 is defined as the upper port and port_2 is defined as the bottom port in each 1×2 optical switch (as shown in FIG. 10).

FIG. 10 is a simplified diagram depicting an optical switch having a pair of 3 dB directional couplers, according to aspects of embodiments of the present disclosure. As shown, an optical switch 1000 of the present disclosure may, in some embodiments, include a Mach-Zehnder Interferometer (MZI) with 3 dB directional couplers 1010 and 1011. The optical switch may, in some embodiments, include two heaters with two pairs of electrodes, TRow/TCol and Row/Col, and two output waveguide ports.

As a non-limiting example of the operation of the 1×2 optical switches, each output waveguide, port_1 or port_2, may have two states: "ON" and "OFF". In the "ON" state, the output waveguide has light in it, or light goes out of the port; and, in the "OFF" state, the output waveguide has no light (or substantially no light) in it or no light (or substantially no light) goes out the port.

In some embodiments, the 1×2 optical switches may include a balanced Mach-Zehnder Interferometer (MZI) that has two arms which have the same optical path lengths with a phase difference of zero degree at an initial state in which 100% optical power from input port_0 goes to port_2, so that the port_2 is in "ON" state and port_1 is in "OFF" state. During switch operation, in some embodiments, a phase difference, caused by either thermal-optic (TO) effect or electro-optical (EO) effect, may be introduced between the two arms so that a part of the optical power in the port_2 switches to port_1. In such embodiments, when the phase difference is 180 degrees, the optical power in the port_2 entirely switches to port_1 such that port_1 is in the "ON" state and port_2 is in the "OFF" state. When the phase difference is less 180 degrees, in these embodiments, some percentage of optical power switches to port_1 such that fraction of the input optical power is transmitted to both port_1 and port_2, so both port_1 and port_2 are in a "Partial ON" state.

Further understanding of an optical switch operated by the thermal-optic (TO) effect according to the present disclosure can be had by reference to FIG. 11.

FIG. 11 is a cross-sectional view of an optical switch operated using a thermal-optic (TO) effect, according to aspects of embodiments of the present disclosure. As shown, optical switch with TO effect 1100 may, in some embodiments, include heater 1110 that may have two electrodes TRow and TCol, and heater 1120 has two electrodes Row and Col on top of the SOI rib waveguides.

As a non-limiting example, the balanced MZI in the optical switches of the present disclosure may include either a 1×2 multimode interferometer (MMI) and a 2×2 MMI (see FIG. 12 below), a pair of 2×2 3 dB directional couplers, or a 2×2 directional coupler with a full coupling length (see FIG. 13 below).

Figure 12:
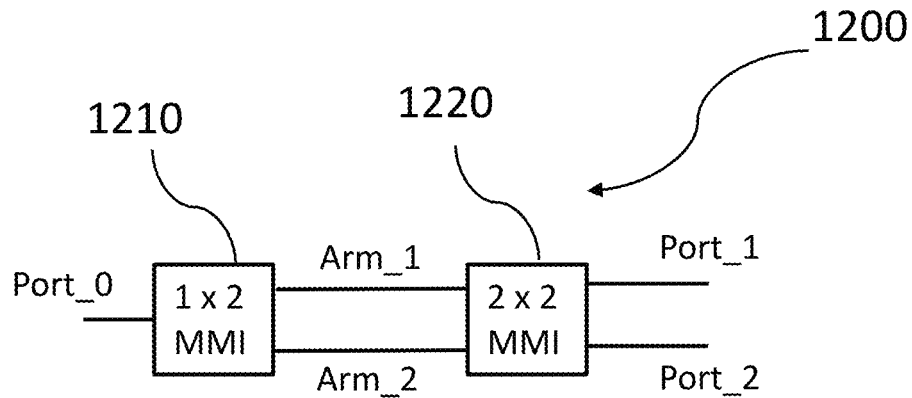
FIG. 12 is a simplified diagram depicting an alternative embodiment of an optical switch including a 1×2 multimode interferometer (MMI) and a 2×2 MMI, according to aspects of embodiments of the present disclosure.

FIG. 12 is a simplified diagram depicting an alternative embodiment of an optical switch including a 1×2 multimode interferometer (MMI) and a 2×2 MMI, according to aspects of embodiments of the present disclosure. As shown, in some embodiments, optical switch 1200 may include one 1×2 MMI 1210 and one 2×2 MMI 1220.

Figure 13:
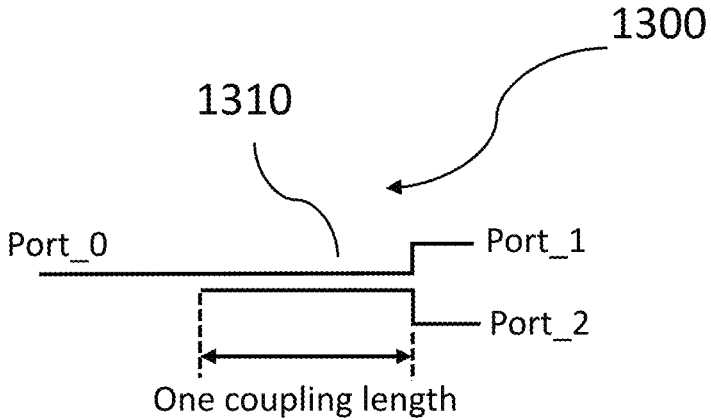
FIG. 13 is a diagram depicting another alternative embodiment of an optical switch including a 2×2 directional coupler with a full coupling length, according to aspects of embodiments of the present disclosure.

FIG. 13 is a diagram depicting another alternative embodiment of an optical switch including a 2×2 directional coupler with a full coupling length, according to aspects of embodiments of the present disclosure. As shown, in some embodiments, optical switch 1300 may include a 2×2 directional coupler with a full coupling length.

The operation of the chained switch array of the present disclosure may, in some embodiments, be modified for use with unbalanced optical switches. As a non-limiting example, in some other embodiments the 1×2 optical switches may include an unbalanced Mach-Zehnder Interferometer (MZI) that has two arms having different optical path lengths with a phase difference of 180 degree at initial state in which 100% optical power from input port_0 goes to port_1 such that the port_1 is in the "ON" state and port_2 is in the "OFF" state. For such embodiments, during switch operation, a phase difference, caused by either thermal-optic (TO) effect or electro-optical (EO) effect, may be introduced between the two arms causing a part of the optical power in port_1 to redirect to port_2. When the phase difference is 0 degree, in such embodiments, the optical power in port_1 may be completely redirected to port_2, so port_2 is in the "ON" state and port_1 is in the "OFF" state. Accordingly, when the phase difference is less 180 degrees, some percentage of the incoming optical power may be redirected to port_2 such that both port_1 and port_2 are in a "Partial ON" state.

As non-limiting examples, an unbalanced MZI of the present disclosure may include either a pair of 2×2 3 dB directional couplers (see FIG. 14 below), a 1×2 multimode interferometer (MMI) and a 2×2 MMI (see FIG. 15 below), or a 2×2 directional coupler with two full coupling lengths (see FIG. 16 below).

Figure 14:
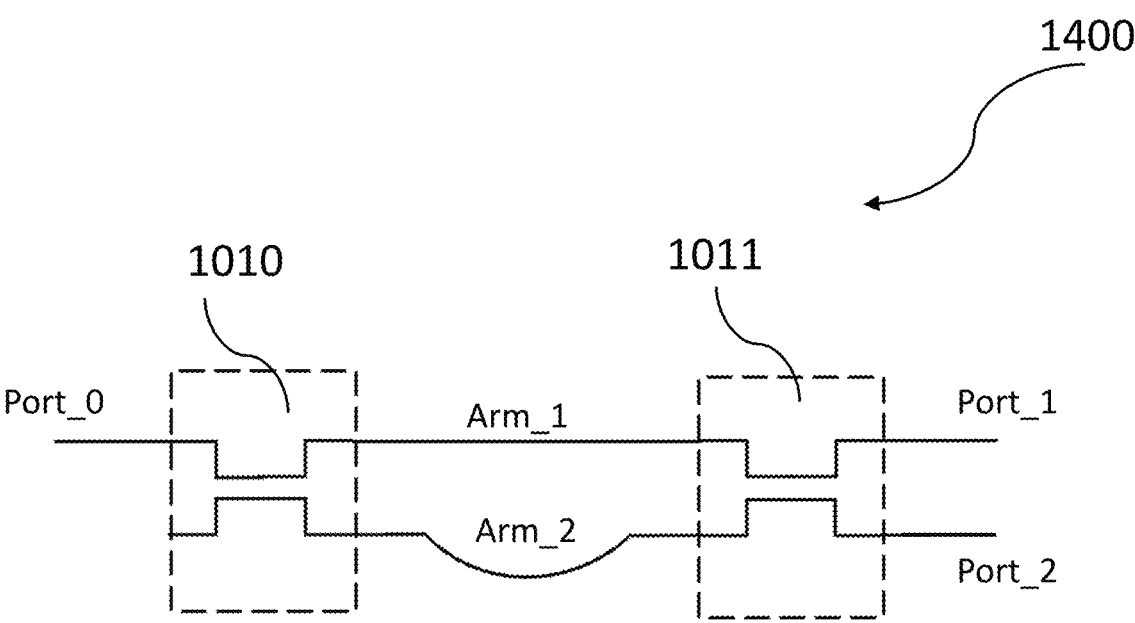
FIG. 14 is a simplified diagram depicting an embodiment of an unbalanced optical switch including a pair of 2×2 3 dB directional couplers, according to aspects of embodiments of the present disclosure.

FIG. 14 is a simplified diagram depicting an embodiment of an unbalanced optical switch including a pair of 2×2 3 dB directional couplers, according to aspects of embodiments of the present disclosure. As shown, in some embodiments, unbalanced optical switch 1400 may include two 3 dB directional couplers 1010 and 1011, and two arms with different lengths having a phase difference equal to 180 degrees.

Figure 15:
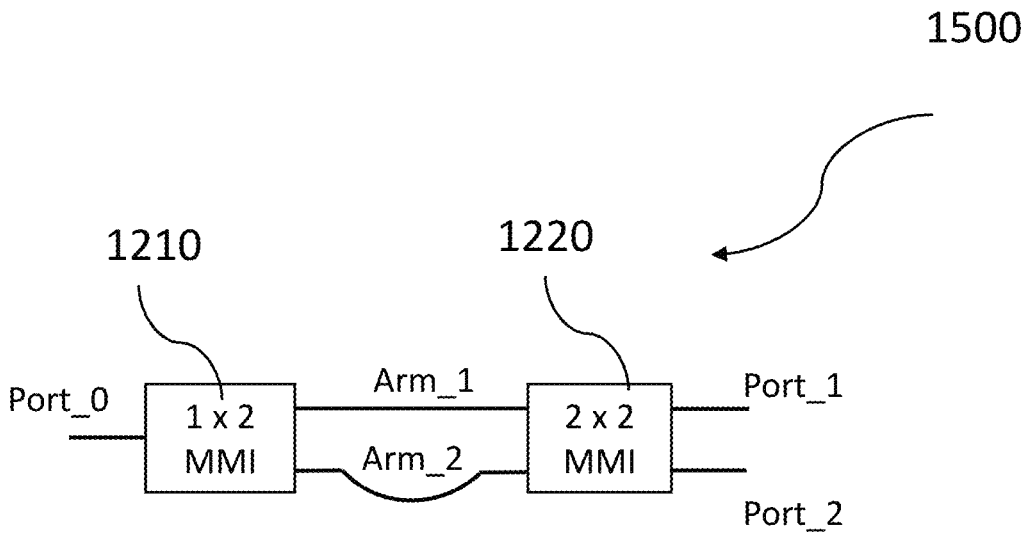
FIG. 15 is a simplified diagram depicting an alternative embodiment of an unbalanced optical switch including a 1×2 multimode interferometer (MMI) and a 2×2 MMI, according to aspects of embodiments of the present disclosure.

FIG. 15 is a simplified diagram depicting an alternative embodiment of an unbalanced optical switch including a 1×2 multimode interferometer (MMI) and a 2×2 MMI, according to aspects of embodiments of the present disclosure. As shown, in some embodiments, unbalanced optical switch 1500 may include one 1×2 MMI 1210 and one 2×2 MMI 1220 and two arms with different lengths having a phase difference equal to 180 degrees.

Figure 16:
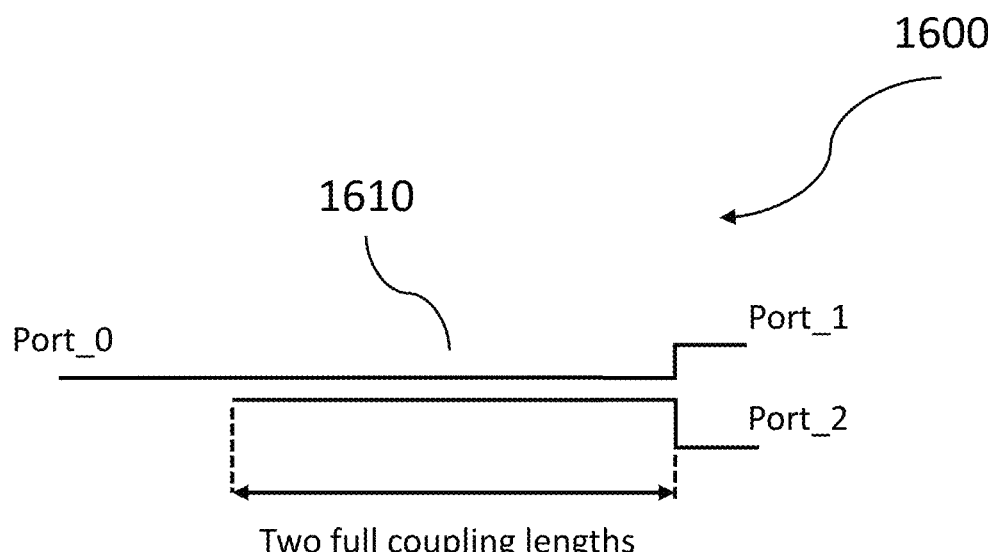
FIG. 16 is a simplified diagram depicting yet another alternative embodiment of an unbalanced optical switch including a 2×2 directional coupler with two full coupling lengths, according to aspects of embodiments of the present disclosure.

FIG. 16 is a simplified diagram depicting yet another alternative embodiment of an unbalanced optical switch including a 2×2 directional coupler with two full coupling lengths, according to aspects of embodiments of the present disclosure. As shown, in some embodiments, unbalanced optical switch 1600 may include a directional coupler with two full coupling lengths.

Continuing this non-limiting example, in a row of the chained optical switch array of the present disclosure, the optical switches including unbalanced MZIs may be connected such that the output waveguide port_1, which is in "ON" state in the initial state it may be connected to the input waveguide port_0 of the next optical switch to form an optical switch chain. In such an embodiment, the other output waveguide port_2, which may be in "OFF" state in its initial state, may be operably coupled using a waveguide to a pixel in the pixel array region. As such, in these embodiments, in the initial state there may be no light emitting from the pixel array.

In operation of the optical switches, in some embodiments, the optical phase difference between the two arms in the MZI changes from its initial value (zero degree for a balanced MZI, and 180 degrees for an unbalanced MZI) to a designated value, and the states ("ON", or "Partial ON", or "OFF") of the output waveguide ports will follow the change accordingly. The optical phase difference change between the two arms in the MZI may, in some embodiments, be caused by effective refractive index change of the arm waveguides either by thermal-optic (TO) effect, or by free carrier plasma dispersion (FCPD) effect, which may also be called the electro-optic (EO) effect.

The optical switches of the present disclosure, as described above for both balanced and unbalanced embodiments, include output ports configured to transmit a light emission from optical switch output ports to an emitter pixel array with a waveguide array.

In some embodiments, the waveguide array that operably couples the optical switch output waveguide port_1 and pixel units of the pixel array may have a different waveguide structure than that of optical waveguides in the MZI of the optical switches. As a non-limiting example, the waveguide of an MZI may be a rib waveguide, and the waveguide array may include strip waveguides. In some other embodiments, a waveguide transition structure may be used to connect the strip waveguide with the rib waveguide, or vice versa. As will be appreciated by one skilled in the art, both rib waveguides and strip waveguides may be also in an MZI of an optical switch. In order to increase the isolation between the waveguides in the waveguide array to reduce optical cross talk, strip waveguides and rib to strip waveguide transition structures may be used in the optical switch output ports and strip to rib waveguide transition structures before connecting the emitter pixel array. Further understanding of the construction of the output ports can be had by reference to the following figures: FIGS. 17-20.

Figure 17:
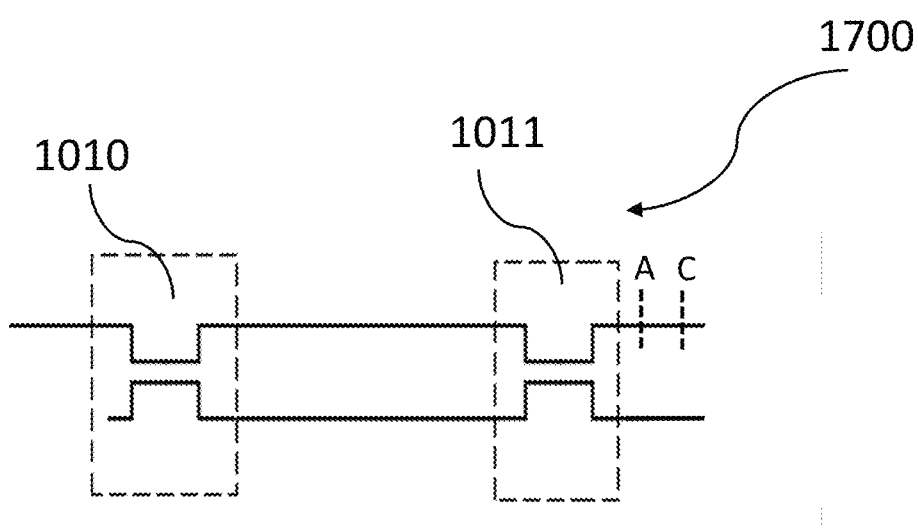
FIG. 17 is a simplified diagram depicting still another alternative embodiment of an optical switch, according to aspects of embodiments of the present disclosure.

FIG. 17 is a simplified diagram depicting still another alternative embodiment of an optical switch, according to aspects of embodiments of the present disclosure. As shown, in some embodiments, optical switch 1700 may include two 3 dB couplers 1010 and 1011 with rib waveguide at Cut A and strip waveguide at Cut C, and a rib to strip waveguide transition structure located between Cut A and Cut C.

Figure 18:
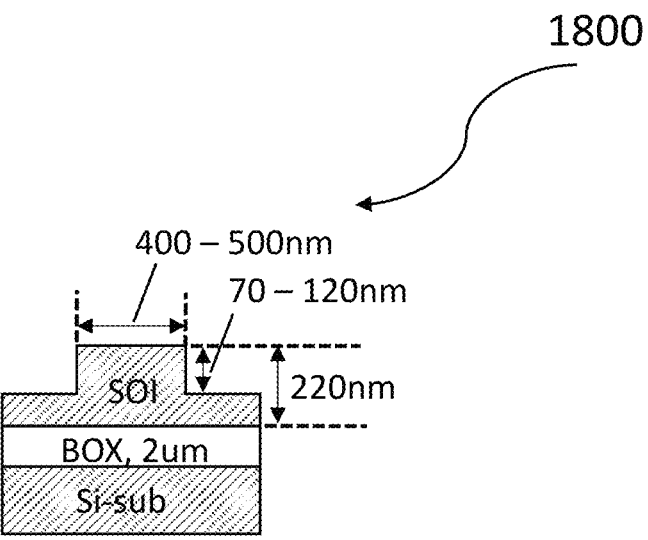
FIG. 18 is a cross-sectional view of an output port rib waveguide of an optical switch, according to aspects of embodiments of the present disclosure.

FIG. 18 is a cross-sectional view of rib waveguide of an output port of an optical switch, according to aspects of embodiments of the present disclosure. As shown, in some embodiments, the rib waveguide 1800 at Cut A (as shown in FIG. 17) may have an SOI thickness of 220 nm with a BOX layer of 2 um. In some embodiments, the waveguide width may be 400-500 nm, and the rib thickness may be 70-120 nm. As will be appreciated by one skilled in the art, the dimensions provided above are intended to be non-limiting and the exact dimensions of any embodiments may be varied according to the design needs of the user.

Figure 19:
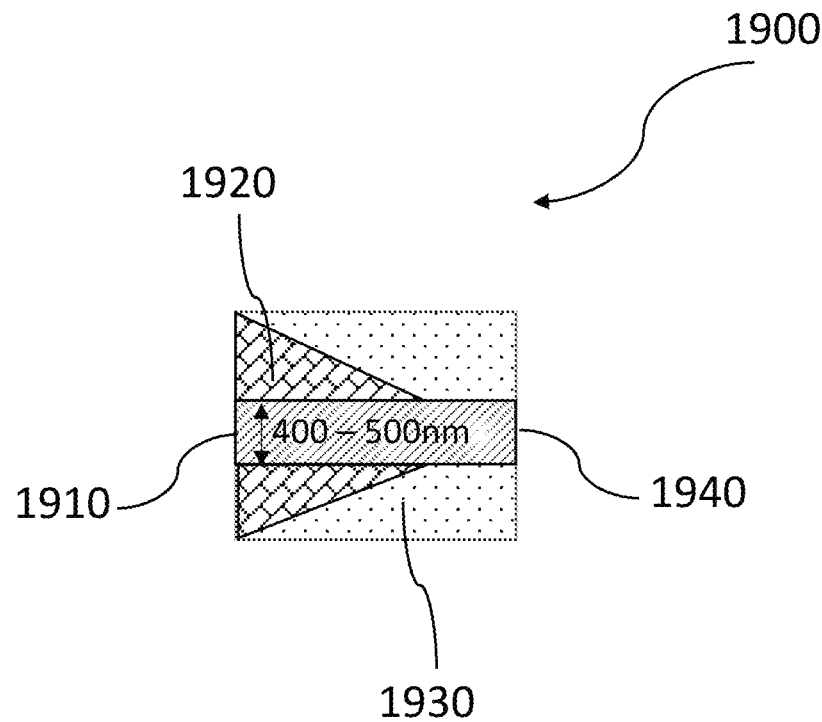
FIG. 19 is a top-down view of a rib to strip waveguide transition structure of an output port of an optical switch, according to aspects of embodiments of the present disclosure.

FIG. 19 is a top-down view of a rib to strip waveguide transition structure of an output port of an optical switch, according to aspects of embodiments of the present disclosure. As shown, in some embodiments, the rib to strip transition waveguide structure 1900 may have a constant waveguide width 400-500 nm. In some embodiments, the left interface 1910 may have a rib waveguide structure similar to that shown in FIG. 18 at Cut A with a waveguide slab 1920 whose thickness is 100-150 nm. The right interface 1940 may, in some embodiments, have a strip waveguide structure of that at Cut C (as shown in FIG. 17) with a waveguide slab 1930 whose thickness is 50 nm. The optical loss of this waveguide transition structure in some embodiments, be negligible. As will be appreciated by one skilled in the art, the dimensions provided above are intended to be non-limiting and the exact dimensions of any embodiments may be varied according to the design needs of the user.

Figure 20:
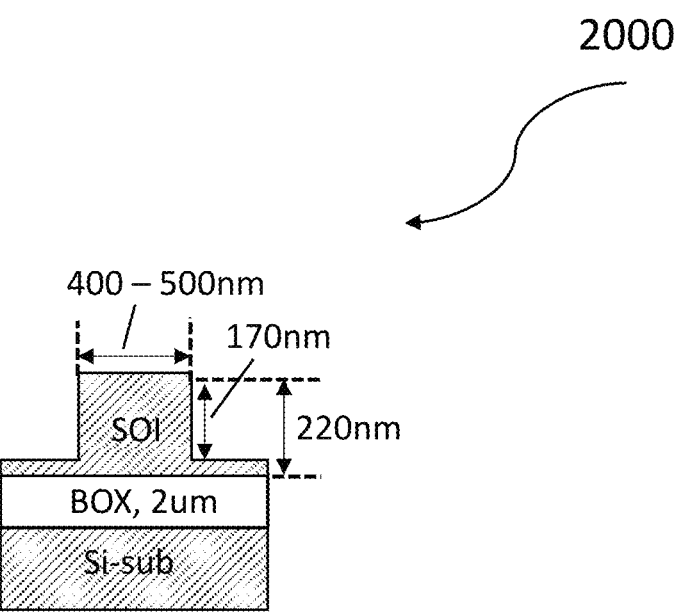
FIG. 20 is a cross-sectional view of an output port strip waveguide of an optical switch, according to aspects of embodiments of the present disclosure.

FIG. 20 is a cross-sectional view of strip waveguide of an output port of an optical switch, according to aspects of embodiments of the present disclosure. As shown, in some embodiments, the strip waveguide 2000 may have an SOI thickness of 220 nm with a BOX layer of 2 um. The waveguide width may, in some embodiments, be 400-500 nm, and the strip thickness may be 170 nm with a slab thickness of 50 nm. As will be appreciated by one skilled in the art, the dimensions provided above are intended to be non-limiting and the exact dimensions of any embodiments may be varied according to the design needs of the user.

As will be appreciated by one skilled in the art, the scope of the present disclosure may include embodiments of the M×N chained optical switch arrays having balanced optical switches, unbalanced optical switches, or any combination thereof.

Further understanding of the "chained" arrangement of the optical switches in the chained optical switch array of the present disclosure may be had by reference to the following figures: FIGS. 21-26.

Figure 21:
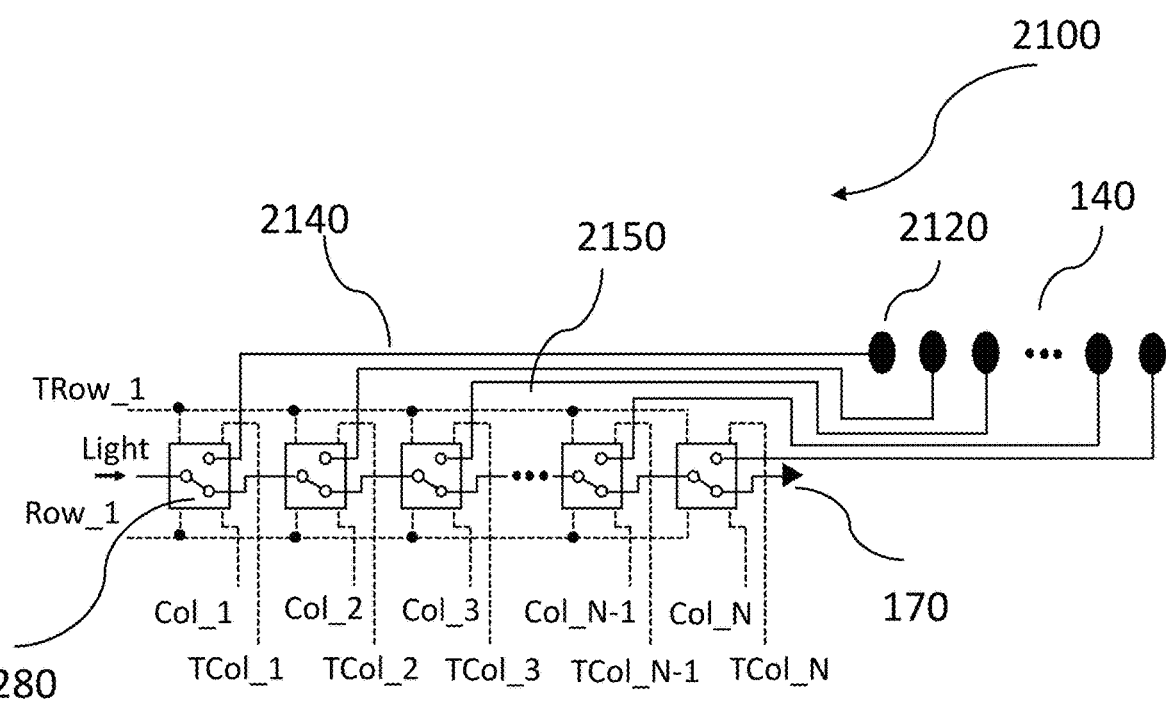
FIG. 21 is a diagram depicting a single row of a chained optical switch array operably coupled to a pixel array, according to aspects of embodiments of the present disclosure.

FIG. 21 is a diagram depicting a single row of a chained optical switch array operably coupled to a pixel array, according to aspects of embodiments of the present disclosure. As shown, in some embodiments, the chained optical switch array 2100 may include the M rows of the M×N chained optical switch array. Each of the m-rows of the optical switch array 2150 may, in some embodiments, have N optical switches, and, in some other embodiments, a pixel array 140 may have N pixels (also referred to herein as "pixel units"), which may be arranged individually in a row side by side. In some embodiments, optical switch 280 may have an input waveguide, called port_0, and two output waveguides, called port_1 and port_2, where port_1 is the upper port and port_2 is the lower port. The output waveguide port_2 of an optical switch 280 may, in some embodiments, connect to the input waveguide port_0 of the next optical switch to form an optical switch "chain," and the output waveguide port_1 may be connected a pixel 2120 in the pixels array 140 using a waveguide 2140. The output waveguide port_2 of the last, or the Nth optical switch in the row, may, in some embodiments, be terminated with absorber or photodetector 2130. In some embodiments, each optical switch may have two pairs of electrodes, TRow/TCol and Row/Col. The Row and TRow electrodes of all the optical switches may, in some embodiments, be connected to form two common electrodes for the first row, Row_1 and TRow_1, and the other electrodes, Col_1, Col_2, Col_3, . . . Col_N−1, Col_N and TCol_1, TCol_2, TCol_3, . . . TCol_N−1 and TCol_N remain separate, i.e., for a single row of chained optical switches, only the Row and TRow electrodes in such embodiments may be connected to form common electrodes while the Col and TCol electrodes for each column stay (or remain) separate as there is only one optical switch in each column in a single row. However, in some embodiments having multiple rows, the Col and TCOI in each column may be connected to form common Col and Tcol electrodes in a column, as in an M×N array.

In some embodiments, as described previously, control circuitry may be used to individually control the operating state of the individual optical switches of the chained optical switch array. In some of these embodiments, within the chained M×N optical switch array, each optical switch may have two pairs of electrodes for operating. One pair of the electrodes, in some embodiments, may have one electrode called Row and another electrode called Col. This pair (Row/Col) of electrodes may, in some of these embodiments, be used for switching the states ("ON/Partial ON/OFF" states) of output waveguide port_1 and port_2. The second pair of the electrodes may have, in some embodiments, one electrode call TRow and the other electrode called TCol. This pair (TRow/TCol) of electrodes, in some of these embodiments, may be used for tuning/biasing (or otherwise preparing) the initial states of each optical switch's output waveguide port_1 and port_2 to the designed initial states because each optical switch may independently be away from the designed initial states due to fabrication process tolerances and errors, i.e., each optical switch may have its own "operating characteristic."

Figure 22:
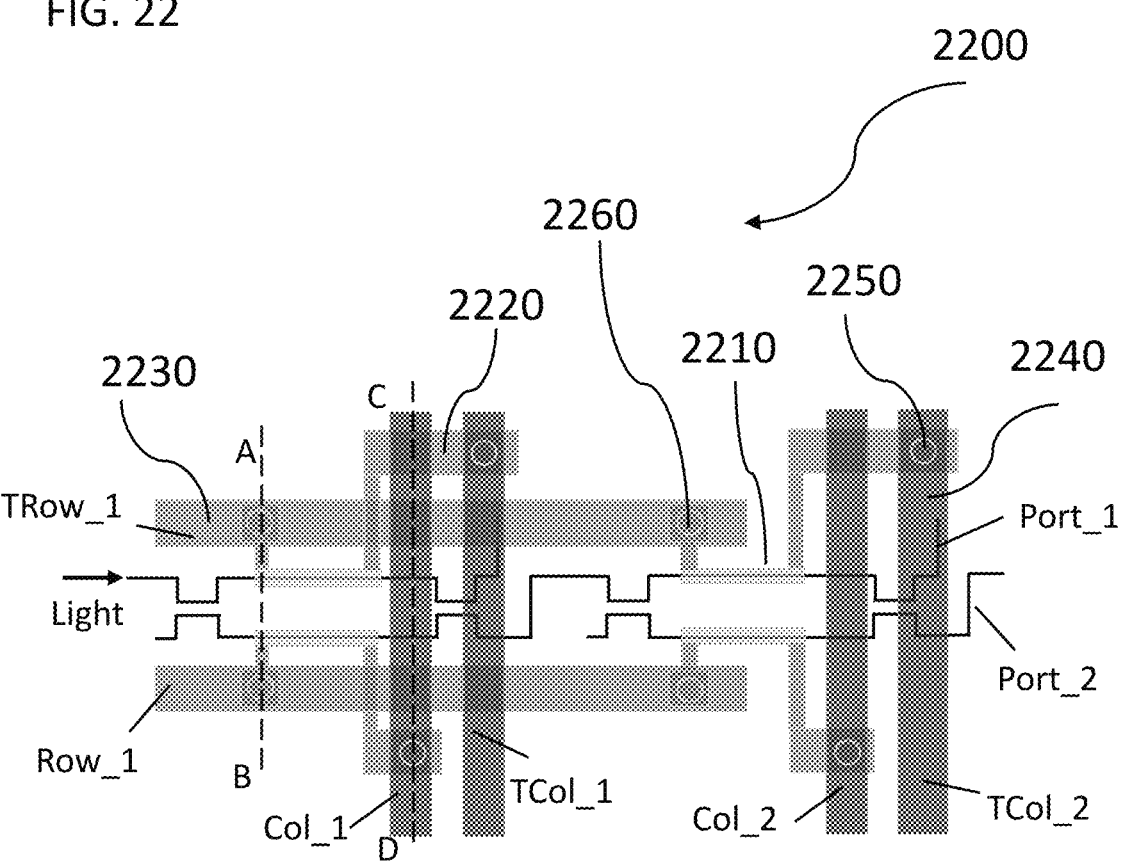
FIG. 22 is a diagram depicting a 1×2 chained optical switch array operated by a thermal-optic (TO) effect having row and column control circuits, according to aspects of embodiments of the present disclosure.

FIG. 22 is a diagram depicting a layout of two 1×2 chained optical switch array operated by a thermal-optic (TO) effect having row and column control circuits, according to aspects of embodiments of the present disclosure. As shown, in some embodiments, the chained optical switch array 2200 may have, for the first two optical switches in the first row, heater 2210 fabricated on top of the MZI waveguide arms (as a phase shifter). The heater material may, in some embodiments, be Ti, TiN, TiW, or NCr. In some embodiments, the heater on the top arm may be for tuning the initial state, and the heater on the bottom arm may be for switch operation. Beside the heater, in some embodiments, there may be one or more Aluminum metal layers for electrode routing. As a non-limiting example, for an embodiment having 3 Al metal layers, the 1st Al layer 2220 may be for heater pads, which may be deposited and fabricated at the same time as that of heater metal layer, the 2nd Al layer 2230 may be for the Row and TRow electrodes, and the 3rd Al layer 2240 may be for Col and TCol electrodes as well as for Row and TRow contact pads. In some embodiments, the circle 2250 may be the via (or "duct") that connects metal layers 2220 and 2240, and the circle 2260 may be the via (or "duct") that connects metal layers 2220 and 2230. In some embodiments, when voltage is applied across the bottom heater of an optical switch, the temperature of the bottom arm of its MZI increases, which may induce a change in the bottom arm waveguide's effective index, thereby changing the phase difference between the two arms of MZI that switches the light from one output waveguide port to the other output waveguide port.

Figure 23:
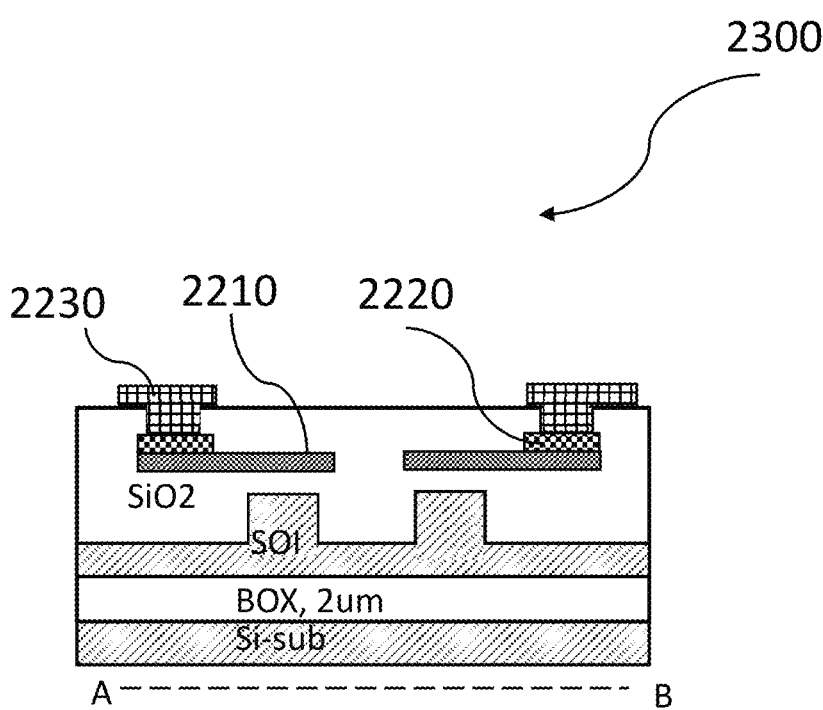
FIG. 23 is a cross-sectional view of an optical switch operated by a thermal-optic (TO) effect having a row control circuit, according to aspects of embodiments of the present disclosure.

FIG. 23 is a cross-sectional view of an optical switch operated by a thermal-optic (TO) effect having a row control circuit, according to aspects of embodiments of the present disclosure. The optical switch section view of 2300, in some embodiments, may be along the AB cut depicted in FIG. 22. Metal layer 2210 may, in some embodiments, be a heater, metal layer 2220 may be the first aluminum layer for heater pads, and metal layer 2230 may be TRow and Row electrodes.

Figure 24:
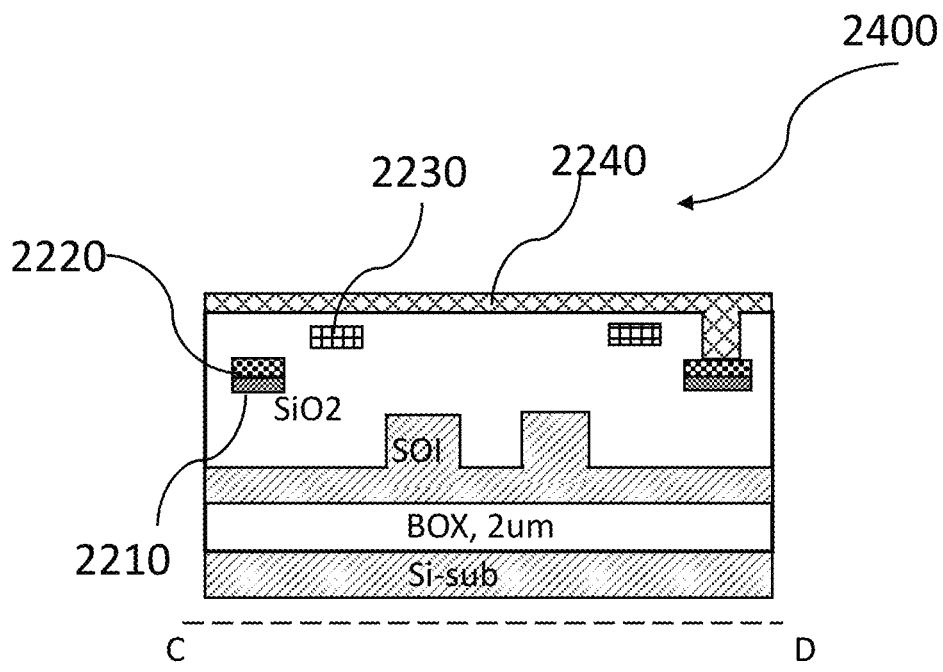
FIG. 24 is a cross-sectional view of an optical switch operated by a thermal-optic (TO) effect having a row control circuit and a column control circuit, according to aspects of embodiments of the present disclosure.

FIG. 24 is a cross-sectional view of an optical switch operated by a thermal-optic (TO) effect having a row control circuit and a column control circuit, according to aspects of embodiments of the present disclosure. As shown, the optical switch 2400, in some embodiments, may include other elements along the CD cut depicted in FIG. 22. As a non-limiting example, metal layer 2210 may be a heater, metal layer 2220 may be the first aluminum layer for heater pads, and metal layer 2230 may be TROw and Row electrodes and metal layer 2240 may be for TCol and Col electrodes.

Figure 25:
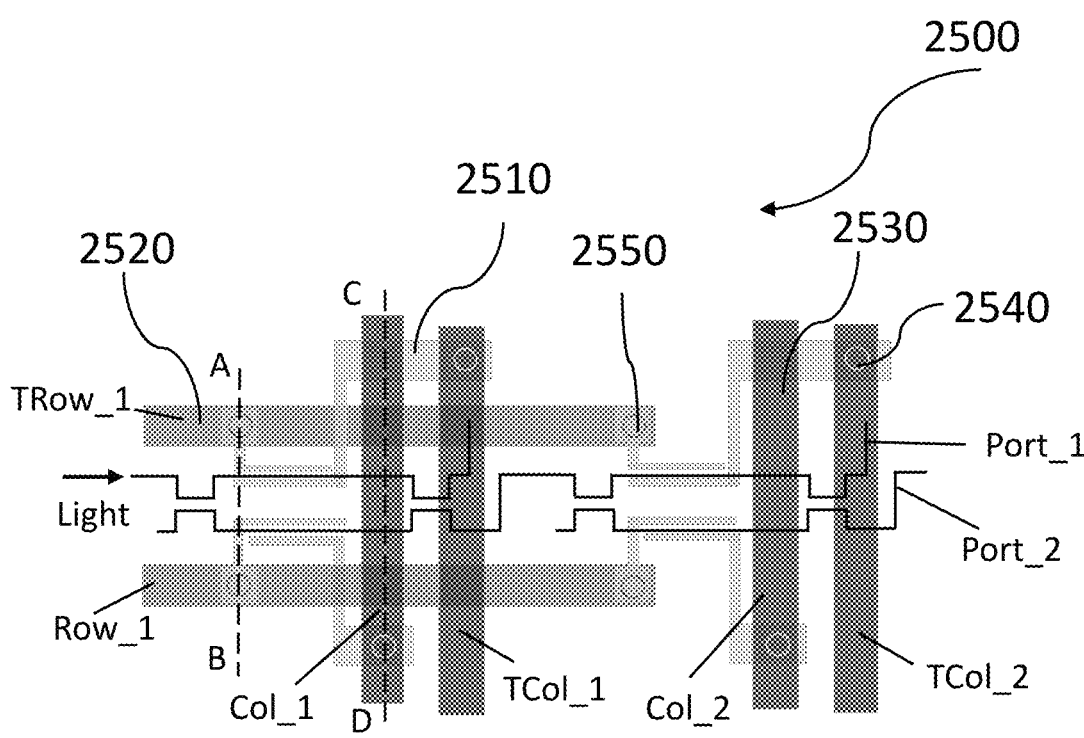
FIG. 25 is a diagram depicting 1×2 chained optical switch array operated by an electro-optic effect having row and column control circuits, according to aspects of embodiments of the present disclosure.

FIG. 25 is a diagram depicting a layout of two 1×2 chained optical switch array operated by an electro-optic effect having row and column control circuits, according to aspects of embodiments of the present disclosure. In some embodiments, the chained optical switch array 2500 may include a PIN junction that may be fabricated in the MZI waveguide arm as phase shifter, and P+ and N+ regions may be fabricated for metal contacts. In some embodiments, electrode pairs may be provided to inject carriers into the PIN junctions. The electrode pairs on the top arms may, in some embodiments, be for adjusting the initial state, and the electrode pair on the bottom arms may be for switch operation. In some embodiments, there may be three Aluminum metal layers for optical switch electrode routing. As a non-limiting example, the 1st Al layer 2510 may be for N and P electrodes and their pads, the 2nd Al layer 2520 may be for the Row and TRow electrodes, and the 3rd Al layer 2530 may be for Col and TCol electrodes, as well as for Row and TRow contact pads. In some embodiments, the circle 2540 may be the via that connects metal layers 25100 and 25300, and the circle 2550 may be the via that connects metal layers 2510 and 2520. In some embodiments, when voltage is provided cross the electrode pair on the bottom arm of optical switch, carriers may be injected into the PIN junction, which changes waveguide's effective index, therefore changes the phase difference between the two arms of MZI that switches the light from one output waveguide port to the other output waveguide port. As such, in some embodiments, the optical switches may be switched from one state into another in response to a voltage, i.e., a control voltage, being applied to the optical switch.

Figure 26:
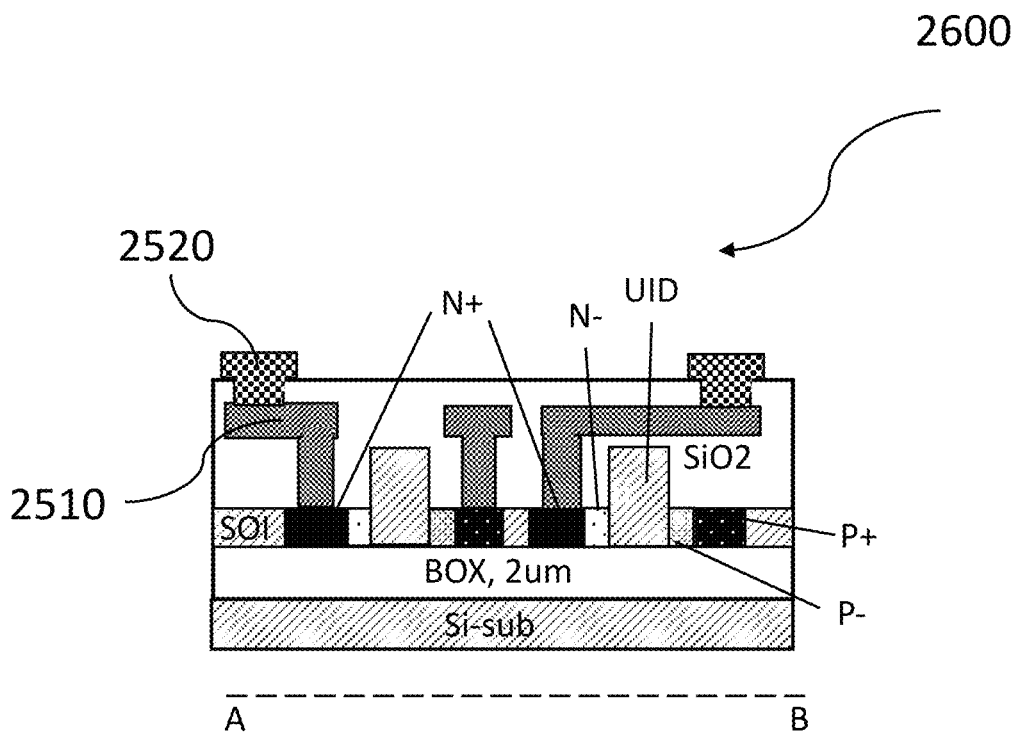
FIG. 26 is a cross-sectional view of an optical switch operated by an electro-optic effect having a row control circuit according to aspects of embodiments of the present disclosure.

FIG. 26 is a cross-sectional view of an optical switch operated by an electro-optic effect having a row control circuit according to aspects of embodiments of the present disclosure. In some embodiments, optical switch 2600 may be along the AB cut depicted in FIG. 25. The silicon waveguide may, in some embodiments, include N+/N–/UID/P–/P+ regions. In some embodiments, metal layer 2510 may be for PIN junction electrodes, and metal layer 2520 may be for TRow and Row electrodes.

Figure 27:
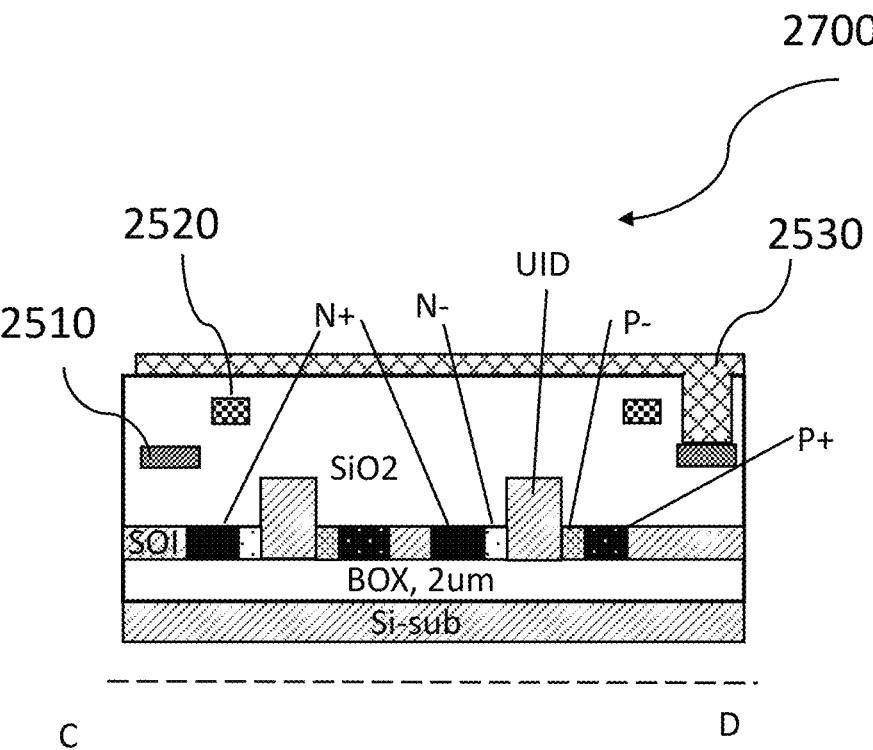
FIG. 27 is a cross-sectional view of an optical switch operated by an electro-optic effect having a row control circuit and a column control circuit, according to aspects of embodiments of the present disclosure.

FIG. 27 is a cross-sectional view of an optical switch operated by an electro-optic effect having a row control circuit and a column control circuit, according to aspects of embodiments of the present disclosure. In some embodiments, optical switch 2700 may be along the CD cut depicted in FIG. 25. The metal layer 2510 may, in some embodiments, be for PIN junction electrodes, metal layer 2520 may be for TRow and Row electrodes, and metal layer 2530 may be for TCol and Col electrodes.

As depicted, in some embodiments, within a row of the chained optical switch array, the Row and TRow electrodes of the optical switches in the N columns of the chained optical switch array may be connected and called Row_y and TRow_y. Here y represents any of M rows.

Similarly, in some embodiments, within a column of the chained optical switch array, the Col and TCol electrodes of the optical switches in the M rows may be connected and called Col_x and TCol_x. Here x represents any of N columns.

In some embodiments of the M×N chained optical switch array of the present disclosure, there may be a total of 2×(M+N) electrodes. In some other embodiments, the total number of electrodes may be reduced by using CMOS digital addressing circuits. As a non-limiting example, in an embodiment having a 64×64 chained optical switch array, M=N=64, the 64 row or column positions can be addressed by 6 digits (111111) in a binary system. Therefore, in such embodiments, only 6 electrodes are needed for controlling the 64 electrodes in each row or column, and the total electrode number may be reduced from 2×(64+64)=256 to 2×(6+6)=24 electrodes for the 64×64 chained optical switch array.

Figure 28:
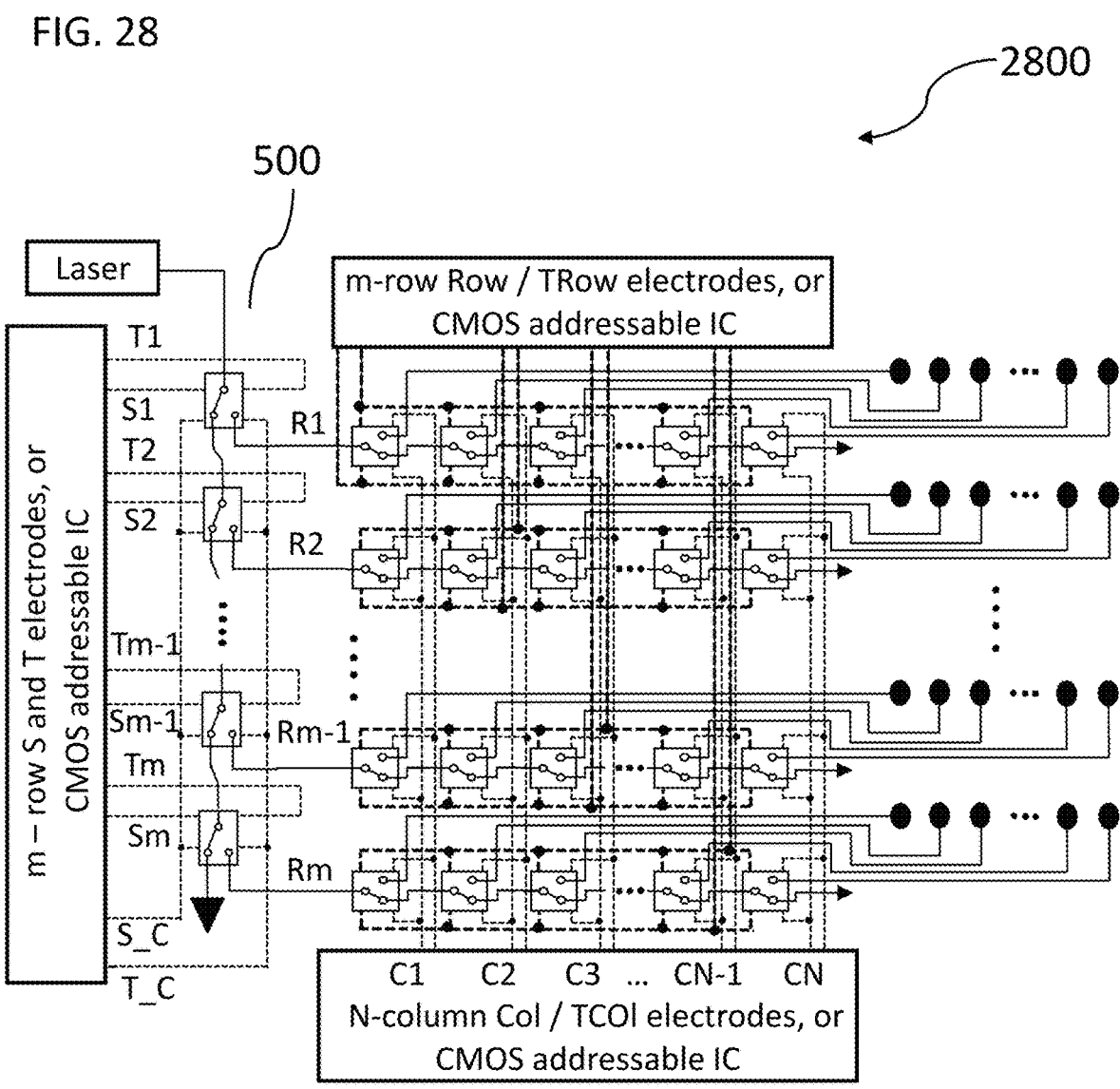
FIG. 28 is a diagram depicting an alternative embodiment of a silicon photonics integrated beam steering device having a M×N chained optical switch array operably coupled to a pixel array, according to aspects of embodiments of the present disclosure.
Figure 29:
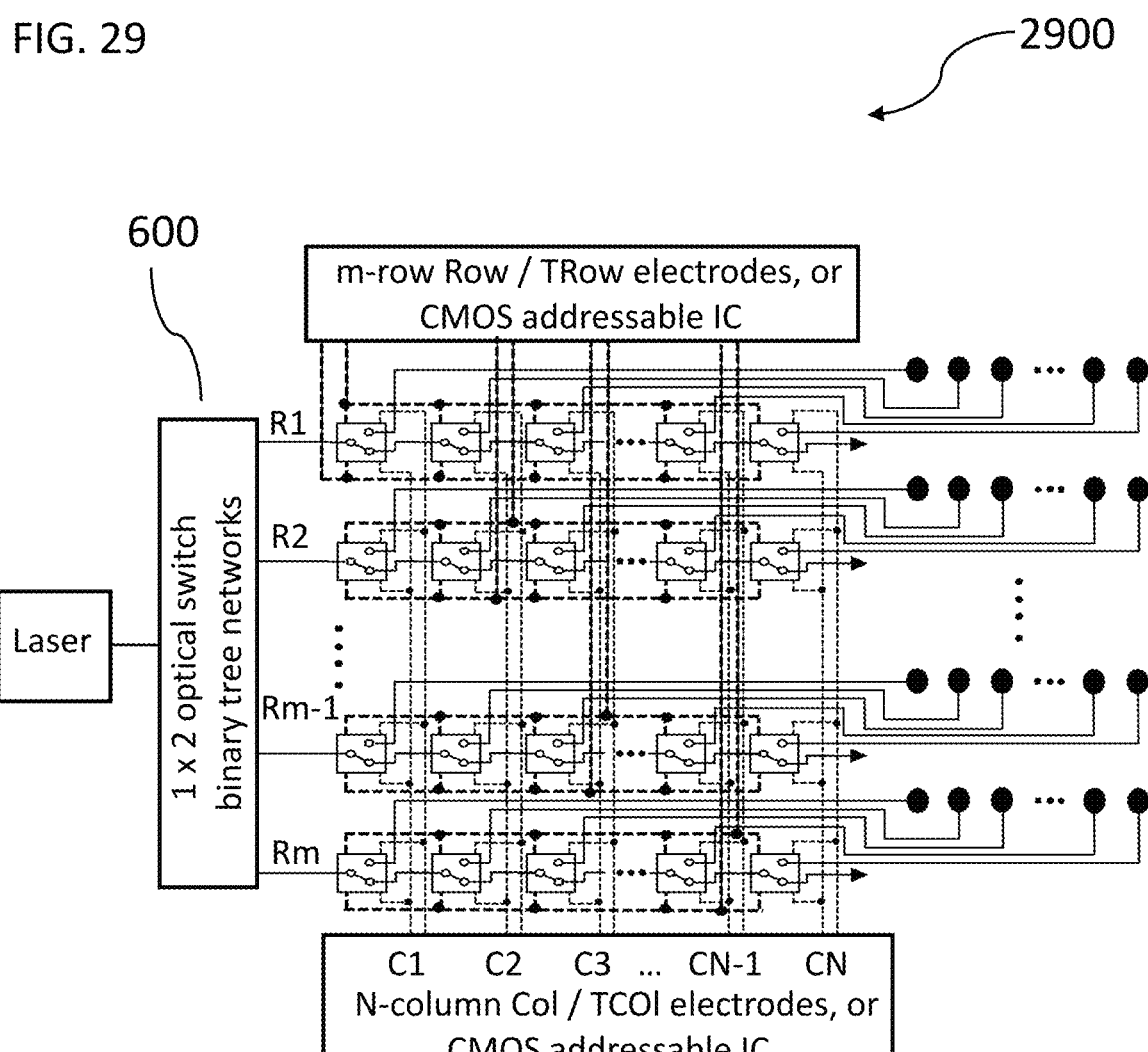
FIG. 29 is a diagram depicting another alternative embodiment of a silicon photonics integrated beam steering device having a M×N chained optical switch array operably coupled to a pixel array, according to aspects of embodiments of the present disclosure.
Figure 30:
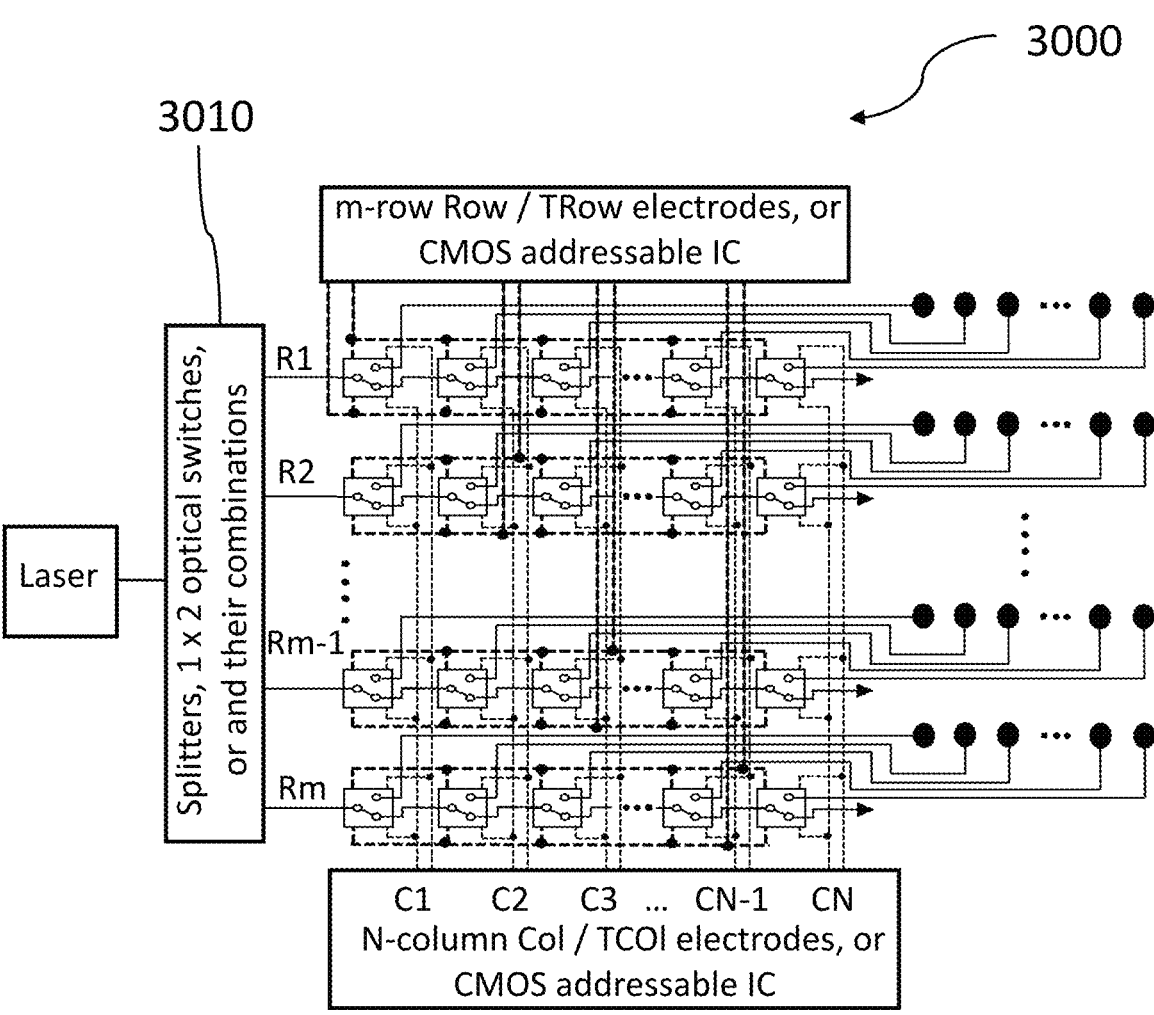
FIG. 30 is a diagram depicting yet another alternative embodiment of a silicon photonics integrated beam steering device having a M×N chained optical switch array operably coupled to a pixel array, according to aspects of embodiments of the present disclosure.

As will be appreciated by one skilled in the art, the control circuitry described above can be used within many embodiments of the silicon photonics integrated beam steering device of the present disclosure. Further understanding of alternate embodiments of the silicon photonics integrated beam steering device including control circuitry for the optical switch arrays may be further understood by reference to the following figures: FIGS. 28-30.

A FIG. 28 is a diagram depicting an alternative embodiment of a silicon photonics integrated beam steering device having a light dispenser that includes a vertical optical switch chain and a M×N chained optical switch array operably coupled to a pixel array, according to aspects of embodiments of the present disclosure. Recalling the embodiment of the silicon photonics integrated beam steering device 100 of FIG. 1, in some embodiments, the silicon photonics integrated beam steering device 2800 of the present disclosure may include a "vertical" optical switch chain 500 as the light dispenser which may be similar to the light dispenser as shown in FIG. 5.

In such embodiments, the light dispenser may include a vertical optical switch chain with m optical switches for the M×N chained optical switch array. In the vertical optical switch chain, each optical switch may have two pairs of electrodes. One pair of the electrodes may be configured for tuning optical switch to the initial state, and the other pair of the electrodes may be configured for optical switch operation. In such embodiments, each pair of electrodes may have one row electrode and one column electrode. For the tuning electrodes, all the column electrodes of the optical switches may, in some embodiments, be connected. For the switch operation electrodes, all the column electrodes of the optical switches may, in some embodiments, be connected. Therefore, there may, in some embodiments, be a total of 2m+2 electrodes for the vertical optical switch chain. By using CMOS digital, as a non-limiting example, for an embodiment where m=64, the switches can be addressed by 6 digits (111111) in a binary system. Therefore, only 6 electrodes are needed for controlling the 64 electrodes, and the total electrode number may be reduced from 2×64+2=130 to 2×6+2=14 electrodes.

FIG. 29 is a diagram depicting another alternative embodiment of a silicon photonics integrated beam steering device having a M×N chained optical switch array operably coupled to a pixel array, according to aspects of embodiments of the present disclosure. In some embodiments, Device 2900 may include a 1×2 optical switch binary tree networks 600 as the light dispenser, which may be the similar to the light dispenser as shown in FIG. 6.

FIG. 30 is a diagram depicting yet another alternative embodiment of a silicon photonics integrated beam steering device having a M×N chained optical switch array operably coupled to a pixel array, according to aspects of embodiments of the present disclosure. As shown, in some embodiments, Device 3000 may include splitters, 1×2 optical switches, and/or combinations thereof in the light dispenser which may be the same as those shown in FIG. 7, FIG. 8 and FIG. 9.

In another non-limiting embodiment, in a column of the optical switches of the chained optical switch array, the m rows Col electrodes may be connected and called Col_x, the odd TCol electrodes of the m-row TCol electrodes may be connected and called TCol_x_O, and the even TCol electrodes of the m-row TCol electrodes may be connected and called TCol_x_E. Here x represents any of N columns.

iv. Pixel Array

Aspects of embodiments of the present disclosure may be directed to pixel arrays operably coupled to the M×N chained optical switch array. For ease of explanation, the remainder of the section will refer to only emitter pixels, i.e., pixels intended to transmit light out of a waveguide, within the various pixel array embodiments. However, the present disclosure is not limited to only embodiments having emitter pixels. The use of photo-acoustic sensors, i.e., imaging pixels, is also expressly within the scope of the present disclosure and such embodiments are described in a later section.

In some embodiments, a 2-Dimensional M×N pixel array may be used. In some of these embodiments, the pixels in each row may be arranged either in the same sequence as that of the optical switches in the chained optical switch array (from left to right, the $1^{st}$ emitter pixel connects to output waveguide port_1 of the 1st 1×2 optical switch), or, in some other embodiments, in the opposite sequence (the $1^{st}$ emitter pixel connects to output waveguide port_1 of the Nth 1×2 optical switch).

The number of pixels in the M×N pixel array may, in some embodiments, be the same as the number of the optical switches in the chained optical switch array. As a non-limiting example, the pixel array may be 16×16, 32×32, 64×64, 128×128, 256×256 512×512, 1024×1024, or 2048× 2048 depending on the device requirements, the designs of optical switches and pixels, and the waveguide optical loss.

As a non-limiting example, in an M×N pixel array, the emitter pixels may have a pitch of 15 um-70 um in horizontal direction and a pitch of 25-70 um in vertical direction depending on the light emitter pixel array size. As will be appreciated by one skilled in the art, the dimensions provided above are intended to be non-limiting and the exact dimensions of any embodiments may be varied according to the design needs of the user.

The emitter pixels may, in some embodiments, include either a waveguide grating coupler, or a 45-degree facet reflection mirror, or a 45-degree facet reflection mirror with a micro-lens for light collimation. Further understanding of the various embodiments of the emitter pixels may be had by reference to the following figures: FIGS. 31-40.

Figure 31:
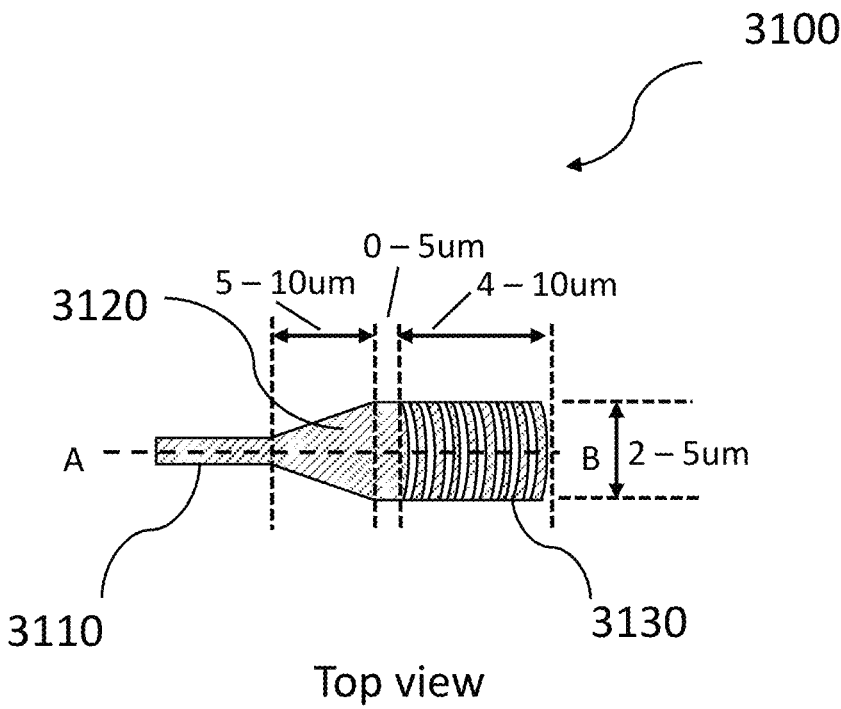
FIG. 31 is a top-down view of an emitter pixel, according to aspects of embodiments of the present disclosure.

FIG. 31 is a top-down view of an emitter pixel, according to aspects of embodiments of the present disclosure. In some embodiments, an emitter pixel 3100 may include three elements: input waveguide 3110; symmetrical taper 3120; and grating coupler 3130. In some embodiments, input waveguide 3110 may be a rib waveguide as shown in FIG. 18 with a waveguide width of 400-500 nm. In some embodiments, the taper 3120 may include two parts. The first part of the taper may change the waveguide width from, as a non-limiting example, 400-500 nm to 2-5 um over 5-10 um in length, and the second part of the taper may maintain 2-5 um waveguide width with a length of 0-5 um. The grating coupler 3130 may, in some embodiments, have a waveguide width of 2-5 um with a length of 4-10 um. As will be appreciated by one skilled in the art, the dimensions provided above are intended to be non-limiting and the exact dimensions of any embodiments may be varied according to the design needs of the user.

Figure 32:
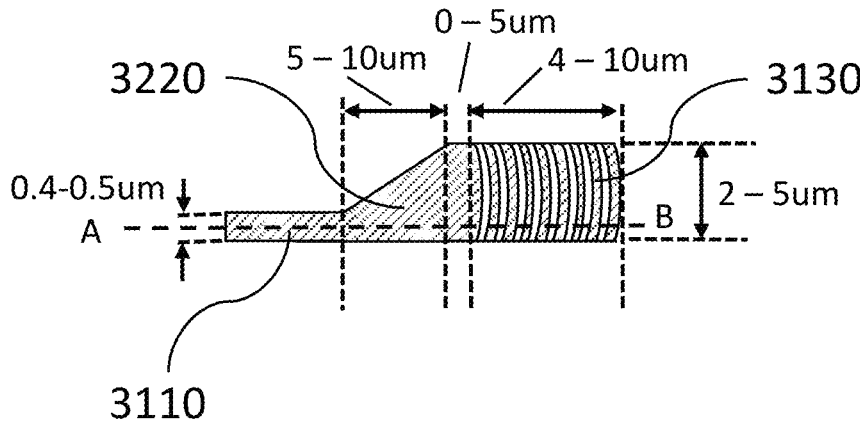
FIG. 32 is a top-down view of alternative emitter pixel, according to aspects of embodiments of the present disclosure.

FIG. 32 is a top-down view of an alternative emitter pixel, according to aspects of embodiments of the present disclosure. In some embodiments, emitter pixel 3200 may include three elements: input waveguide 3110; asymmetrical taper 3220; and grating coupler 3130. As shown, in some embodiments, emitter pixel 3200 may differ from emitter pixel 3100 in the asymmetrical taper 3220 and the three elements, input waveguide 3110, taper 3220, and grating coupler 3130, having one side of the waveguide perfect aligned.

Figure 33:
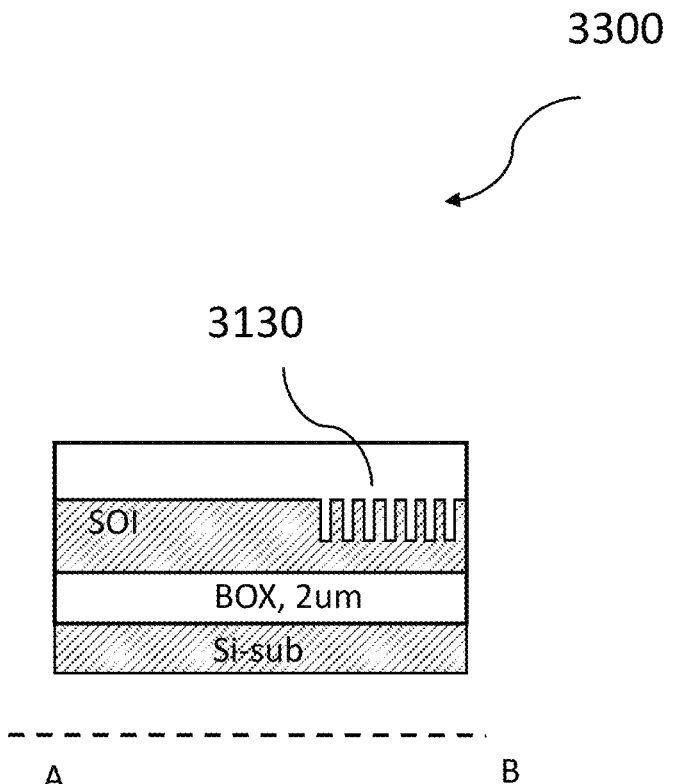
FIG. 33 is a cross-sectional view of an emitter pixel, according to aspects of embodiments of the present disclosure.

FIG. 33 is a cross-sectional view of an emitter pixel, according to aspects of embodiments of the present disclosure. In some embodiments, emitter pixel 3300 may include the structures shown along the AB cut depicted in FIG. 31 and FIG. 32. The period and etch depth of the grating coupler 3130 may, in some embodiments depend on the wavelength and system requirements and be adjusted accordingly as would be understood by one skilled in the art.

Figure 34:
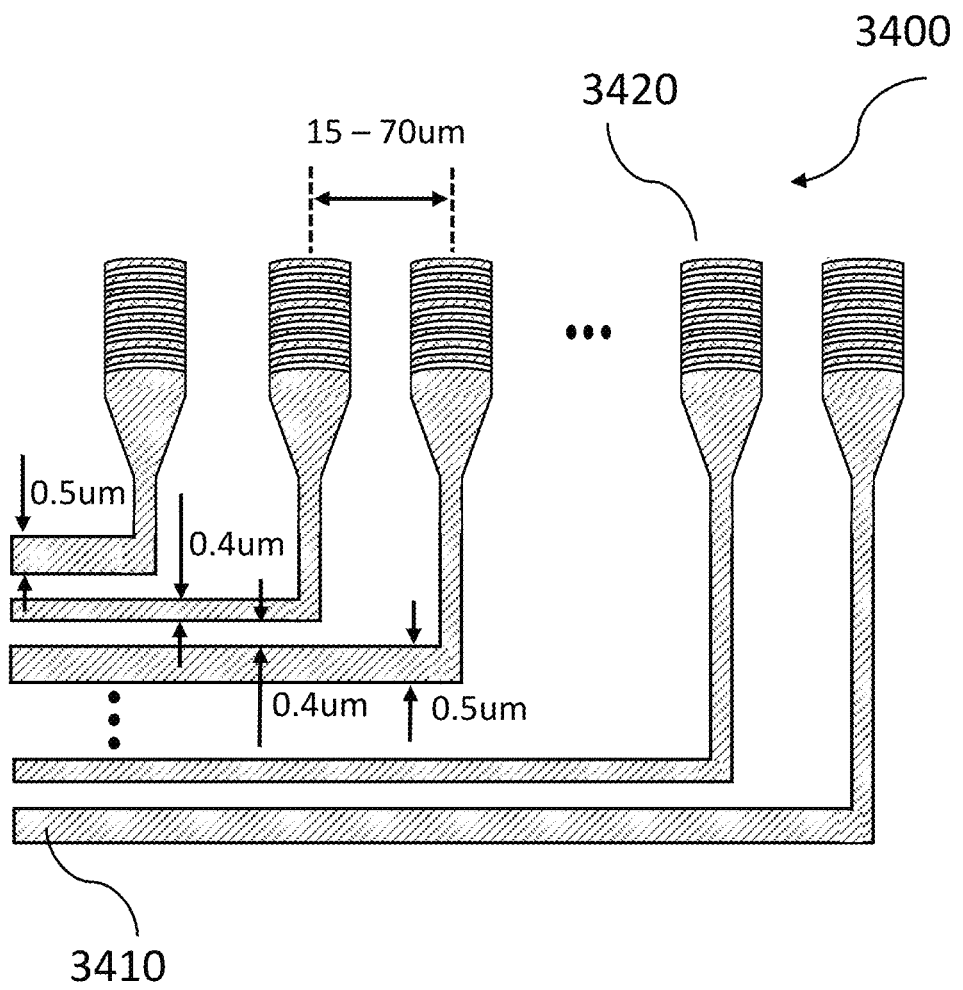
FIG. 34 is a diagram depicting a 1-dimensional emitter pixel array, according to aspects of embodiments of the present disclosure.

FIG. 34 is a diagram depicting a 1-dimensional emitter pixel array, according to aspects of embodiments of the present disclosure. In some embodiments, 1-dimensional emitter pixel array 3400 may have a plurality of emitter pixels 3420 which may have a pitch ranging from 15-70 um depending on the array size and system requirements. The input waveguide array 3410 may connect emitter pixels 3420 and the output waveguide ports of the optical switches in the optical switch array region 130 as shown in FIGS. 1 and 230 in FIG. 2. In order to minimize the crosstalk between waveguides in the waveguide array, in some embodiments, the widths of the waveguides in the waveguide array may be arranged such that neighboring waveguides have different widths. In such an embodiment, as a non-limiting example, one waveguide may have a width of 400 nm, and the neighboring waveguide may have a width of 500 nm with a 400 nm gap between them. As will be appreciated by one skilled in the art, the dimensions provided above are intended to be non-limiting and the exact dimensions of any embodiments may be varied according to the design needs of the user.

Figure 35:
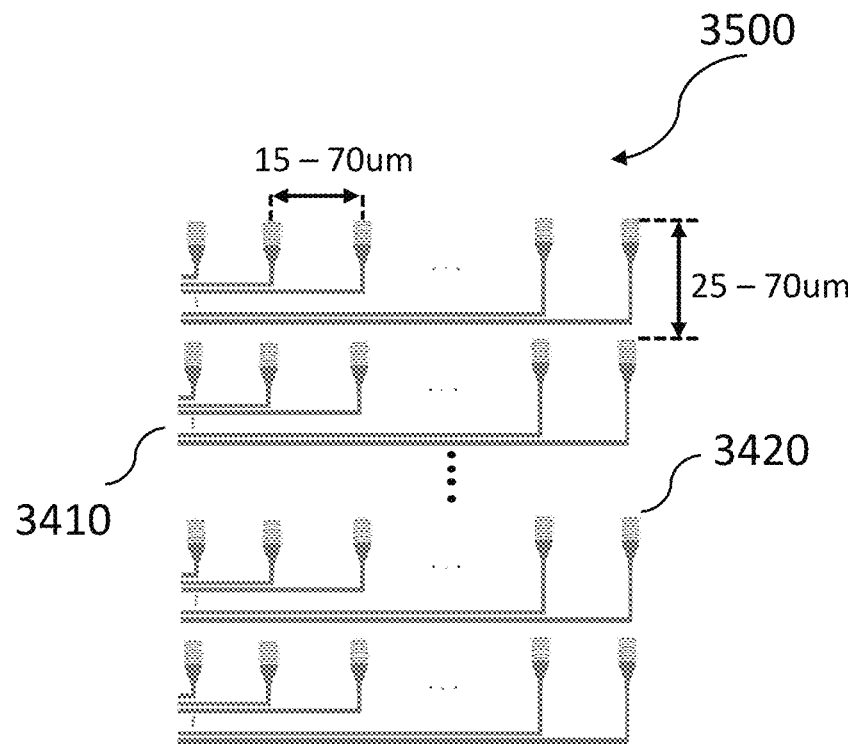
FIG. 35 is a diagram depicting a 2-dimensional emitter pixel array, according to aspects of embodiments of the present disclosure.

FIG. 35 is a diagram depicting a 2-dimensional emitter pixel array, according to aspects of embodiments of the present disclosure. In some embodiments, 2-dimensional emitter array 3500 may include a plurality rows of 1-dimensional emitter pixel array 3520 and input waveguide array 3410 in vertical direction. In some embodiments, the pitch of the 2-dimensional emitter pixel array may be between 15-70 um in horizontal direction and 25-70 um in vertical direction. As will be appreciated by one skilled in the art, the dimensions provided above are intended to be non-limiting and the exact dimensions of any embodiments may be varied according to the design needs of the user.

Figure 36:
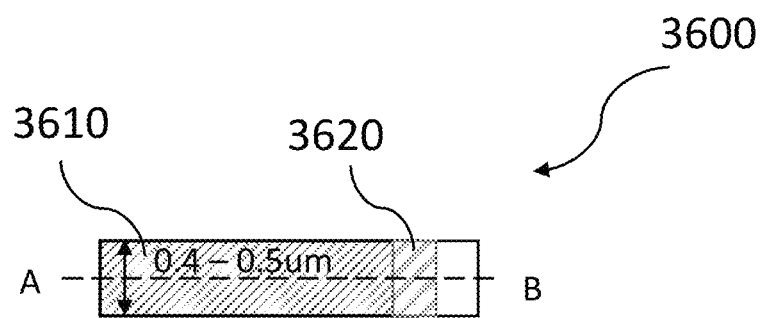
FIG. 36 is a top-down view with a cross-sectional view of an alternative embodiment of an emitter pixel, according to aspects of embodiments of the present disclosure.
Figure 36:
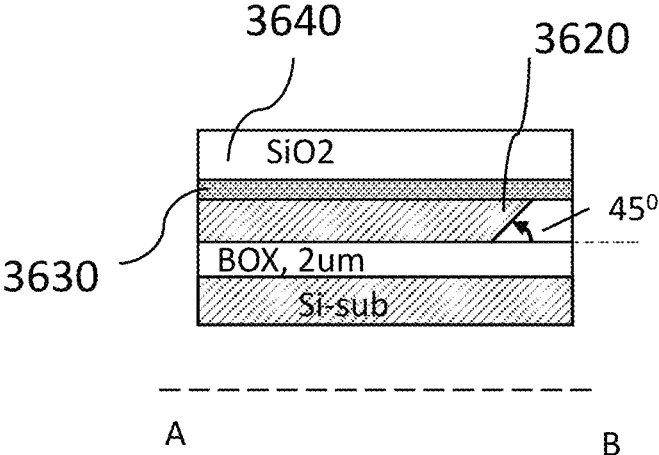

FIG. 36 is a top-down view and a cross-sectional view of an alternative embodiment of an emitter pixel, according to aspects of embodiments of the present disclosure. In some embodiments, emitter pixel 3600 may include an input waveguide 3610 and a 45-degree vertical emitter facet mirror 3620. Comparing to the grating emitter structures 3100 as shown in FIG. 31, and 3200 in FIG. 32, an emitter pixel with vertical emitting mirror 3600 may, in some embodiments, have smaller footage and higher efficiency (or lower optical loss), therefore it may make smaller light emitter pixel and higher emitter pixel density resulting, in some embodiments, in high lidar resolution. As shown, the width of the input waveguide 3610 and emitter pixel 3620 may be between 0.4-0.5 um in some embodiments. In the AB section view figure, the emitter pixel 3620 may have a vertical angle of 45 degree on the SOI facet filled with SiO2 connecting with BOX layer in some embodiments. To minimize the reflection from the silicon surface, in some embodiments, silicon nitride layer 3630 and silicon oxide layer 3640 may be used as anti-reflection coating. As a non-limiting example, for 1550 nm wavelength, the silicon nitride 3630 thickness may be selected as 150 nm, and silicon oxide 3640 thickness may be selected as 120 nm. As will be appreciated by one skilled in the art, the dimensions provided above are intended to be non-limiting and the exact dimensions of any embodiments may be varied according to the design needs of the user.

Figure 37:
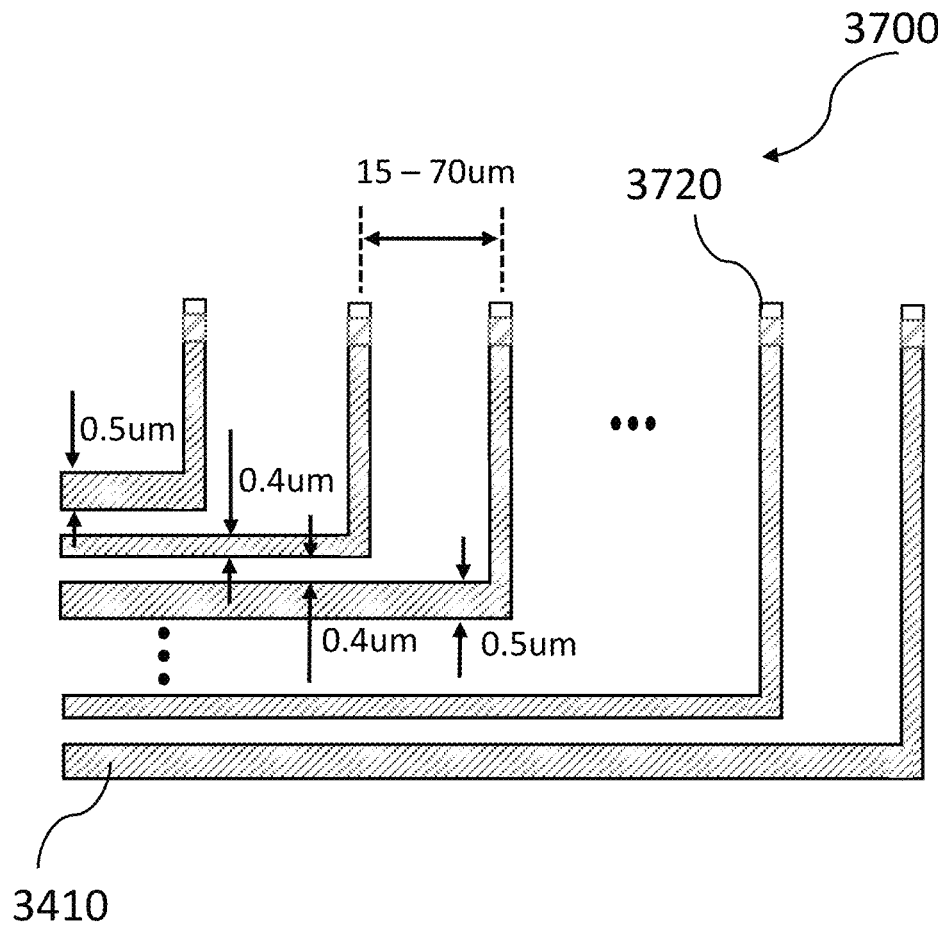
FIG. 37 is a diagram depicting an alternative embodiment of a 1-dimensional emitter pixel array, according to aspects of embodiments of the present disclosure.

FIG. 37 is a diagram depicting an alternative embodiment of a 1-dimensional emitter pixel array, according to aspects of embodiments of the present disclosure. In some embodiments, 1-dimensional emitter pixel array 3700 may include a plurality of emitter pixels 3720 and an input waveguide array 3410 that may be arranged similar to the configuration shown in FIG. 34.

Figure 38:
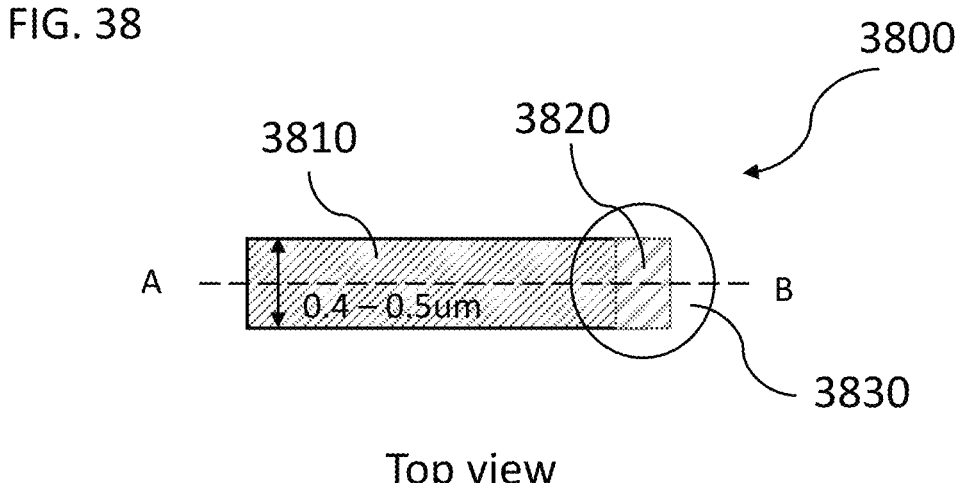
FIG. 38 is a top-down view of an alternative embodiment of an emitter pixel having a micro-lens, according to aspects of embodiments of the present disclosure.

FIG. 38 is a top-down view of an alternative embodiment of an emitter pixel having a micro-lens, according to aspects of embodiments of the present disclosure. As shown, in some embodiments, emitter pixel having a micro-lens 3800 may include an input waveguide 3810 and a 45-degree vertical emitter facet mirror 3820 and a micro-lens 3830.

Figure 39:
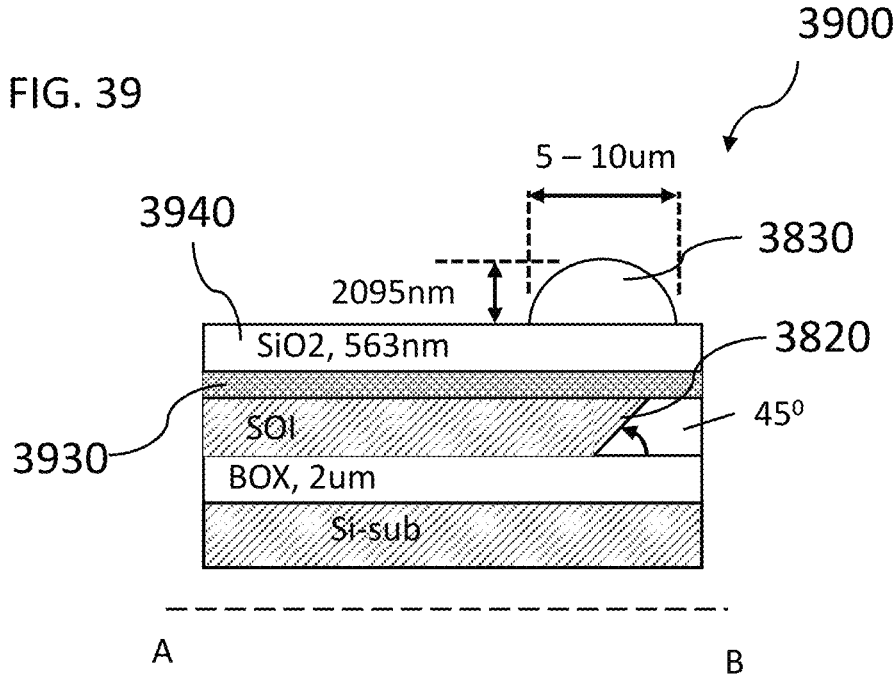
FIG. 39 is a cross-sectional view of an alternative embodiment of an emitter pixel having a micro-lens, according to aspects of embodiments of the present disclosure.

FIG. 39 is a cross-sectional view of an alternative embodiment of an emitter pixel having a micro-lens, according to aspects of embodiments of the present disclosure. In some embodiments, emitter pixel having a micro-lens 3900 may be configured to include the structures depicted along the AB cut as shown in FIG. 38. In such embodiments, a micro-lens 3830 for collimating the light out of the vertical 45-degree facet mirror 3820 may be positioned on top of the anti-reflection coating layers 3930 and 3940. In some embodiments, with a wavelength of 1550 nm, anti-reflection coating layer silicon nitride 3930 may have a thickness of 150 nm, and silicon oxide layer 3940 may have a thickness of 563 nm. In some embodiments, for facet reflection mirror with dimensions of 220 nm×400 nm, the optical spot size of the mode at surface of silicon oxide layer 3940 may be almost circular with a diameter of ~881 nm. In some embodiments, the micro-lens 3830 may have an optical index of 1.55 and a thickness of 2095 nm, the total optical transmission of the stack (Si3N4 3930, SiO2 3940 and micro-lens 3830 layers) at 1550 nm may be >99.99% and the optical spot size of the mode at the bottom surface of micro-lens 3830 may be almost circular with a diameter of ~1638 nm micro-lens. In some embodiments, the micro-lens 3830 collimates the light beam so that the light can be efficiently collected by the device lens in the lidar system. The disk diameter of the micro-lens 3830 may be 5-10 um. As will be appreciated by one skilled in the art, the dimensions provided above are intended to be non-limiting and the exact dimensions of any embodiments may be varied according to the design needs of the user.

Figure 40:
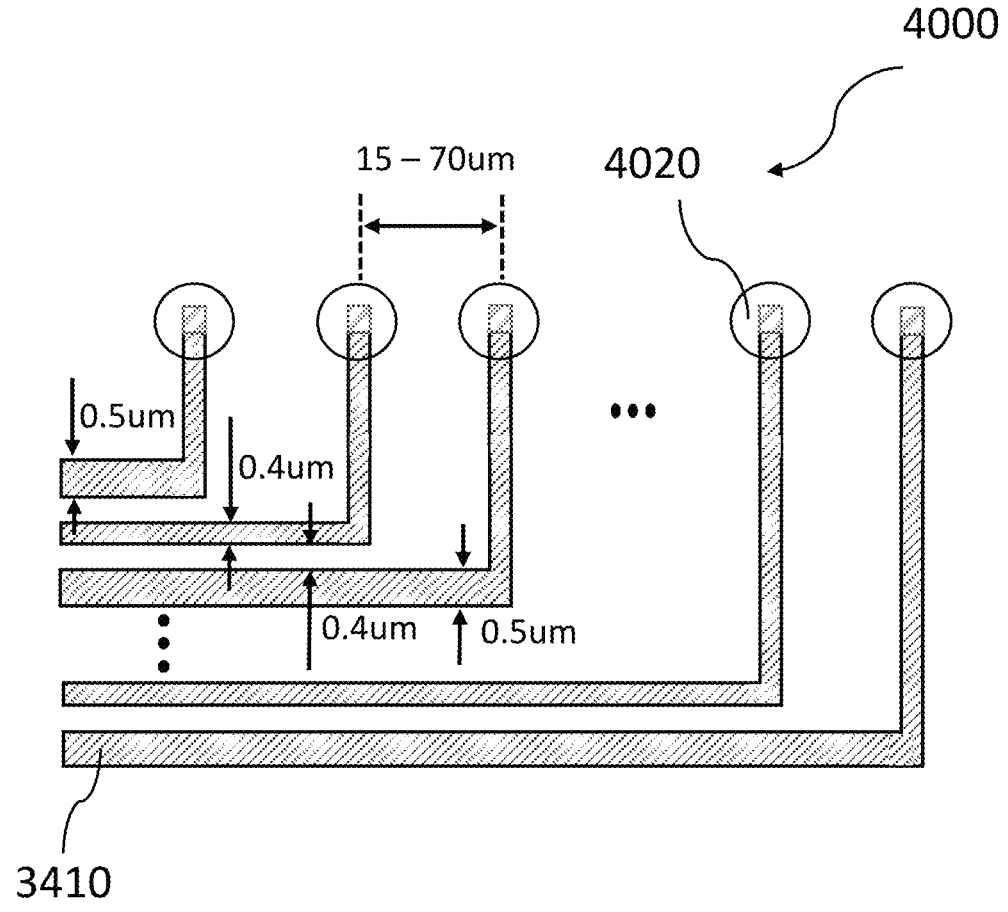
FIG. 40 is a diagram depicting a 1-dimensional pixel array of pixel emitter pixels having micro-lenses, according to aspects of embodiments of the present disclosure.

FIG. 40 is a diagram depicting a 1-dimensional pixel array of emitter pixels having micro-lenses, according to aspects of embodiments of the present disclosure. In some embodiments, 1-dimensional emitter pixel array 4000 may include a plurality of emitter pixels 4020 and an input waveguide array 3410 that may be arranged similar to that shown in FIG. 34.

Figure 41:
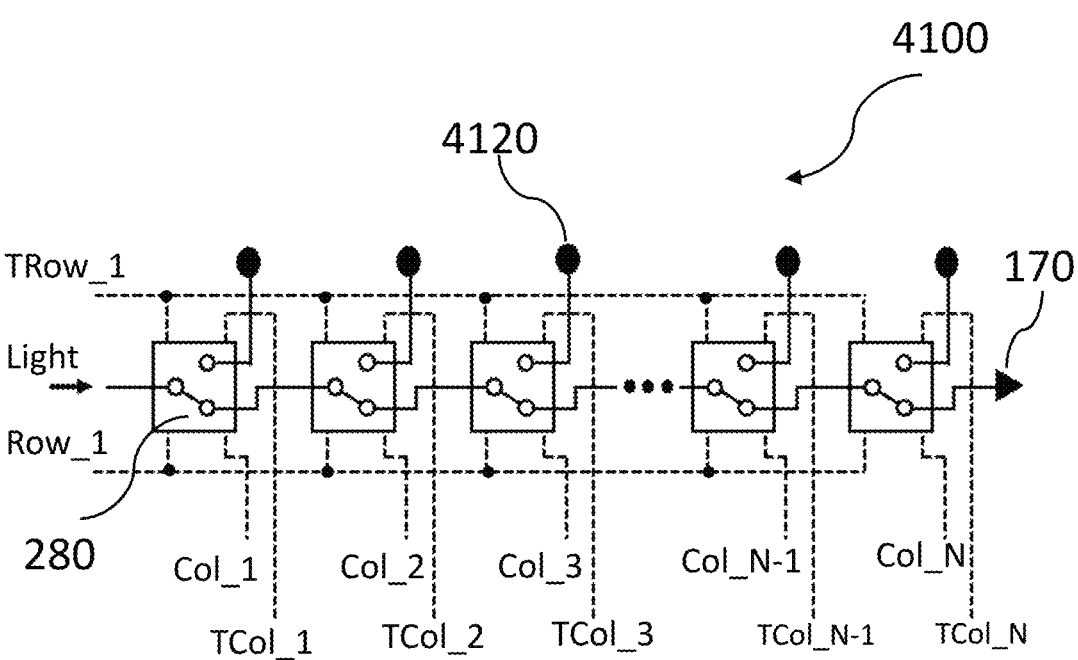
FIG. 41 is a diagram depicting an alternative embodiment of a single row of a chained optical switch array operably coupled to a pixel array, according to aspects of embodiments of the present disclosure.
Figure 42:
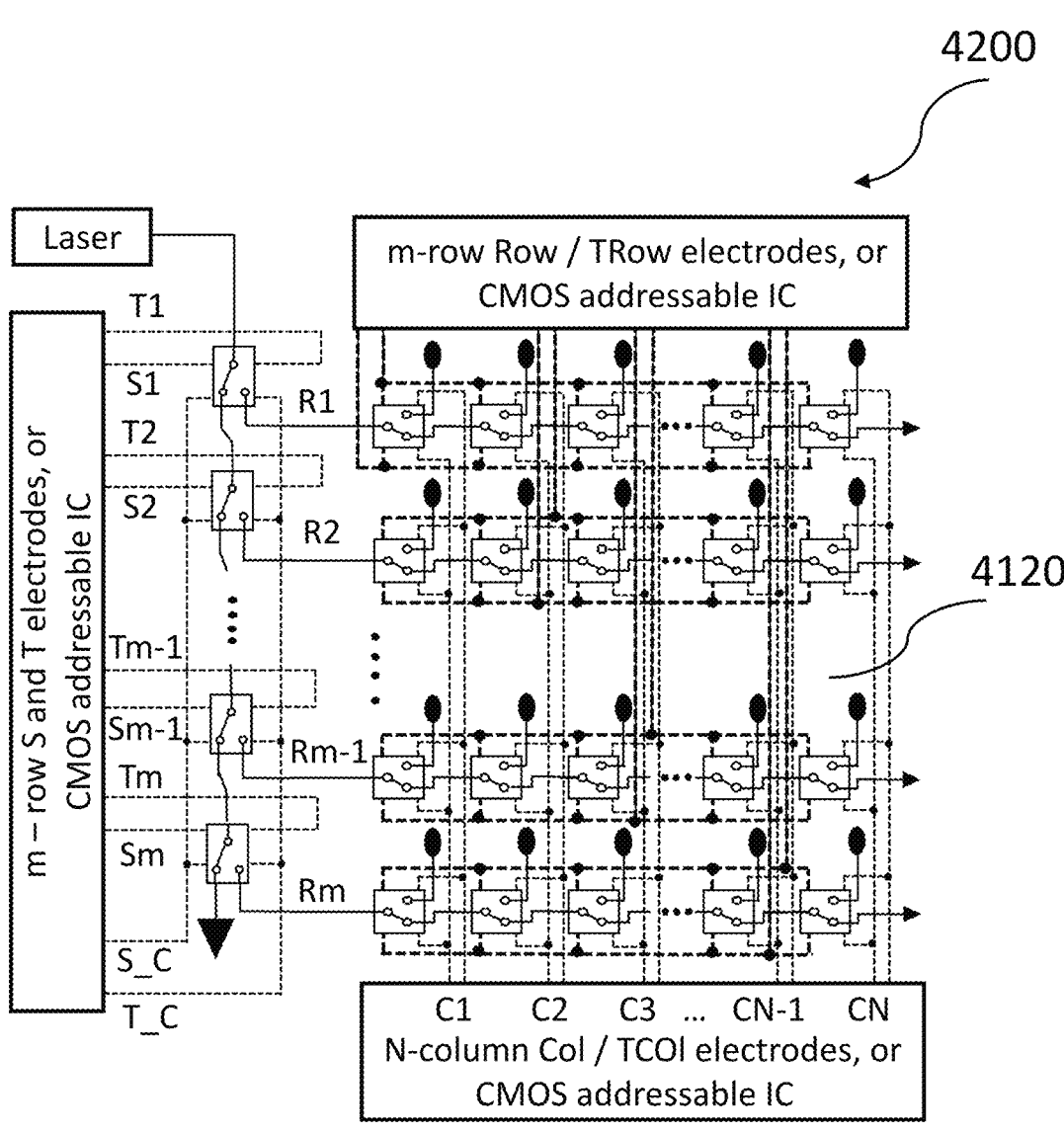
FIG. 42 is a diagram depicting an alternative embodiment of a silicon photonics integrated beam steering device having a M×N chained optical switch array operably coupled to a pixel array, according to aspects of embodiments of the present disclosure.

In some embodiments, the M×N pixel array and the M×N chained optical switch array may be integrated into one "region" in which each of the pixels is positioned adjacent to the output waveguide port_1 of its corresponding optical switch. However, as will be appreciated by one skilled in the art, the location of the pixel array in relation to the M×N chained optical switch array may be varied according to different design requirements/needs. Further understanding of the various positionings of the pixel array relative to the chained optical switch array can be had by reference to the following figures: FIGS. 41-42.

FIG. 41 is a diagram depicting an alternative embodiment of a single row of a chained optical switch array operably coupled to a pixel array, according to aspects of embodiments of the present disclosure. In some embodiments, the single row of a chained optical switch array 4100 may differ from switch array 2100 shown in FIG. 21 in the light emitter pixel location. In such embodiments, the light emitter pixel 4120 may be designed close (or adjacent) to the output waveguide port_1 of an MZI optical switch. In other words, the light emitter pixel 4120 may, in some embodiments, be a part of the MZI optical switch.

FIG. 42 is a diagram depicting an alternative embodiment of a silicon photonics integrated beam steering device having a M×N chained optical switch array operably coupled to a pixel array, according to aspects of embodiments of the present disclosure. As shown, in some embodiments, a 2D M×N silicon photonics integrated beam steering device 4200 may include a light dispenser with a vertical chained optical switch array that differs from the device 2800 shown in FIG. 28 in that the emitter pixel 4120 which may be adjacent to the output waveguide port_1 of an MZI optical switch in the optical switch array region.

The silicon photonics integrated beam steering device of the present disclosure may, in some embodiments, operate with wavelengths of light ranging from 1.2 um to 1.6 um. As will be appreciated by one skilled in the art, the wavelengths provided above are intended to be non-limiting and the exact wavelengths used by any embodiments may be varied according to the design needs of the user.

In some embodiments, the pixel arrays of the present disclosure may be operated in the following 5 modes, depending on the system requirements.

Scanning mode. In this mode, light is emitted from the $1^{st}$ emitter pixel in the $1^{st}$ column of the $1^{st}$ row to the last emitter pixel in the last column of the $1^{st}$ row, then from the $1^{st}$ emitter pixel in the $1^{st}$ column of the $2^{nd}$ row to the last emitter pixel in the last column of the $2^{nd}$ row, following this way until to the last emitter pixel in the last column of the last row.

Random individual emitter pixel access mode. In this mode, a light emitter pixel may be randomly accessed to emit light.

Random row or column emitter pixel array mode. In this mode, a row of light emitter pixel array or a column of light emitter pixel array may be randomly accessed to emit light at the same time.

Random selected sub 2-dimensional array flash mode. In this mode, all of the emitter pixels in the selected sub 2-dimensional array can be accessed to emit light at the same time.

Flash mode: all of the emitter pixels can be accessed to emit light at the same time.

II. Silicon Photonics Integrated Beam Steering System

In some embodiments, it may be desirable to have increased pixel array size, but the size of an individual pixel array may be limited by the operating characteristics of the corresponding chained optical switch array. For example, it may not be practical to use a single chained array to produce a large array when the loss of optical power at the end of a row of the chained optical switch array results in poor overall performance. As such, a silicon photonics integrated beam steering device of the present disclosure may be used that includes one or more integrated beam steering devices each having a chained optical switch array wherein the pixel arrays of the integrated beam steering devices may be coupled to produce a larger combined pixel array (also referred to herein as an "emitter array").

As a non-limiting example, a pair of M×N chained optical switch array devices may have their pixel arrays coupled to produce a 2M×N emitter array. Likewise, in another non-limiting example, the relative positioning of the coupled pixel arrays may be changed to produce a M×2N emitter array.

Embodiments of the silicon photonics integrated beam steering systems of the present disclosure with other emitter array sizes may be constructed with 2 columns and k rows of the 2D m×N silicon photonics integrated beam steering devices, which produces a (k×m)×(2×N) combined pixel array. As a non-limiting example, setting k=2, m=64, and N=64, may size of the pixel array at 128×128 pixels. In another non-limiting example, setting k=3, m=64, and N=64, may size the pixel array at 192×128 pixels. In yet another non-limiting example. setting k=2, m=128, and N=128, may size the pixel array at 256×256 pixels.

The wavelengths of the k-row lasers in the two column light source regions may, in some embodiments, be either the same or different.

Figure 43:
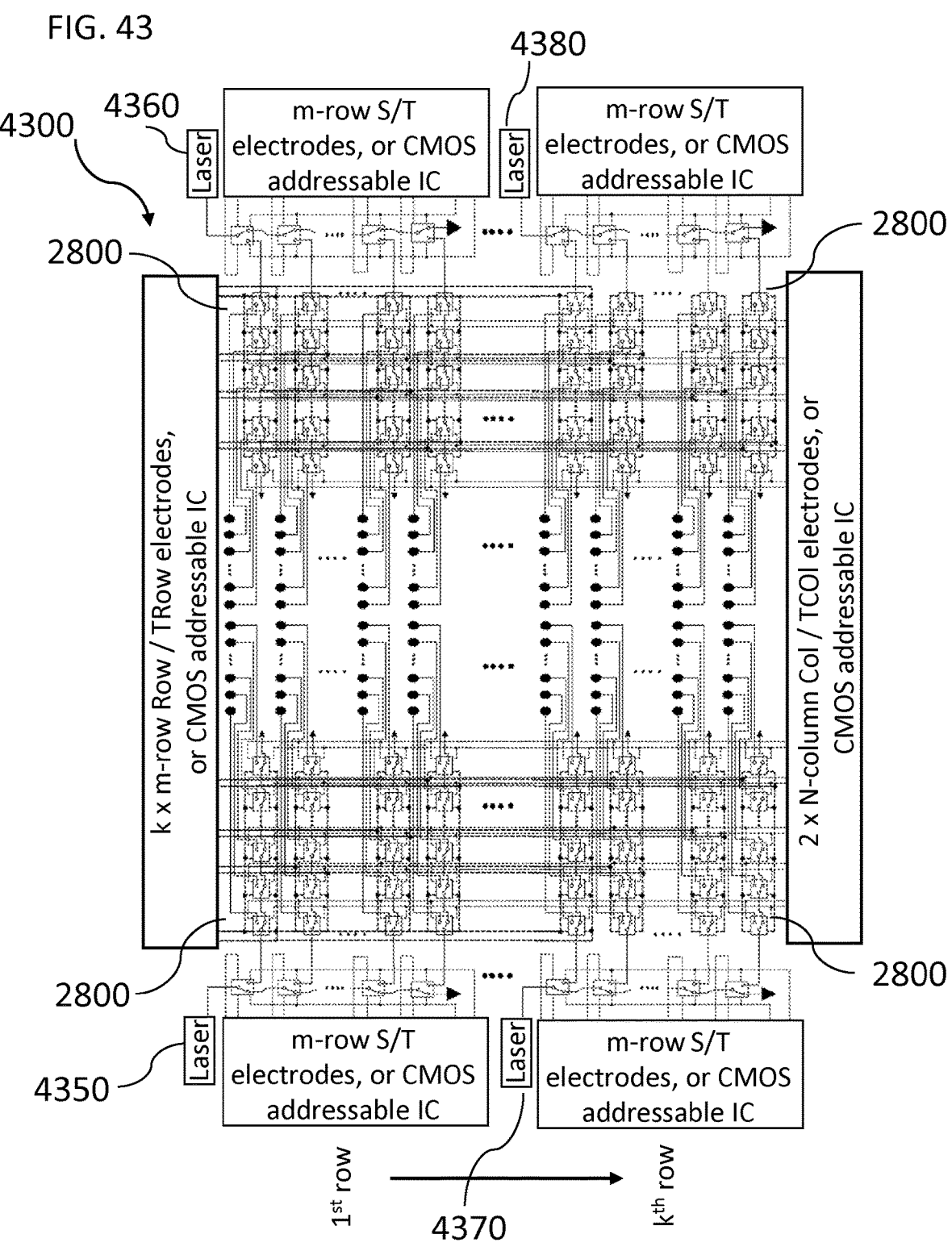
FIG. 43 is a diagram depicting a silicon photonics beam steering system, according to aspects of embodiments of the present disclosure.
Figure 44:
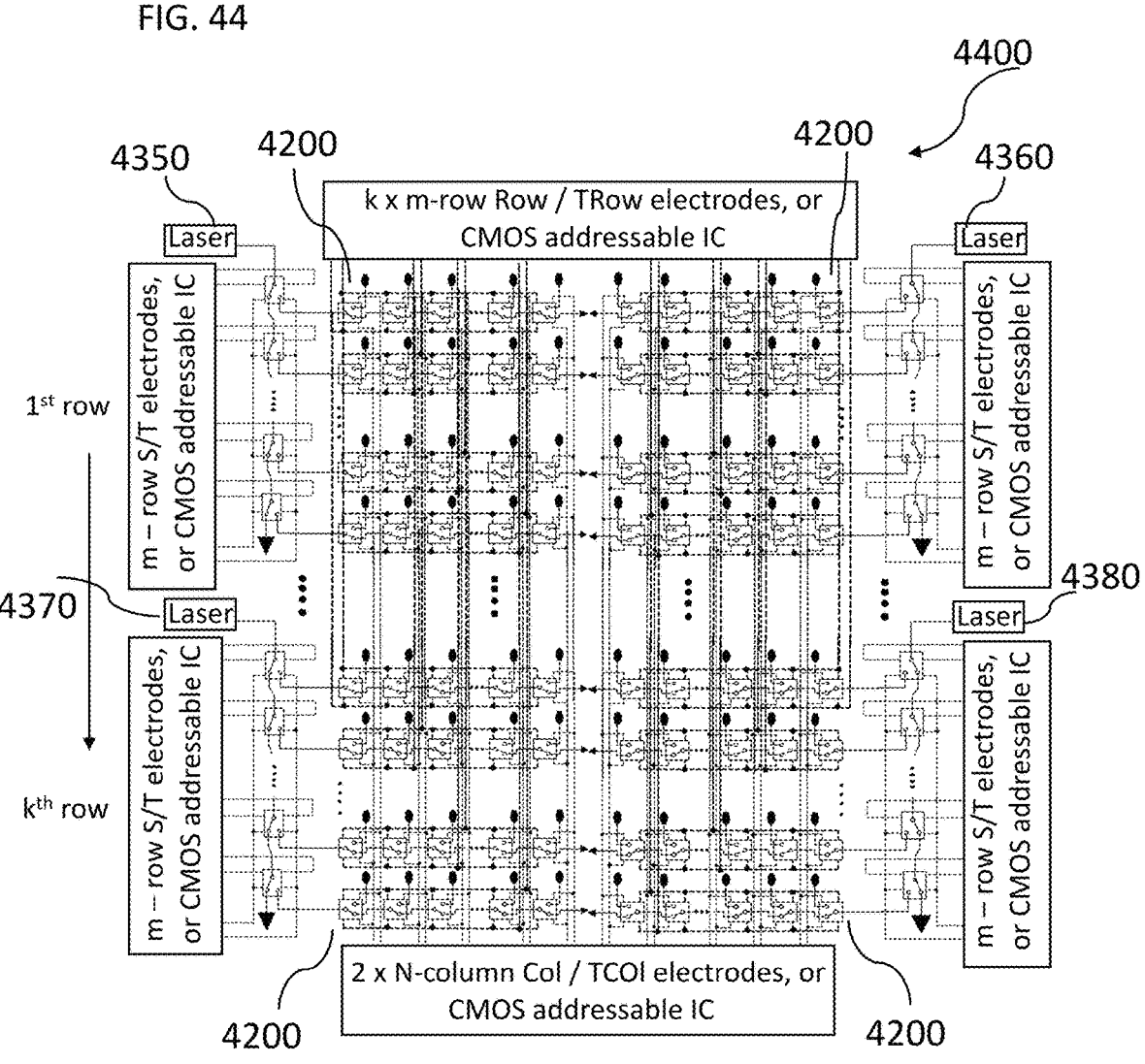
FIG. 44 is a diagram depicting an alternative embodiment of a silicon photonics beam steering system, according to aspects of embodiments of the present disclosure.

Further understanding of the different embodiments of the structure of the integrated beam steering systems of the present disclosure may be had by reference to the following figures: FIGS. 43-44.

FIG. 43 is a diagram depicting a silicon photonics beam steering system, according to aspects of embodiments of the present disclosure. In some embodiments, a silicon photonics beam steering system 4300 may include 2 columns and k rows of the beam steering devices 2800 shown in FIG. 28. In such embodiments, light source for this beam steering system may be, but is not limited to, 2k stages of lasers, 4350, 4360, 4370 and 4380, or the light source 300 as shown in FIG. 3, or the light source 400 shown in FIG. 4.

FIG. 44 is a diagram depicting an alternative embodiment of a silicon photonics beam steering system, according to aspects of embodiments of the present disclosure. In some embodiments, a silicon photonics beam steering system 4400 may include 2 columns and k rows of the beam steering devices 4200 shown in FIG. 42. The light source for this beam steering system may be, but is not limited to, 2k stages of lasers, 4350, 4360, 4370 and 4380, or the light source 300 shown in FIG. 3, or the light source 400 shown in FIG. 4.

The use of multiple pixel arrays within embodiments of the silicon photonics integrated beam steering system of the present disclosure may be advantageous for pixel arrays sizes that would otherwise require chained optical switch array lengths that would produce too great a loss of optical power by the time the beam from the light source reached the pixel arrays. With current silicon photonics fabrication process capabilities, for example, a typical MZI optical switch has an optical loss of 0.1 dB, switch electrical power consumption of 18.1 mW and tuning electrical power consumption of 1.52 mW with TO effect. For a 64×64 pixel array with light dispenser region having a vertical optical switch chain, the worst on chip optical loss of the last pixel in the array is 12.8 dB, the total tuning electrical power of optical switches in two rows is 192 mW and the switch electrical power for a pixel is 36.2 mW. With post-fabrication trimming by ion implantation of Germanium, the tuning electrical power of the MZI can be reduced to 0.5 mW, the tuning electrical power consumption of optical switches in two rows can be reduced to 64 mW.

III. Photo-Acoustic Imaging Sensor and Ultrasound Embodiments

As mentioned previously, the pixel arrays of the present disclosure are not limited to using only emitter pixels. In some embodiments, the emitter pixels may be replaced with imaging pixels, i.e., photo-acoustic sensors or sensor cells. The use of such imaging pixels may, in some embodiments, allow for the detection of vibrations by using the light passed into the imaging pixels from a chained optical switch array in combination with a MZI or ring resonator and a photo-detector.

In some embodiments of the photo-acoustic sensing element (or imaging pixel) array, each of the photo-acoustic imaging pixels may include a photo-acoustic sensing cell and a photodetector.

Figure 45:
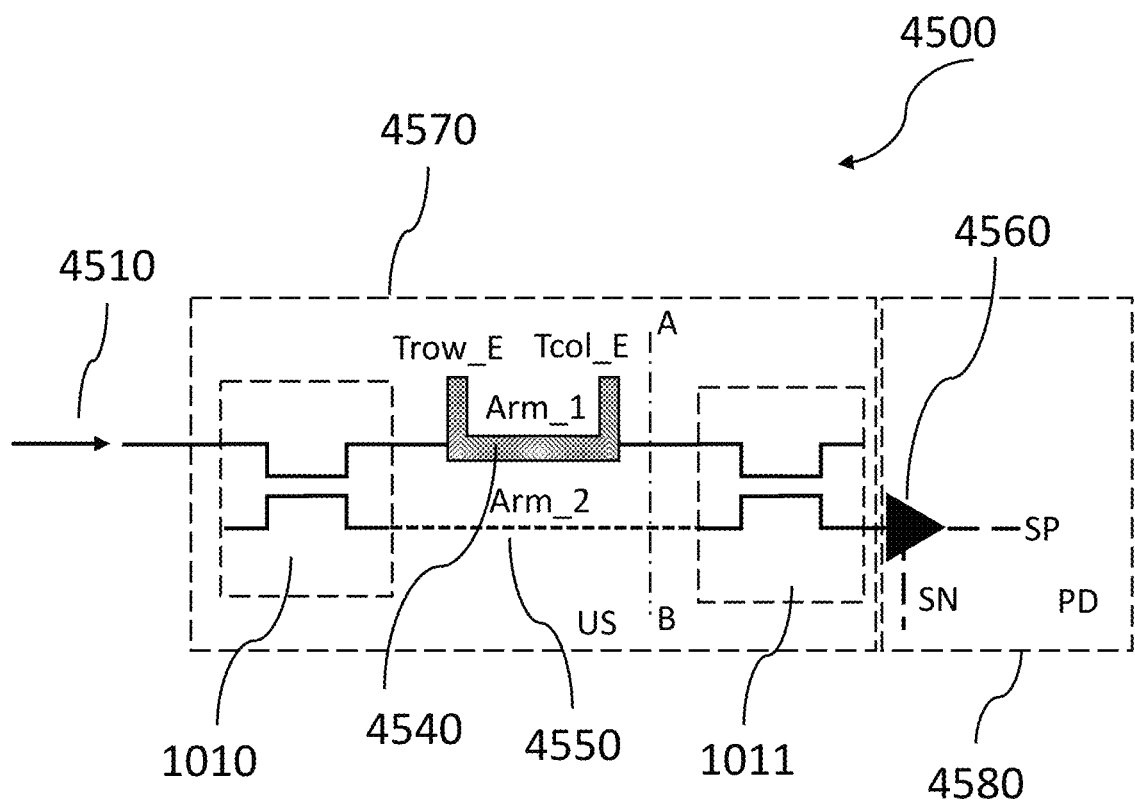
FIG. 45 is a diagram depicting an opto-acoustic imaging pixel, according to aspects of embodiments of the present disclosure.

As a non-limiting example, an embodiment of the photo-acoustic sensing cell may include a Mach-Zehnder Interferometer (MZI) that has two arms as depicted in FIG. 45.

FIG. 45 is a diagram depicting an opto-acoustic imaging pixel, according to aspects of embodiments of the present disclosure. In some embodiments, an opto-acoustic imaging pixel 4500 may include two regions (also referred to herein as "subsections"): ultrasound sensor (US) region 4570 and photodetector (PD) region 4580. In some embodiments, US region 4570 may include an MZI with two 3 dB directional coupler 1010 and 1011, which may, in some embodiments, be replaced by a 1×2 MMI and a 2×2 MMI, respectively. In some embodiments, one arm of the MZI, Arm_1 4540, may be a rib SOI waveguide with bias electrodes and the other arm of the MZI, Arm_2 4550, may be a suspended rib waveguide with an air gap of 15-20 nm. The size of the air gap may, in some other embodiments, be varied according to the device requirements as would be understood by one skilled in the art. The output port_2 of the MZI may be terminated with a photodetector region 4580 comprising a detector 4560. In some embodiments, PD 4560 may have two electrodes SN and SP for electronic signal output from the N and P regions of the photodetector. During operation, the MZI receives light 4510 from the output port_1 of an optical switch in the chained optical switch array and may be biased at the quadrature point with either TO effect or EO effect. When an ultrasound wave comes into contact with the surface of the suspended rib waveguide, the top part of the rib waveguide vibrates, which changes the air gap distance. The effective refractive index of the suspended rib waveguide, in some embodiments, may be a linear function of the air gap distance. Thus, in some embodiments, as the waveguide vibrates, the air gap distance changes, which in turn changes the waveguide's effective refractive index thereby changing the optical output intensity of the MZI port_2. Since the MZI port_2 may, in some embodiments, be operably coupled to a photodetector, this optical intensity change causes the change of the photodetector photocurrent that can be used to produce an image such as an ultrasound image used for medical procedures.

Figure 46:
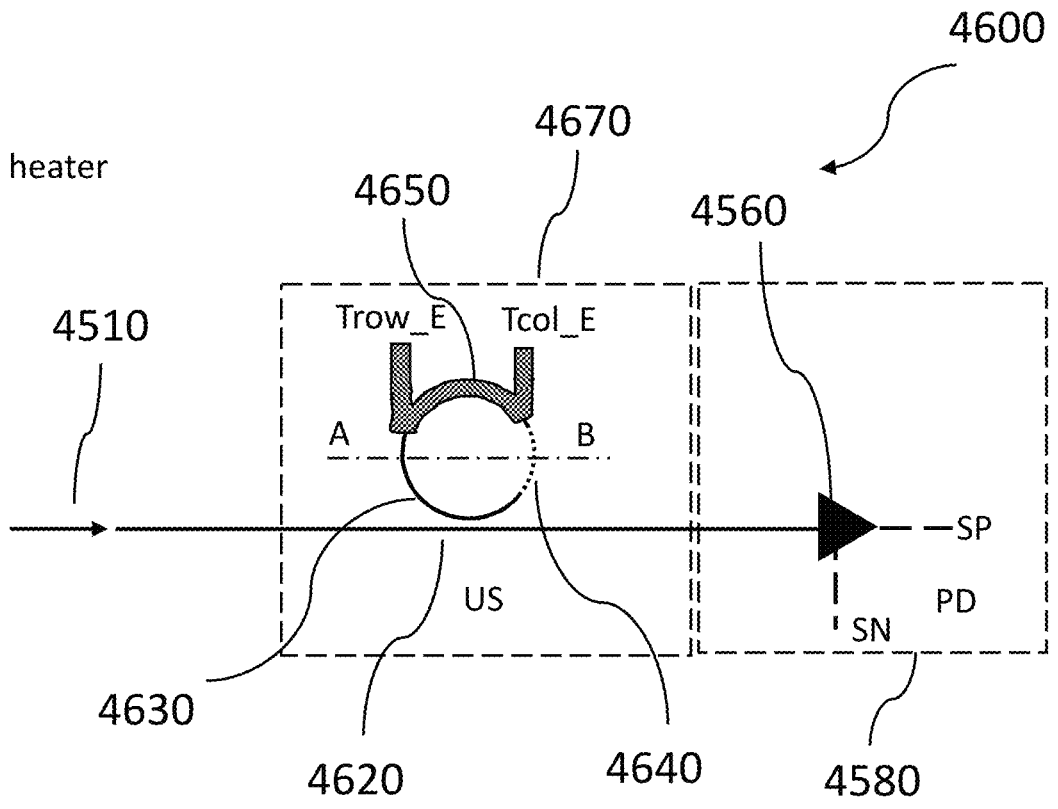
FIG. 46 is a diagram depicting an alternative embodiment of an opto-acoustic imaging pixel having a ring resonator, according to aspects of embodiments of the present disclosure.

Another non-limiting embodiment of the photo-acoustic sensing cell may include a ring resonator, as depicted in FIG. 46, in which part of the ring waveguide comprises a suspended rib waveguide with an air gap of 15-20 nm.

FIG. 46 is a diagram depicting an alternative embodiment of an opto-acoustic imaging pixel having a ring resonator, according to aspects of embodiments of the present disclosure. In some embodiments, the opto-acoustic imaging pixel 4600 may include two regions, ultrasound sensor (US) region 4670 and photodetector (PD) region 4580. US region 4670 may, in some embodiments, include a ring resonator with a straight rib waveguide 4620, SOI rib waveguide of ring 4630 with bias electrodes 4650, and suspended rib waveguide 4640 with an air gap. In some embodiments, the whole ring (4630 and 4640) may be a suspended rib waveguide. In other embodiments, the straight waveguide 4620 together with the whole ring (4630 and 4640) may be a suspended rib waveguide. The PD region 4580 comprises a detector 4560. In some embodiments, PD region 4560 may have two electrodes SN and SP for electronic signal output from the N and P regions of the photodetector.

The size of the air gap may, in some other embodiments, be varied according to the device requirements as would be understood by one skilled in the art. A photodetector may be used to terminate the straight waveguide in the ring resonator. In the operation, the ring resonator receives light 4510 from the output port_1 of an optical switch in the chained optical switch array and may be biased at the middle point (−3 dB point) with either TO effect or EO effect. When an ultrasound wave contacts the surface of the suspended rib waveguide, the top part of the rib waveguide vibrates, which changes the air gap distance. The effective refractive index of the suspended rib waveguide is a linear function of the air gap distance. As the waveguide vibrates, the air gap distance changes, which in turn changes the waveguide's effective refractive index thereby changing the optical output intensity of the ring resonator. Since the output waveguide of the ring resonator connects to a photodetector, this optical intensity change causes the change of the photodetector photocurrent that can be used to produce an image such as an ultrasound image used for medical procedures.

Figure 47:
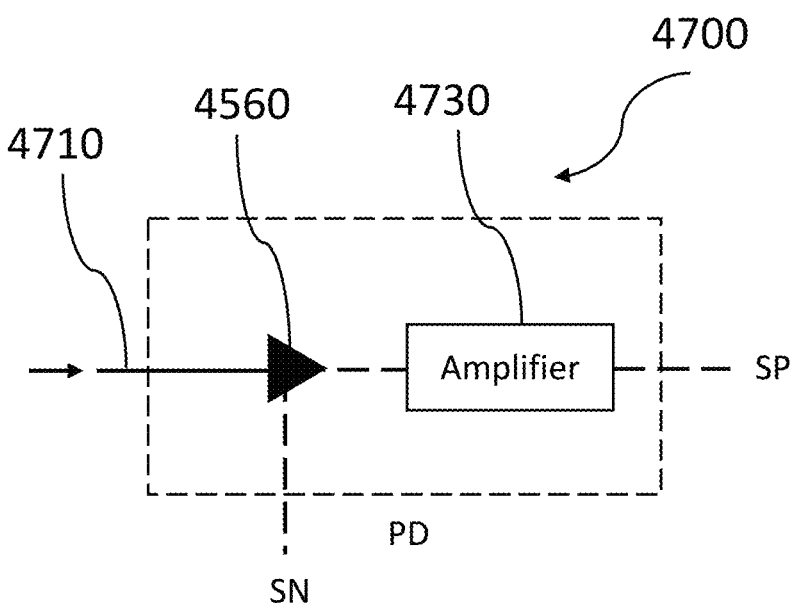
FIG. 47 is a simplified diagram depicting a photodetector, according to aspects of embodiments of the present disclosure.

In another embodiment, an amplifier, such as TIA (trans-impedance amplifier, as depicted in figure FIG. 47, can be integrated with the photodetector on chip in the PD region.

FIG. 47 is a simplified diagram depicting a photodetector, according to aspects of embodiments of the present disclosure. As shown, in some embodiments, the PD region 4700 may include a detector 4560 receiving optical signal 4710 and a TIA amplifier 4730. In some embodiments, the PD region 4700 may have two electrodes SN and SP for electronic signal output.

In some embodiments, the suspended rib waveguide may have a "T" shape, which may be different from the rest of the silicon waveguides in the device that may have an inverted "T" shape. The air gap of 15 nm-20 nm is in the middle of the vertical bar of the T shape waveguide. As will be appreciated by one skilled in the art, the exact sizing of the air gap may be varied according to system need and the dimensions provided above are intended to be non-limiting.

As a non-limiting example, for waveguide width of 450 nm with a slab thickness of 50 nm (rib height of 170 nm), the refractive effective index, n, of the waveguide with an air gap in middle varies linearly with the air gap height, x (nm), with an approximate relationship of $n = -0.004496 x + 2.43325$.

Figure 48:
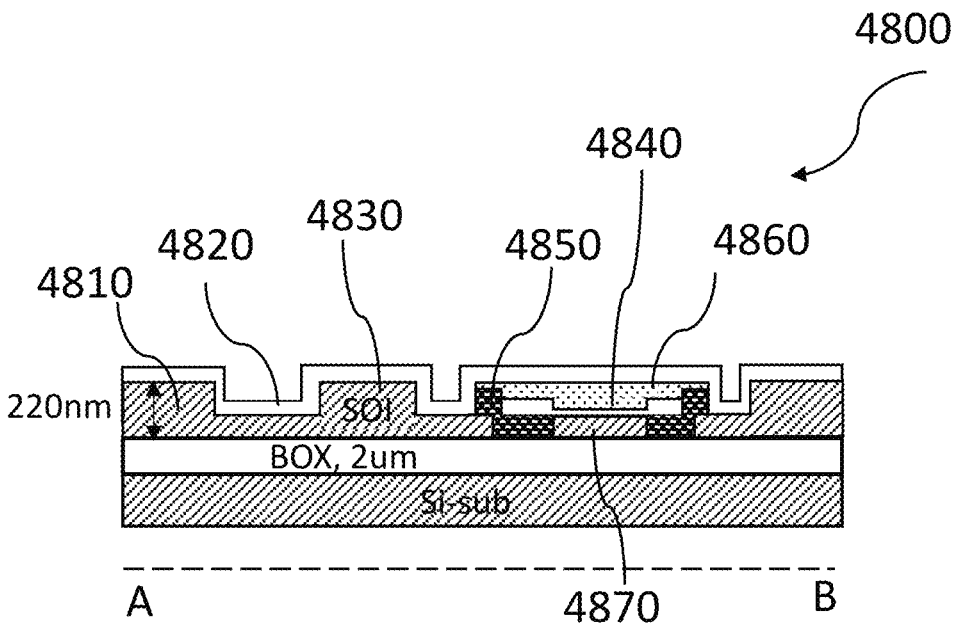
FIG. 48 is a cross-sectional view of an opto-acoustic imaging pixel having a suspended poly-Si rib waveguide, according to aspects of embodiments of the present disclosure.

In some embodiments, the top of the suspended rib waveguide may be constructed from a poly-silicon material as shown in FIG. 48. In some other embodiments, as depicted in FIG. 49, the top of the suspended T shape rib waveguide may be constructed from a crystalline silicon material.

FIG. 48 is a cross-sectional view of an opto-acoustic imaging pixel having a suspended poly-Si rib waveguide, according to aspects of embodiments of the present disclosure; In some embodiments, imaging pixel 4800 may be configured as shown along the AB cut depicted in FIG. 45 and FIG. 46. In some embodiments, the SOI 4810 may have a thickness of 220 nm on a 2 um BOX layer, and the rib waveguide 4830 may have a width of 450 nm with a slab thickness of around 100 nm and a SiO2 top clad 4820 as well. As will be appreciated by one skilled in the art, the exact dimension of these parts may be varied according to design needs of a user, and the dimensions provided herein are intended to be non-limiting. In some embodiments, the suspended rib waveguide may have a T shape with a part of the rib 4870 having the same thickness of the slab around 100 nm and a width of 450 nm. In some embodiments, the other part of the T shape suspended rib waveguide on top of the air gap 4840, which may be 15-20 nm height, may be made of poly-silicon material 4860 and may have a thickness of around 100-105 nm, so the total thickness of the suspended rib waveguide may be 220 nm. In some embodiments, the slab thickness of the T shape suspended rib waveguide may be 50-105 nm, and the suspended rib may have a width of 450 nm and a thickness of 0-55 nm. In some embodiments, silicon nitride layer 4850 may be positioned on the two sides of the rib that may have similar thickness to the SOI waveguide slab thickness around 100 nm and also may serve as the side walls with a height of 50-100 nm on top of the slab to make a cavity for the T-shape suspended waveguide. In some embodiments, SiO2 layer 4820 may serve as a sealing layer, as well as the top clad, for the T shape suspended rib waveguide.

Figure 49:
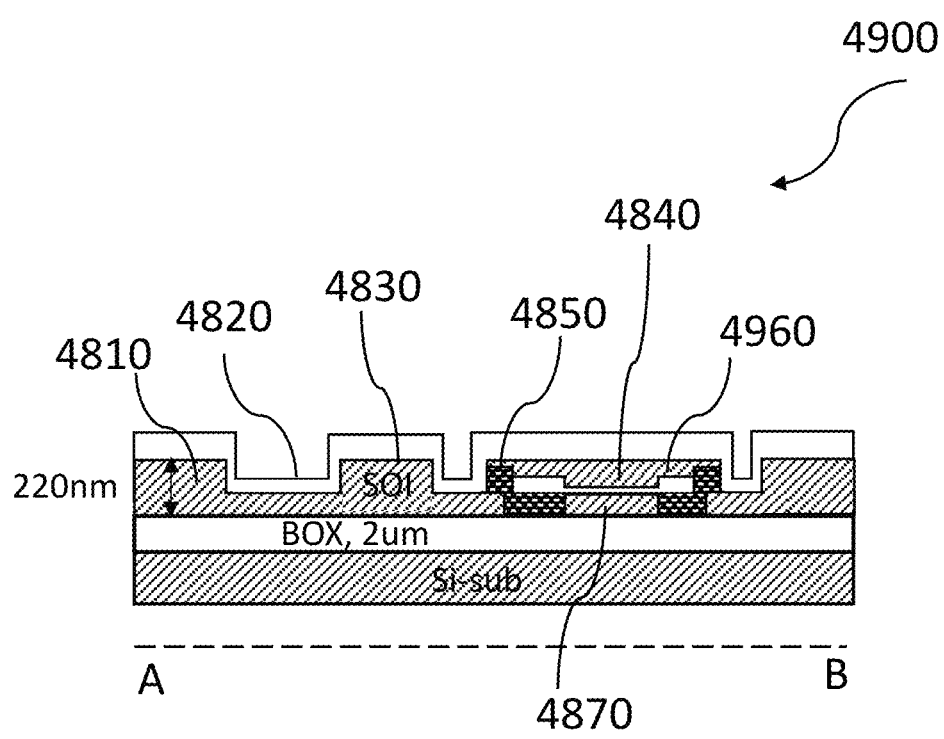
FIG. 49 is a cross-sectional view of an alternative embodiment of an opto-acoustic imaging pixel having a suspended crystalline Si rib waveguide, according to aspects of embodiments of the present disclosure.

FIG. 49 is a cross-sectional view of an alternative embodiment of an opto-acoustic imaging pixel having a suspended crystalline Si rib waveguide, according to aspects of embodiments of the present disclosure; In some embodiments, imaging pixel 4900 may be configured as shown along the AB cut depicted in FIG. 45 and FIG. 46. In some embodiments, the SOI 4810 may have a thickness of 220 nm on a 2 um BOX layer, and the rib waveguide 4830 may have a width of 450 nm with a slab thickness of around 100 nm and a SiO2 top clad 4820 as well. In some embodiments, the suspended rib waveguide may have a T shape with a part of the rib 4870 having the same thickness of the slab around 100 nm and a width of 450 nm. In some embodiments, the other part of the T shape suspended rib waveguide on top of the air gap 4840, which may be 15-20 nm height, may be made of crystalline silicon material 4960 and may have a thickness of around 100-105 nm, so the total thickness of the suspended rib waveguide may be 220 nm. In some embodiments, the slab thickness of the T shape suspended rib waveguide may be 50-105 nm, and the suspended rib may have a width of 450 nm and a thickness of 0-55 nm. In some embodiments, Silicon nitride layer 4850 may be positioned on the two sides of the rib that may have similar thickness to the SOI waveguide slab thickness around 100 nm and also may serve as the side walls with a height of 50-100 nm on top of the slab to make a cavity for the T-shape suspended waveguide. In some embodiments, SiO2 layer 4820 may serve as a sealing layer, as well as the top clad, for the T shape suspended rib waveguide. As will be appreciated by one skilled in the art, the exact dimensions of the pats may be varied according to user need and the dimensions provided herein are intended to be non-limiting. All suitable dimensions for these components as would be known to one skilled in the art are within the scope of the present disclosure.

In some embodiments of the imaging pixel array, the imaging pixels may be arranged into a M×N 2D array with a pitch ranging from 30 um-150 um in the horizontal and vertical directions.

Figure 50:
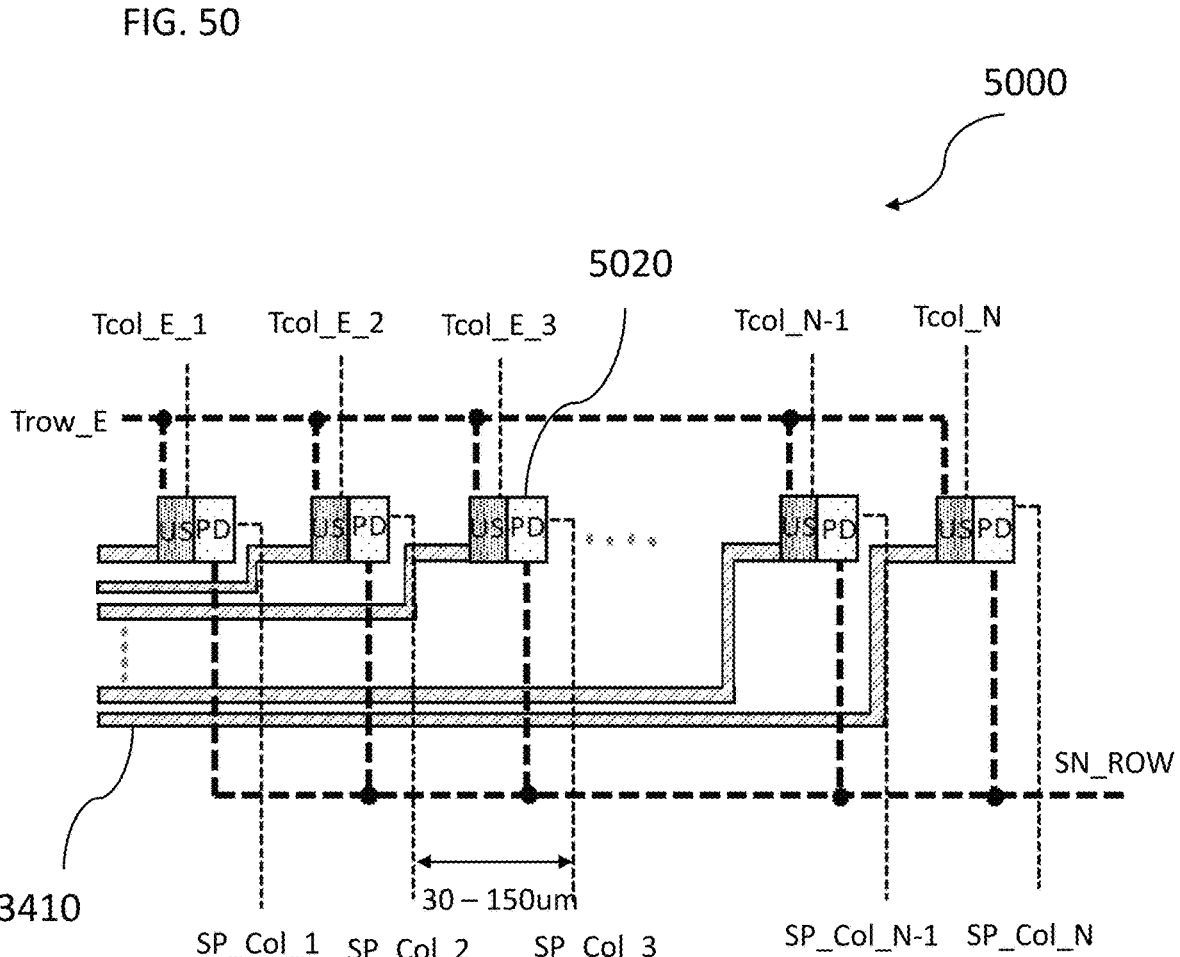
FIG. 50 is a diagram depicting a 1-dimensional opto-acoustic imaging pixel array, according to aspects of embodiments of the present disclosure.
Figure 51:
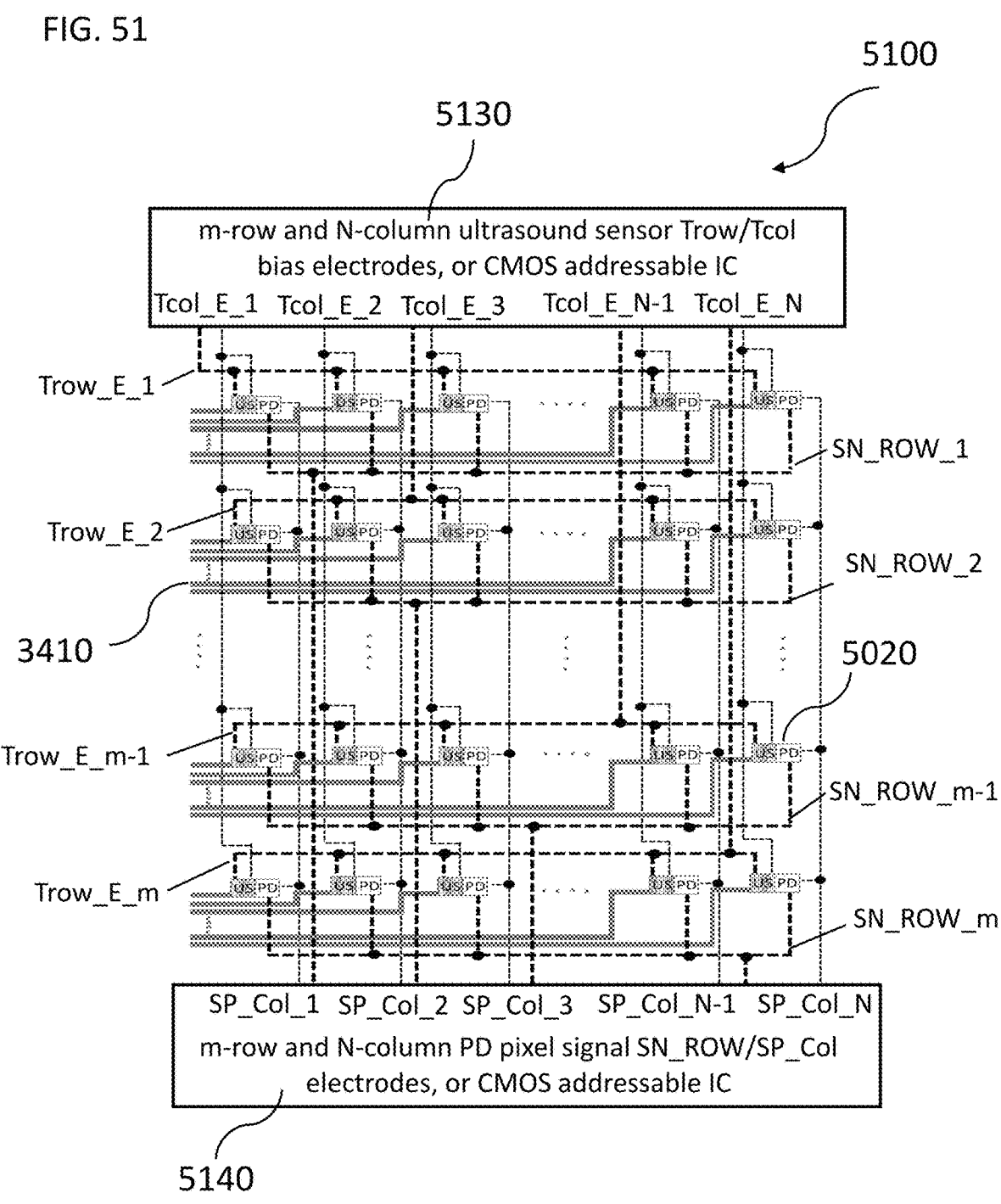
FIG. 51 is a diagram depicting a 2-dimensional opto-acoustic imaging pixel array, according to aspects of embodiments of the present disclosure.

In some embodiments, the waveguide arrays that connect the chained optical switch array and the imaging pixel array may have waveguide widths of 400 nm and 500 nm in alternative to minimize the waveguide coupling (or cross-talk), as depicted in FIG. 50. The gap between the waveguides may, in some embodiments, be 400 nm. Each imaging pixel may, in some embodiments, have two pairs of electrodes. One pair of the electrodes may be configured for setting the photo-acoustic sensing cell to the designated bias point, and the other pair of the electrodes may be configured for receiving the detector's output signal. Each pair of the electrodes have one row electrode and one column electrode. For the biasing electrodes, all the column electrodes of the imaging pixels in a column may, in some embodiments, be connected, and all the row electrodes of the imaging pixels in a row may also be connected. For the detector's output signal electrodes, in some embodiments, all the column electrodes of the detectors in a column may be connected, and all the row electrodes of the detectors in a row may be connected. Therefore, there may be a total of 2×(m+N) electrodes for the imaging pixel array. As described previously in the context of the chained optical switching arrays, by using CMOS digital addressing circuits, the total number of electrodes may, in some embodiments, be reduced. As a non-limiting example, for 64×64 arrays where m=N=64, the imaging pixels can be addressed by 6 digits (111111) in binary system resulting in only 6 electrodes being needed for controlling the 64 electrodes bringing the total electrode number from 2×(64+64)=256 to 2×(6+6)=24 electrodes. Additional understanding of such systems can be had by reference to the following figures: FIGS. 50-51.

FIG. 50 is a diagram depicting a 1-dimensional opto-acoustic imaging pixel array, according to aspects of embodiments of the present disclosure; In some embodiments, 1-dimensional imaging pixel array 5000 may have a plurality of sensors 5020, comprising US and PD regions as shown in FIG. 45 and FIG. 46, In some embodiments, the pitch of the imaging pixels may range from 30-150 nm. In some embodiments, all the Trow_E electrodes of US region may be connected as one electrode in a row, and all the SN electrodes of the PD regions may be connected as one electrode SN_ROW in a row. In some embodiments, the input waveguide array 3410 connects emitter pixels 5020 and the output waveguide ports of the optical switches in the optical switch array region 130 in FIGS. 1 and 230 in FIG.

2. In some embodiments, the widths of the neighboring waveguides in the input waveguide array may be 400 nm and 500 nm in alternative with a gap of 400 nm in between in order to minimize the cross talk between the waveguides.

FIG. 51 is a diagram depicting a 2-dimensional opto-acoustic imaging pixel array, according to aspects of embodiments of the present disclosure. In some embodiments, 2-dimensional imaging pixel array 5100 may include a plurality of rows of 1-dimensional imaging pixel arrays 5020 and input waveguide array 3410. In some embodiments, all the Tcol_E electrodes of US region in a column may be connected as one electrode Tcol_E_x (x=1, 2, 3, . . . N), and all the SP electrodes of the PD regions in a column may be connected as one electrode SP_Col_x (x=1, 2, 3, . . . N), in addition to all the Trow_E electrodes of US region in a row may be connected as one electrode Trow_E_y (y=1, 2, 3, . . . m) and all the SN electrodes of the PD regions in a row may be connected as one electrode SN_ROW_y (y=1, 2, 3, . . . m). In some embodiments, all the bias electrodes region 5130 for Trow and Tcol may be located on top of the imaging pixel array, and may be controlled with a CMOS addressable IC, and all the PD signal electrodes region 5140 for SN_ROW and SP_Col may be located on the bottom of the imaging pixel array and may be controlled with a CMOS addressable IC.

As discussed previously in regard to the emitter arrays of the integrated beam steering systems of the present disclosure, larger 2D imaging pixel arrays may be realized by combining multiple integrated devices each having an imaging pixel array. As a non-limiting example, a system having k rows and two columns of smaller imaging pixel arrays may be used within the scope of the present disclosure.

For example, as depicted, a 128×128 imaging pixel array may include 2 row and 2 columns of coupled 64×64 imaging pixel arrays, and a 256×128 imaging pixel array system may include 4 rows and 2 columns of coupled 64×64 imaging pixel arrays.

In some embodiments, each of the imaging pixels may be positioned to close to its optical switch output port_1 in the chained optical switch array, so that the chained optical switch array and the imaging pixel array are integrated together to make larger imaging pixel arrays possible as silicon waveguide optical loss improves.

IV. Future Embodiments

As silicon photonics fabrication processes improve and the dimensions, optical loss and tuning electrical power of MZI reduce, it is possible that the pitch of the emitter pixel array may be reduced to 10-20 um in both vertical and horizontal directions, and the size of the emitter pixel arrays may reach more than 2048×2048.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claim. It should be noted that although examples of the invention are set forth herein, the claims, and the full scope of any equivalents, are what define the metes and bounds of the invention.

What is claimed is:

1. A silicon photonics integrated beam steering device, comprising:

a chained Mach-Zehnder Interferometer (MZI) optical switch array comprising a plurality of MZI optical switches in series;

the plurality of MZI optical switches comprising:

a first MZI optical switch configured in series with a second MZI optical switch, wherein the first MZI optical switch comprises a first MZI switch upper input port, a first MZI switch lower input port, a first MZI switch upper output port, a first MZI switch lower output port, and wherein the second MZI optical switch comprises a second MZI switch upper input port, a second MZI switch lower input port, a second MZI switch upper output port, a second MZI switch lower output port;

wherein the first MZI switch upper input port is configured to receive input light;

a pixel array having a first pixel and a second pixel, each pixel comprising one or more optical structures configured to receive optical signals from the chained MZI optical switch array;

wherein the first MZI switch upper output port is operably coupled to the first pixel, and the first MZI switch lower output port is operably coupled to the second MZI switch upper input port; and wherein the second MZI switch upper output port is operably coupled to the second pixel;

wherein optical waveguides of the plurality of MZI optical switches and the one or more optical structures of the pixel array are formed in a same waveguide core layer.

2. The silicon photonics integrated beam steering device of claim 1, further comprising:

a light source;

a light dispenser;

wherein the first MZI optical switch further comprises a first control circuit;

wherein the second MZI optical switch further comprises a second control circuit;

wherein the light source is operably coupled to the light dispenser;

wherein the light dispenser is operably coupled to the first MZI optical switch; and wherein the device is configured to selectively transmit a light emission, produced by the light source, along a plurality of optical paths to at least one of the first pixel and the second pixel in response to a first control voltage applied to the first control circuit and a second control voltage applied to the second control circuit.

3. The silicon photonics integrated beam steering device of claim 2, wherein the light dispenser comprises:

a waveguide; and a beam splitter or a dispenser array having a plurality of output ports.

4. The silicon photonics integrated beam steering device of claim 1, wherein each MZI optical switch comprises an optical directional coupler.

5. The silicon photonics integrated beam steering device of claim 1, wherein each MZI optical switch comprises a multimode interferometer (MMI).

6. The silicon photonics integrated beam steering device of claim 1, wherein the first pixel and the second pixel of the pixel array each comprise at least one of an emitter pixel and an imaging pixel.

7. The silicon photonics integrated beam steering device of claim 1, wherein:

the plurality of MZI optical switches further comprises a third MZI optical switch configured in series with the second MZI optical switch, wherein the third MZI optical switch comprises a third MZI switch upper input port, a third MZI switch lower input port, a third MZI switch upper output port, a third MZI switch lower output port;

the pixel array further comprises a third pixel;

the second MZI switch lower output port is operably coupled with the third MZI switch upper input port; and the third MZI switch upper output port is operably coupled with the third pixel and the third MZI switch lower output port is configured to couple with an additional MZI optical switch.

8. The silicon photonics integrated beam steering device of claim 3, wherein the dispenser array comprises at least one of a chained MZI optical switch array, a binary optical switch array, and a splitter array.

9. The silicon photonics integrated beam steering device of claim 6, wherein the emitter pixel comprises a waveguide grating coupler.

10. The silicon photonics integrated beam steering device of claim 6, wherein the emitter pixel comprises a 45-degree vertical emitter facet mirror.

11. The silicon photonics integrated beam steering device of claim 6, wherein the emitter pixel comprises a microlens.

12. The silicon photonics integrated beam steering device of claim 6, wherein the imaging pixel comprises a Mach-Zehnder Interferometer.

13. The silicon photonics integrated beam steering device of claim 6, wherein the imaging pixel comprises a ring resonator.

14. The silicon photonics integrated beam steering device of claim 6, wherein the imaging pixel comprises suspended waveguide.

15. The silicon photonics integrated beam steering device of claim 6, wherein the imaging pixel comprises a photo-detector.

16. The silicon photonics integrated beam steering device of claim 1, wherein the first MZI optical switch and the second MZI optical switch operate using at least one of a thermal-optic effect and an electro-optic effect.

17. The silicon photonics integrated beam steering device of claim 1, wherein the optical waveguide is configured as at least one of a silicon waveguide, a silica waveguide, a silicon nitride waveguide, a polymer waveguide, and a lithium niobate waveguide.

18. A silicon photonics integrated beam steering device, comprising:

a light source;

a light dispenser array operably coupled to the light source and comprising a plurality of light dispensers each having an output port, wherein each light dispenser output port is operably coupled to a chained Mach-Zehnder Interferometer (MZI) optical switch array;

each chained MZI optical switch array comprising a plurality of MZI optical switches, wherein: (a) a first MZI optical switch is operably coupled in series with a second MZI optical switch, (b) the first MZI optical switch comprises a first MZI switch upper input port, a first MZI switch lower input port, a first MZI switch upper output port, a first MZI switch lower output port, and (c) the second MZI optical switch comprises a second MZI switch upper input port, a second MZI switch lower input port, a second MZI switch upper output port, a second MZI switch lower output port, and (d) the first MZI switch upper input port is operably coupled with a light dispenser, the first MZI switch upper output port is operably coupled with a first pixel, the first MZI switch lower output port is operably coupled with the second MZI switch upper input port, the second MZI switch upper output port is operably coupled with a second pixel, and the second MZI switch lower output port is configured to operably couple with an additional MZI optical switch; and a pixel array comprising the first pixel and the second pixel, each pixel comprising one or more optical structures configured to receive optical signals from the chained MZI optical switch array;

wherein optical waveguides of the plurality of MZI optical switches and the one or more optical structures of the pixel array are formed in a same waveguide core layer.

19. A silicon photonics integrated beam steering device, comprising:

a chained Mach-Zehnder Interferometer (MZI) optical switch array comprising a plurality of MZI optical switches in series;

the plurality of MZI optical switches comprising:

a first MZI optical switch comprising a first 1×2 multimode interferometer (MMI) on its input side and a first 2×2 MMI on its output side;

a second MZI optical switch comprising a second 1×2 MMI on its input side and a second 2×2 MMI on its output side;

the first MZI optical switch being configured in series with the second MZI optical switch, wherein the first MZI optical switch comprises a first MZI switch input port, two first MZI switch output ports and wherein the second MZI optical switch comprises a second MZI switch input port, two second MZI switch output ports;

wherein the first MZI switch input port is configured to receive input light;

a pixel array having a first pixel and a second pixel, each pixel comprising one or more optical structures configured to receive optical signals from the chained MZI optical switch array;

wherein a first output port of the first MZI optical switch is operably coupled to the first pixel, and a second output port of the first MZI optical switch is operably coupled to the second MZI switch input port; and wherein at least one output port of the second MZI optical switch is operably coupled to the second pixel;

wherein optical waveguides of the plurality of MZI optical switches and the one or more optical structures of the pixel array are formed in a same waveguide core layer.

20. The silicon photonics integrated beam steering device of claim 19, further comprising:

a light source;

a light dispenser;

wherein the first MZI optical switch further comprises a first control circuit;

wherein the second MZI optical switch further comprises a second control circuit;

wherein the light source is operably coupled to the light dispenser;

wherein the light dispenser is operably coupled to the first MZI optical switch; and wherein the device is configured to selectively transmit a light emission, produced by the light source, along a plurality of optical paths to at least one of the first pixel and the second pixel in response to a first control voltage applied to the first control circuit and a second control voltage applied to the second control circuit.

* * * * *